(12) United States Patent
Suiter et al.

(10) Patent No.: US 11,551,564 B2
(45) Date of Patent: Jan. 10, 2023

(54) AIRCRAFT WITH LANDING SYSTEM

(71) Applicant: Otto Aero Company, Omaha, NE (US)

(72) Inventors: Sean Patrick Suiter, Omaha, NE (US);
Richard Andrew Kruse, Lincoln, NE (US)

(73) Assignee: Otto Aero Company, Omaha, NE (US)

( * ) Notice: Subject to any disclaimer, the term of this patent is extended or adjusted under 35 U.S.C. 154(b) by 0 days.

(21) Appl. No.: 17/478,807

(22) Filed: Sep. 17, 2021

(65) Prior Publication Data
US 2022/0005362 A1 Jan. 6, 2022

Related U.S. Application Data

(60) Continuation of application No. 16/673,725, filed on Nov. 4, 2019, which is a continuation of application No. 15/152,437, filed on May 11, 2016, now Pat. No. 10,467,913, which is a division of application No. 14/142,390, filed on Dec. 27, 2013, now abandoned.

(60) Provisional application No. 61/900,199, filed on Nov. 5, 2013, provisional application No. 61/870,125, filed on Aug. 26, 2013.

(51) Int. Cl.
*G08G 5/00* (2006.01)
*G08G 5/02* (2006.01)
*B64D 45/08* (2006.01)

(52) U.S. Cl.
CPC .......... *G08G 5/0056* (2013.01); *B64D 45/08* (2013.01); *G08G 5/003* (2013.01); *G08G 5/0021* (2013.01); *G08G 5/0039* (2013.01); *G08G 5/0091* (2013.01); *G08G 5/025* (2013.01); *G08G 5/0013* (2013.01)

(58) Field of Classification Search
CPC .. G08G 5/56; G08G 5/25; G08G 5/39; G08G 5/21; G08G 5/13
See application file for complete search history.

(56) References Cited

U.S. PATENT DOCUMENTS

| | | |
|---|---|---|
| 4,438,475 A | 3/1984 | Haley |
| 5,136,267 A | 8/1992 | Cabot |
| 5,136,297 A | 8/1992 | Lux et al. |
| 5,142,480 A | 8/1992 | Morrow |
| 5,459,469 A | 10/1995 | Schuchman et al. |
| 5,933,098 A | 8/1999 | Haxton |

(Continued)

OTHER PUBLICATIONS

George, Fred, "Autonomy to the Rescue", Avionics, Aviation Week & Space Technology Nov. 11-24, 2019, 40-41 Garmin Autoland.

(Continued)

*Primary Examiner* — Imran K Mustafa
(74) *Attorney, Agent, or Firm* — Suiter Swantz pc llo

(57) ABSTRACT

A system and apparatus for assisting in determining the best course of action at any point inflight for an emergency. The system may monitor a plurality of parameters including atmospheric conditions along the flight path, ground conditions and terrain, conditions aboard the aircraft, and pilot/crew data. Based on these parameters, the system may provide continually updated information about the best available landing sites or recommend solutions to aircraft configuration errors. In case of emergency, the system may provide a procedure associated with a hierarchy of available emergency landing sites for execution via the autopilot system for landing the aircraft.

26 Claims, 50 Drawing Sheets

(56) References Cited

U.S. PATENT DOCUMENTS

| | | | |
|---|---|---|---|
| 5,974,349 A | 10/1999 | Levine | |
| 6,148,179 A | 11/2000 | Wright et al. | |
| 6,167,238 A | 12/2000 | Wright | |
| 6,181,990 B1 | 1/2001 | Grabowsky et al. | |
| 6,278,965 B1 | 8/2001 | Glass et al. | |
| 6,353,779 B1 | 3/2002 | Simon et al. | |
| 6,438,469 B1 | 8/2002 | Dwyer et al. | |
| 6,553,333 B1 | 4/2003 | Shenk | |
| 6,573,841 B2 | 6/2003 | Price | |
| 6,591,171 B1 | 7/2003 | Ammar et al. | |
| 6,629,023 B1 | 9/2003 | Silder, Jr. et al. | |
| 6,804,585 B2 | 10/2004 | Humbard et al. | |
| 6,980,959 B1 | 12/2005 | Garrow et al. | |
| 7,006,032 B2 | 2/2006 | King et al. | |
| 7,061,401 B2 | 6/2006 | Voos et al. | |
| 7,167,782 B2 | 1/2007 | Humbard et al. | |
| 7,295,135 B2 | 11/2007 | Younkin | |
| 7,305,286 B1 | 12/2007 | Younkin et al. | |
| 7,489,992 B2 | 2/2009 | Valette et al. | |
| 7,505,835 B2 | 3/2009 | Brust et al. | |
| 7,689,328 B2 | 3/2010 | Spinelli | |
| 7,698,025 B1 | 4/2010 | Cornell et al. | |
| 7,786,900 B2 | 8/2010 | Bitar et al. | |
| 7,874,521 B2 | 1/2011 | Shuster | |
| 7,908,042 B2 | 3/2011 | Brinkley et al. | |
| 8,027,758 B2 | 9/2011 | Ferro et al. | |
| 8,035,547 B1 | 10/2011 | Flanigan et al. | |
| 8,087,616 B2 | 1/2012 | Shuster | |
| 8,131,407 B1 | 3/2012 | Robinson | |
| 8,140,260 B2 | 3/2012 | Feyereisen et al. | |
| 8,190,727 B2 | 5/2012 | Henkel | |
| 8,234,068 B1 | 7/2012 | Young et al. | |
| 8,244,455 B2 | 8/2012 | Case et al. | |
| 8,292,234 B2 | 10/2012 | Shuster | |
| 8,356,776 B2 | 1/2013 | Berens et al. | |
| 8,457,889 B2 | 6/2013 | Feyereisen et al. | |
| 8,477,061 B1 | 7/2013 | Pedersen | |
| 8,543,264 B1 | 9/2013 | Tomas | |
| 8,629,788 B1 | 1/2014 | Greenleaf et al. | |
| 8,983,687 B1 | 3/2015 | Hunter et al. | |
| 9,026,275 B1 | 5/2015 | Young et al. | |
| 9,047,762 B1 | 6/2015 | Neuville et al. | |
| 9,171,473 B1 | 10/2015 | McNally et al. | |
| 9,253,753 B2 | 2/2016 | Rubin et al. | |
| 9,257,047 B2 | 2/2016 | Bailey et al. | |
| 9,257,048 B1 | 2/2016 | Offer et al. | |
| 9,280,903 B2 | 3/2016 | Judy et al. | |
| 9,349,296 B2 | 5/2016 | Wiesemann et al. | |
| 9,355,564 B1 | 5/2016 | Tyson et al. | |
| 9,527,587 B2 | 12/2016 | Levien et al. | |
| 9,536,433 B2 | 1/2017 | Savarit et al. | |
| 9,542,849 B1 | 1/2017 | Bertram et al. | |
| 9,567,097 B2 | 2/2017 | Horsager et al. | |
| 9,567,099 B2 | 2/2017 | Poux et al. | |
| 9,583,010 B1 | 2/2017 | Kolek et al. | |
| 9,640,079 B1 | 5/2017 | Moravek et al. | |
| 9,646,502 B1 | 5/2017 | Gentry | |
| 9,685,090 B2 | 6/2017 | Kneuper et al. | |
| 9,691,286 B2 | 6/2017 | Bahrami et al. | |
| 9,704,405 B2 | 7/2017 | Kashi et al. | |
| 9,728,090 B2 | 8/2017 | Brita et al. | |
| 9,728,093 B2 | 8/2017 | Wiesemann et al. | |
| 9,733,349 B1 | 8/2017 | Wood et al. | |
| 10,114,381 B2 | 10/2018 | Haskins et al. | |
| 10,203,700 B2 | 2/2019 | Haskins et al. | |
| 2002/0039072 A1* | 4/2002 | Gremmert | G08G 5/0052 |
| | | | 340/963 |
| 2003/0093187 A1 | 5/2003 | Walker | |
| 2004/0246145 A1* | 12/2004 | Andrews | G01C 5/005 |
| | | | 340/626 |
| 2004/0249519 A1 | 12/2004 | Frink | |
| 2005/0004723 A1 | 1/2005 | Duggan et al. | |
| 2005/0156777 A1 | 7/2005 | King et al. | |
| 2005/0261814 A1 | 11/2005 | Ryan et al. | |
| 2006/0031006 A1 | 2/2006 | Stenbock et al. | |
| 2007/0005199 A1 | 1/2007 | He | |
| 2007/0018052 A1 | 1/2007 | Eriksson | |
| 2007/0129855 A1* | 6/2007 | Coulmeau | G08G 5/0056 |
| | | | 701/3 |
| 2007/0194171 A1 | 8/2007 | Diamandis et al. | |
| 2008/0154447 A1 | 6/2008 | Spinelli | |
| 2008/0195309 A1 | 8/2008 | Prinzel, III et al. | |
| 2008/0300740 A1* | 12/2008 | Hamburg | G05D 1/0684 |
| | | | 701/3 |
| 2009/0027232 A1 | 1/2009 | Lavielle et al. | |
| 2009/0138144 A1 | 5/2009 | Flannigan et al. | |
| 2009/0152391 A1 | 6/2009 | McWhirk | |
| 2009/0319104 A1* | 12/2009 | Bailly | G08G 5/025 |
| | | | 701/16 |
| 2010/0042316 A1* | 2/2010 | Caillaud | G01C 23/00 |
| | | | 701/533 |
| 2010/0057899 A1 | 3/2010 | Henkel | |
| 2010/0085236 A1 | 4/2010 | Franceschini et al. | |
| 2010/0095084 A1 | 4/2010 | Manning | |
| 2010/0109865 A1 | 5/2010 | Armstrong | |
| 2010/0309222 A1 | 12/2010 | Feyereisen et al. | |
| 2010/0328138 A1 | 12/2010 | Guigné et al. | |
| 2011/0184593 A1 | 7/2011 | Swope | |
| 2011/0215922 A1 | 9/2011 | Armstrong | |
| 2011/0264312 A1* | 10/2011 | Spinelli | G08G 5/0056 |
| | | | 701/16 |
| 2011/0298618 A1 | 12/2011 | Stahl et al. | |
| 2012/0056760 A1 | 3/2012 | Bourret et al. | |
| 2012/0143482 A1 | 6/2012 | Goossen et al. | |
| 2012/0177198 A1 | 7/2012 | Cabos | |
| 2012/0191273 A1 | 7/2012 | Jacobs et al. | |
| 2012/0221175 A1 | 8/2012 | Spinelli | |
| 2012/0265374 A1 | 10/2012 | Yochum | |
| 2013/0090842 A1 | 4/2013 | Stabile | |
| 2013/0096738 A1 | 4/2013 | Yamasaki | |
| 2013/0116863 A1 | 5/2013 | Goupil et al. | |
| 2013/0131970 A1 | 5/2013 | Pendry et al. | |
| 2013/0197721 A1 | 8/2013 | Gu et al. | |
| 2013/0204523 A1 | 8/2013 | He et al. | |
| 2013/0242864 A1 | 9/2013 | Vermande et al. | |
| 2013/0274964 A1 | 10/2013 | Jesse et al. | |
| 2013/0345905 A1* | 12/2013 | Parthasarathy | G01C 23/00 |
| | | | 701/3 |
| 2014/0129058 A1 | 5/2014 | Elahi et al. | |
| 2014/0152507 A1 | 6/2014 | McAllister | |
| 2014/0197980 A1 | 7/2014 | Schulte et al. | |
| 2014/0210648 A1 | 7/2014 | Samuthirapandian et al. | |
| 2014/0222248 A1 | 8/2014 | Levien et al. | |
| 2014/0249693 A1 | 9/2014 | Stark et al. | |
| 2014/0257692 A1 | 9/2014 | Stefani et al. | |
| 2014/0297068 A1 | 10/2014 | Revell et al. | |
| 2014/0304107 A1 | 10/2014 | McAllister | |
| 2014/0327564 A1 | 11/2014 | Sampigethaya | |
| 2015/0077270 A1 | 3/2015 | Rubin et al. | |
| 2015/0081201 A1 | 3/2015 | Rubin et al. | |
| 2015/0170524 A1 | 6/2015 | Stefani et al. | |
| 2015/0296500 A1 | 10/2015 | Kanovsky et al. | |
| 2015/0344149 A1 | 12/2015 | Mumaw et al. | |
| 2015/0356873 A1 | 12/2015 | Kneuper et al. | |
| 2016/0012289 A1 | 1/2016 | Petit | |
| 2016/0027310 A1 | 1/2016 | Samuthirapandian et al. | |
| 2016/0107751 A1 | 4/2016 | D'Andrea et al. | |
| 2016/0117931 A1 | 4/2016 | Chan et al. | |
| 2016/0244187 A1 | 8/2016 | Byers et al. | |
| 2016/0284222 A1 | 9/2016 | Nicholls et al. | |
| 2017/0229024 A1 | 8/2017 | Moravek et al. | |
| 2019/0094886 A1 | 3/2019 | Haskins et al. | |
| 2019/0129448 A1 | 5/2019 | Haskins et al. | |

OTHER PUBLICATIONS

Wikipedia, URL: https//en.wikipedia.orgwikiAutoland, Downloaded Sep. 28, 2021, 9 pages.

Legget, Julian, (Jun. 1933). "Happy Landings" in Fog, Popular Mechanics, pp. 973-975.

Boatman, Julie, (Mar. 5, 2020), "Garmin's Autoland Gets Flight Tested", Flying Magazine. Retrieved from https://www.flyingmag.com/garmin-autoland-flight-tested/.

(56) References Cited

OTHER PUBLICATIONS

Charnley J. "The RAE Contribution to All-Weather Landing". In: Journal of Aeronautical History 1 (1 2011), pp. 3-21.
Federal Aviation Administration. (Jul. 2, 2018), Advisory Circular 120-118, Criteria for Approval/Authorization of All Weather Operations for Takeoff, Landing and Rollout, Retrieved from https://www.faa.gov/regulations_policies/advisory_circulars/index.cfm/go/document.information/documentID/1033312.
Garrison, Kevin, (Jun. 2012), "Categories of the ILS", AVWeb, Retrieved from https://www.avweb.com/flight-safety/technique/categories-of-the-ils/.
Jackson, Hagan L., (Jan. 1947). New Instrument System Proposed For Flight and Landing Safety, Aviation, pp. 86-87.
Laron, George C. (Aug. 2012), "The First Autolanding", Air Space Magazine, Retrieved from https://www.airspacemag.com/history-of-flight/the-first-autolanding-3818066/.
Mola, Roger, History of Aircraft Landing Aids, U.S. Centennial of Flight Commission, Retrieved from https://www.centennialofflight.net/essay/Government_Role/landing_nav/POL14.htm.
Planes Are Landing by Radio When Fog Hides the Field. 1931. Chicago, IL: Popular Mechanics.
Wikipedia contributors. (Dec. 5, 2021). Blind Landing Experimental Unit. In Wikipedia, The Free Encyclopedia. Retrieved from https://en.wikipedia.org/w/index.php?title=Blind_Landing_Experimental_Unit&oldid=1058748820.
Siegel, Diana et al., "Development of an Autoland System for General Aviation Aircraft." Master Thesis. Massachusetts Institute of Technology, Report No. ICAT-2011-09, Sep. 2011, 208 Pages.
Singer, Neil, "Get it in Writing: Controller-Pilot Datalink Tackles Miscommunications with Text" AOPA Pilot, Turbine Edition, Jul. 1, 2022, pp. T-14-T-20.

* cited by examiner

EMERGENCY PROFILE

- 1 ENG
- MEDICAL
- THREAT
- AUX ENGINE
- ENG OUT
- WEATHER/OTHER
- FIRE/SMOKE
- PRESSURE
- SYS FAIL

DIVERT OPTION

| ID | Name | Details | | | |
|---|---|---|---|---|---|
| KANW ANW | Ainsworth Rgnl Anywhere, NE | ⊗ | ◊ | Approaches: VOR,RNAV,GPS | |
| KBVN BVN | Albion Muni Allhome, NE | ⊘ | Approaches: RNAV,GPS,NDB | | |
| KAIA AIA | Alliance Muni Aplace, NE | ⊗ | 👤 | ◊ | ▪ |
| | | Approaches: ILS,DME,LOC,VOR,RNAV,GPS,NDB | | | |
| NE32 | Burk General Hospital Med-1-Port Aplace, NE | ▪ | 📟 | 👤 | |
| H63 | Harlan Co Lake Apalco, NE | ⚓ | | | |
| 4D9 | Alpha Muni Alpha, NE | ○ | | | |
| 37V | Arnold Muni Arnold, NE | ⊘ | | | |
| ONE0 | Merrihew Ashley, NE | ○ | 📟 | A/81 | 👤 |
| ONE1 | Runner Landing Area Asphalt, NE | ○ | 📟 | A/81 | 👤 |
| 53NE | Storms Brothers Apostle, NE | ○ | 📟 | A/81 | |
| 8V2 | Asman Muni Asman, NE | ⊘ | | | |
| K01 | Farington Field Apple, NE | ○ | | | |
| 77NE | Fish County Hospital Apple, NE | ▪ | 📟 | | |
| NE84 | Memorial Hospital Auroa, NE | ▪ | 📟 | | |
| KAUH AUH | Auroa Muni-Field Auroa, NE | ⊘ | ◊ | Approaches: VOR,RNAV,GPS | |
| 40NE | Landgren Ranch Barrel, NE | ○ | 📟 | | |
| 6NE7 | Lee Field Barley, NE | 📟 | A/81 | | |
| KRBE RBE | Rock County Bubba, NE | ⊘ | Approaches: RNAV,GPS,NDB | | |
| NE31 | B.T. Air Better Town, NE | ○ | 📟 | | |
| KBIE BIE | Better Muni Better, NE | ⊗ | Approaches: VOR,RNAV,GPS | | |

*FIG. 27*

FIG. 33
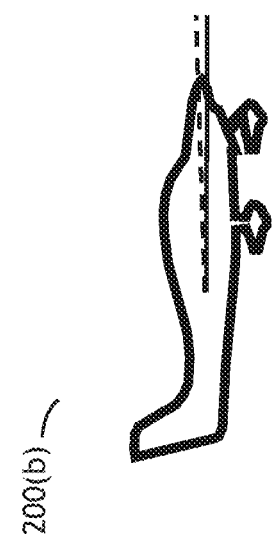
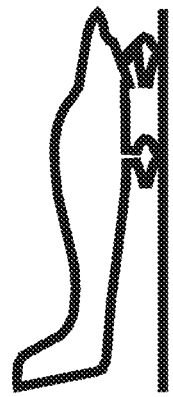
360(c) — EXPECTED CONFIG
TIME $t_x$ = 00:06:15
ALT: 4500 AGL
PITCH: 5°
POWER: 80%
GSPD: 120 KTS
VERT: 2000 FT/MIN
FSEG: CLIMB
360(b) — CURRENT CONFIG
TIME $t_x$ = 00:06:15
ALT: 3200 AGL
PITCH: 2°
POWER: 60%
GSPD: 80 KTS
VERT: 500 FT/MIN
360(a) — CURRENT CONFIG
TIME $t_x$ = 00:00:00
ALT: 0 AGL
PITCH: 0°
PWR: 0%
GSPD: 0 KTS
VERT: 0 FT/MIN
FSEG: LAND

AIRCRAFT WITH LANDING SYSTEM

CROSS-REFERENCE TO RELATED APPLICATIONS

The present application claims priority under 35 U.S.C. 120 as a continuation of U.S. Non-Provisional application Ser. No. 16/673,725 filed on 4 Nov. 2019; said Ser. No. 16/673,725 filed on 4 Nov. 2019 was a continuation of U.S. Non-Provisional application Ser. No. 15/152,437 filed on 11 May 2016; said Ser. No. 15/152,437 filed on 11 May 2016 was a continuation of U.S. Non-Provisional application Ser. No. 14/142,390 filed on 27 Dec. 2013 which claims priority under 35 U.S.C. 119(e) to U.S. Provisional Application Ser. No. 61/900,199 filed on 5 Nov. 2013 and U.S. Provisional Application Ser. No. 61/870,125 filed on 26 Aug. 2013.

TECHNICAL FIELD

The present invention is generally related to aircraft and more specifically to a system and apparatus for monitoring a plurality of flight conditions and parameters, and on a condition selectively suggesting either a new flight profile or assuming flight control and then flying the suggested flight profile.

BACKGROUND

Whether flying a piston-powered personal craft or a multi-engine commercial jet, pilots are taught the same general priorities in emergency situations: aviate, navigate, and communicate—in that order. The pilot's first duty is self-evident: to fly the aircraft. To successfully do so requires the continual processing of a vast amount of data received via any number of different sources. During flight operations a pilot may be confronted with the loss of an engine on takeoff. In such a situation the pilot must immediately decide the safest option for the particular altitude and set of flight conditions, e.g., whether to: (a) turn approximately 180° and make a tail-wind landing; (b) turn at least 270° and re-land; (c) crash straight ahead; or (d) limp or glide to another nearby airport. Altitude, position, aircraft performance, terrain, atmospheric and weather conditions, and pilot capability dictate the safest option. A pilot's options increase with altitude, performance, and the availability of landing sites (each providing different services). The pilot's options are inversely proportional to the severity of the emergency.

Autopilot, automated navigation and GPS systems have significantly increased the information available to pilots. More information, however, means more potential calculations for the pilot to make, more options to consider, and more information to filter. Other than destination, most of this information is dynamic, for example, position (including attitude), traffic, and weather (including wind speed and direction—both vary by altitude and heading). The pilot must balance the ongoing assessment of this continual stream of data (information) while aviating, navigating, and communicating. Unexpected conditions must be assessed and acted upon decisively and correctly. Depending on criticality, options narrow as time passes. Once a decision is made, the die is substantially cast.

These informational processing factors are complicated when conditions are less than ideal. Available information may not be complete or accurate. For example, a pilot climbing after takeoff over unfamiliar terrain experiencing an emergency is likely 1) aware that the airport runway lies only a few miles behind, and 2) aware of the vague location of additional airfields nearby in possibly deteriorating weather. In this example the pilot may not be aware, however, that an open field (or road or the like) a few miles distant would be a better emergency landing site, in that it would be more likely to be reached with altitude and time to execute a stabilized approach.

An emergency complicates these factors, and the corresponding pressure on the pilot, even further. The means of propulsion or other onboard systems may fail, making a safe landing simultaneously more urgent and more difficult to execute. A structural failure, cabin depressurization, or onboard medical emergency may occur, requiring the pilot to rapidly divert from the initial flight plan and find an alternative landing site (ALS). Emergency conditions add yet another degree of difficulty to the already complex responsibilities of piloting.

Therefore, a need exists for a system and method to aid the pilot of a distressed aircraft, thereby reducing pilot workload, the number of decisions based on inaccurate data, and the potential loss of life and property.

SUMMARY

The present invention relates to a system and apparatus for assisting pilots (flight crews) in determining the best option at successive points in a flight for any category of emergency. Generally, the system categorizes emergencies as (1) land immediately (red), 2) land as soon as possible (yellow), or (3) land as soon as practicable (green). The apparatus of the present invention alerts the pilot (crew) to the available options given a particular category of emergency (and set of flight conditions). In the alternative, an apparatus of the present invention (1) may assist the pilot (crew) in the form of a flight director (or checklist or the like) in executing a proposed landing solution to a given emergency, or 2) may direct the aircraft autopilot in executing the suggested (and selected) landing solution. In either case, the system of the present invention provides the pilot with time to contemplate and consider the emergency and its resolution (while the aircraft is directed toward and configured for the best landing option given a particular emergency condition).

The present invention may ascertain the configuration of the aircraft from changes in the aircraft's position over time. For example, in a particular planned portion of a planned flight segment the aircraft may be expected to gain altitude over a particular distance at a particular rate. If the aircraft is not climbing at the expected rate it may be an indication that the aircraft is configured incorrectly, for example, improper power setting, or the gear or flaps may remain in takeoff position. Likewise, enroute, a particular aircraft may be expected to perform in a known set of atmospheric conditions within a known range of values. Any deviation from these values indicates a potential problem. Based on the aircraft such deviations may refer to a single likely source or a narrow set of sources. The system of the present invention may alert the aircraft crew to the potential problem and its likely source(s).

In a preferred embodiment of the present invention, even under normal flight conditions (planned or expected conditions) an audio display, a graphic display (HUD or smart glasses or the like) of available landing options given a category of emergency is continuously displayed. This display of information alerts a pilot to available options under various conditions and assists in training pilots in learning aircraft capabilities in various conditions and locations.

Likewise, crew and dispatch may alter protocol in an effort to mitigate risks identified through the operation of an aircraft or a fleet of aircraft operating with the present invention.

Preferably, the present invention may continuously update ALS options and make the data available to the pilot upon request. For example, an ALS page on a well-known multifunction display (MFD), or a display screen on a tablet or like portable computing device, may indicate each ALS and graphically indicate the ability of the aircraft to reach each ALS. In addition, a graphical display of range data on the primary flight display or screen may aid the pilot in decision-making. For example, a pilot may opt to select on (or off) a graphical range ring indicating an engine out (zero-thrust) best glide range.

With additional data points made available through existing or added controls and sensors (e.g., auto throttles, acoustic profiles, flight control position indicators, rate of climb/descent, heading, and the like), the accuracy of the configuration data ascertained by an embodiment of the present invention increases. The present invention may ascertain over a series of data collection intervals the presence and scope of an unusual condition (correctable error or emergency), plan an emergency descent profile to the safest (most preferred) available landing site, and suggest troubleshooting options as the emergency profile is accepted and executed. In this manner, the present invention may assist the pilot in discovering and correcting aircraft configuration errors which if left uncorrected may lead to undesirable consequences, e.g., gear-up landings, overstressing aircraft components, flight delays or passenger discomfort.

In a presently preferred embodiment the apparatus comprises: (1) at least one computer processor; 2) a data bus or at least one sensor for collecting flight condition information such as aircraft position, weather, traffic, terrain, aircraft systems status, aircraft flight envelope parameters, pilot (crew) status/condition; (3) a ground-to-air data link; (4) a display system, and (5) a current database of information relating to (a) the aircraft (performance data), (b) pilot (biometric data, flight history, currency, proficiency), (c) flight plan, and (d) bulk route characteristics (weather, terrain, landing sites, traffic, airspace, navigation). In an embodiment the system continually monitors a plurality of flight parameters, provides the pilot with current information based on those parameters, and upon a given condition prioritizes a course of action. In a preferred embodiment the system may either execute or guide a flight crew in flying a series of control inputs calculated to safely secure the aircraft on the ground. The system of the present invention at least temporarily relieves a pilot (crew) from the task of quickly calculating an emergency plan with its associated set of procedures so they may fly, configure, and troubleshoot (for the situation) while contemplating the acceptability of option(s) suggested by the present invention.

BRIEF DESCRIPTION OF THE DRAWINGS

FIG. 27 is a table illustrating available services at various airports;

FIG. 33 is a diagram illustrating at least one of the individual components of an aircraft configuration determined by an embodiment of the present invention, and a condition whereby the individual data components of an aircraft configuration at any given point in time are compared to an expected configuration of said aircraft at said point in time as determined by the system of the present invention;

DETAILED DESCRIPTION

Figure 1:
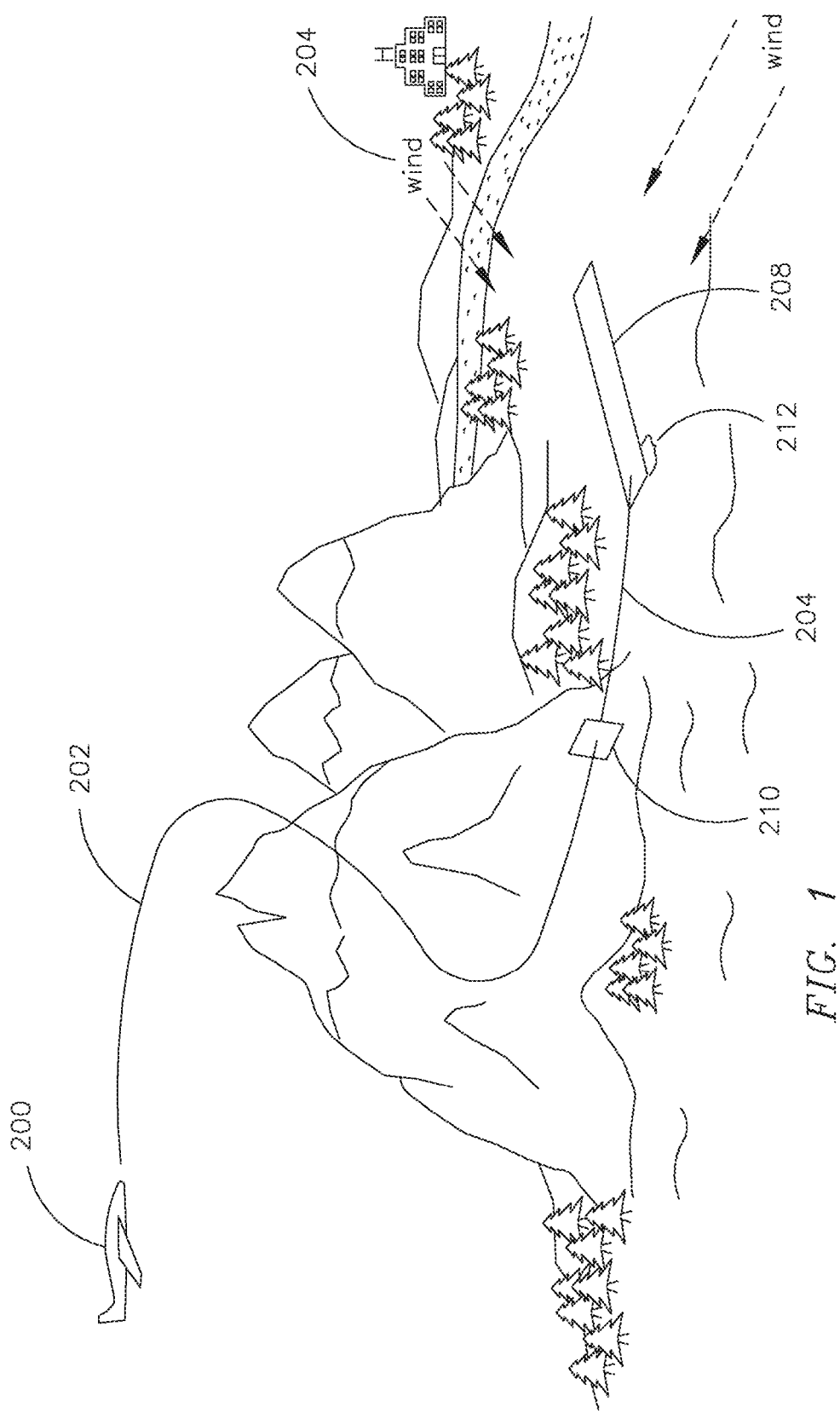
FIG. 1 is a perspective view of an aircraft in a condition that necessitates altering or modifying an assigned or planned profile wherein the system of the present invention suggests a new or modified procedure to accommodate a condition, e.g., land immediately, land as soon as possible, and/or land as soon as practicable.

In the following detailed description, embodiments are described in sufficient detail to enable those skilled in the art to practice the invention. It is understood that other embodiments may be utilized without departing from the scope of the present invention. The following detailed description should therefore not be taken as limiting in any way the scope of the present invention.

Features of the present invention in its various embodiments are exemplified by the following descriptions with reference to the accompanying drawings. These drawings depict only selected embodiments of the invention, and should not be considered to limit its scope in any way. The present invention may be described with further detail and specificity through use of these drawings.

The present invention relates to a system and apparatus for monitoring and processing a plurality of flight parameters in order to minimize workload and stress on a pilot due to unexpected (undesired) conditions. The apparatus includes a database of information from which is extracted a dataset that is static relative to any given flight at the point of departure (a "flight" referring to a set whose elements are: an aircraft; one or more pilots; an initial, unexecuted flight plan; and enroute flight path conditions, both dynamic and static. In operation, the system continually processes dataset components in concert with dynamic data relative to a particular point along the flight path, including: the aircraft's position, altitude, heading, and airspeed; its performance relative to benchmark values as determined by the aircraft's flight envelope and flight plan; and current cabin, flight, and engine conditions (including emergency states that might require an unscheduled landing). Additionally, a preferred embodiment determines the availability of airports or other alternative landing sites (including fields, roads, and bodies of water) within the aircraft's range at that moment, as well as current conditions at those landing sites (such as available services, weather, wind, terrain, obstacles, or ground traffic). An embodiment of an apparatus of the present invention may then continually ascertain and display options for any given point and suggest a procedure executable by the pilot or autopilot system providing for an emergency landing at an alternative landing site (including any necessary course changes or aircraft reconfiguration).

In addition, the system may note any significant deviations in the aircraft's performance (relative to its performance envelope and expected performance at a particular point on a flight plan profile), which might result from inappropriate configuration (of landing gear, flaps, or the like). Generally an aircraft may be configured for taxi, takeoff, climb, cruise, descent, approach, landing, or penetrating turbulent air. If an aircraft is inappropriately configured for a particular segment of flight, the present invention may notify the pilot/crew and suggest a configuration correction, such as lowering landing gear or adjusting flaps, and the like such that the aircraft may be correctly configured for the desired flight segment. The suggestion may be generic, e.g., "CHECK CONFIGURATION: _____ AIR SPEED _____ GRADIENT _____ HEADING EXPECTED". Additionally, in further embodiments the system and apparatus may provide a detailed or specific suggestion, e.g., "CHECK GEAR/FLAPS", "CHECK AIRSPEED", "CHECK PITOT/STATIC", "CHECK PITCH ANGLE" and the like.

FIG. 1 depicts an aircraft 200 in flight; the system has plotted a path and corresponding emergency procedure set 202 to approach and land on a nearby ALS consisting of an airport runway 208, accounting for obstacles (i.e., natural and manmade) in the flight path (vicinity) and wind conditions on descent and at the landing site. In addition to navigating to the best available ALS, procedure set 202 preferably provides (when possible) for aligning aircraft 200's pitch angle for best possible glide speed, configuring aircraft 200 for landing, and the like. Procedure set 202 also provides (when possible) for a landing into wind relative to aircraft 200's approach, thereby reducing the landing speed and required landing distance. FIG. 1 also illustrates operation of an embodiment of the present invention where the apparatus of the present invention has identified an opportunity gate 210 for aircraft 200 final approach 204 and targeted touchdown point 212 on runway preferred touchdown zone nearest aircraft 200 (system effort to maximize safety).

Figure 2A:
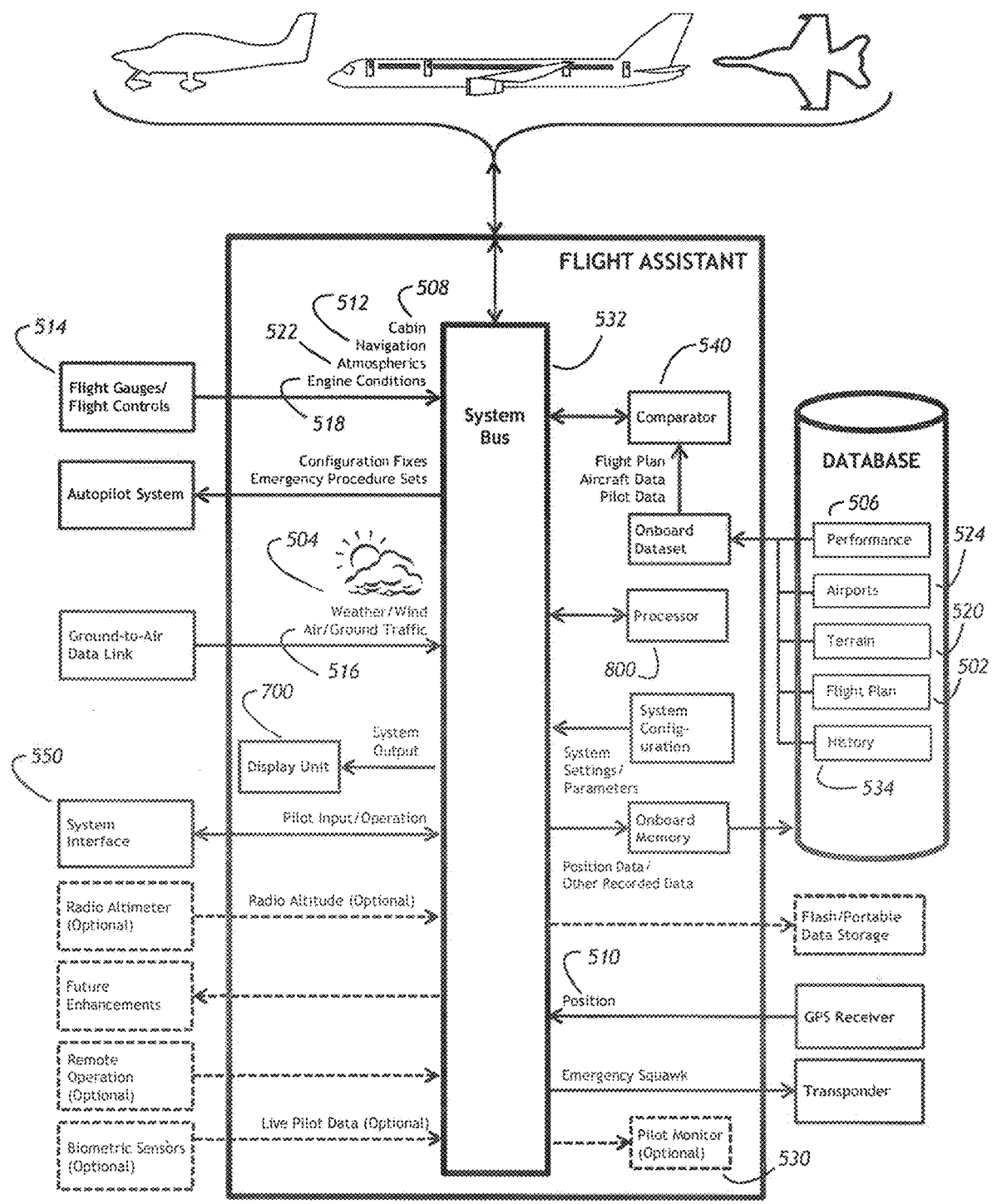
FIGS. 2A and 2B are environmental block diagrams representing embodiments of the present invention.
Figure 2B:
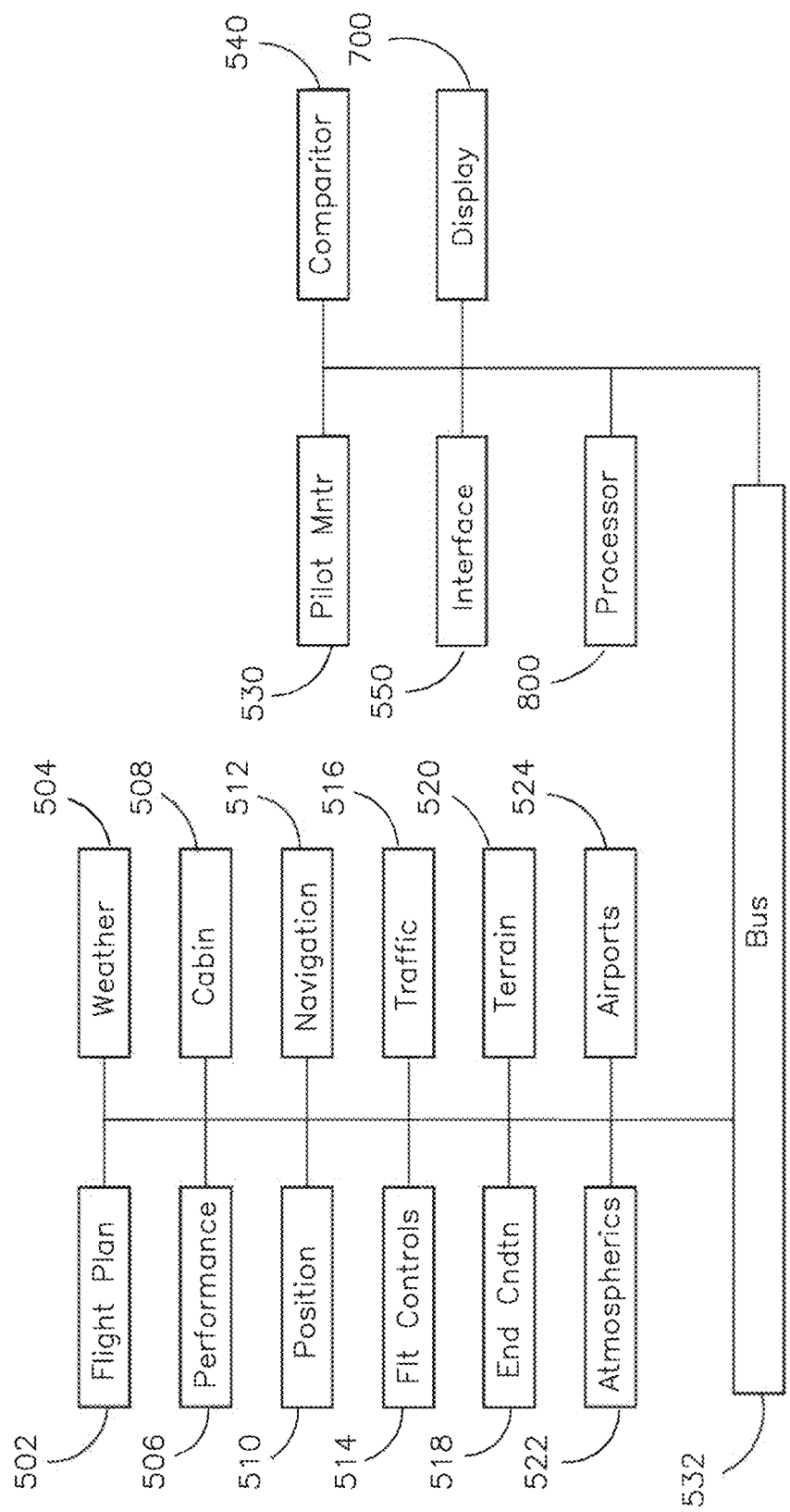

FIGS. 2A and 2B are diagrammatic representations of the environment of an embodiment of the present invention, including both hardware components of the apparatus and data components used by the system. For a given aircraft, the dataset includes information about its specifications, e.g., size, empty weight, engine(s) operational parameters, fuel capacity and consumption characteristics, flight configuration performance characteristics, and general performance envelope 506 plus derivative data (e.g., the runway length required for a normal landing and the suitability of various landing surfaces). In a currently preferred embodiment, all or substantially all of the information in the Pilot's Operating Handbook (POH, −1, or Flight Manual) may be included (e.g., all performance data and emergency procedures).

For a given pilot (aircraft, leg), the dataset may include general information such as pilot experience level (such as the pilot's flight time for any given aircraft) and past performance 534, as well as specific and derivative flight performance data. In operation a preferred embodiment of the present invention may continuously ascertain current position relative to an expected position (per the flight plan or previous leg/segment position) and determine whether a reportable problem exists. An apparatus of the present invention may be selectably programmed with a range of operational values (via a menu or the like to a user/operator set of parameters) for each operational segment. Ideally, takeoff and landing segments may have tighter (tighter/narrower more periodically detected values) so a pilot/crew may more quickly be alerted to deviations.

In a preferred embodiment the invention may, for example, monitor previous traffic and arrival/departure information to improve accuracy (of operation of the present invention). For example (selectably per the user/operator) on a flight plan to KSTL/St. Louis the system may detect that landing traffic (from the North) is now landing on runway 11 via the AARCH ONE arrival (rather than on runway 30 via the QBALL EIGHT arrival) due to a wind shift or the like. Within the constraints of this changed condition, the system may alert the crew to a heading deviation consistent with the new AARCH path. Additionally, satellite (or the like) data over a period of intervals, or road traffic applications, may be utilized by an embodiment of the present invention to ascertain the relative risk associated with a potential ALS (field, e.g., growing crop, plowed, row direction; or road, e.g., slope, width, and current or predicted level of traffic).

For a given flight plan 502, the dataset may include the initial flight path and related information (including information derived by the present invention). This may include, for example, terrain 520, including both topographic features and manmade obstructions) along the path; nearby airports along the path suitable for landing 524 and their navigation/communication frequencies; and any services near those airports (parts/repair, fuel, hospitals, currently available accommodations and/or transportation). Derivative data may include risk ranked ALS along or near the initial path, along with surface (typical/predicted), gradient, elevation, obstacles, and other information relevant to an attempted approach and landing 512. Alternative landing sites may include open fields of sufficient dimension for the aircraft, paved surfaces such as highways or parking lots, or bodies of water.

In-flight, the system may monitor dynamic values for any given point along the flight path, including: the aircraft's current position 510; its airspeed, heading, and altitude above sea level; atmospheric conditions such as air pressure/temperature and wind speed/direction 522; cabin conditions 508; flight controls and settings 514; and propulsion system conditions 518. The system may also monitor information available via data link, including: local air and ground traffic for a given position 516; current and forecast weather along the initial path 504; and conditions at any nearby ALS where available. Some embodiments may also monitor biometric information about the pilot and/or crew 530, including: brain activity; breathing and heart rate; reaction times (and changes thereto); signs of nervousness or drowsiness; or other vital signs. In such an embodiment of the present invention, collected biometric information may be utilized to ascertain acceptable (obtainable) ALS.

The system bus 532 connects the various components responsible for the collection of these diverse data points to the processor 800 and comparator 540 for data processing. A display unit 700 with user interface 550 displays pertinent information and processing output to the pilot, while at the same time allowing for pilot input to reflect a change in conditions (for example, declaring an emergency state [pan, pan; mayday, mayday]) that in turn would change system parameters. An apparatus of a preferred embodiment may include a user selectable switch for selectively activating or selecting an emergency protocol (for a particular situation/condition within a segment [$R_I$, $R_{P1}$, or $R_{P2}$]). $R_I$ for land immediately (or e.g., eject, activate airframe parachute); $R_{P1}$ for land as soon as possible; and $R_{P2}$ for land as soon a practicable.

In a presently preferred embodiment, the system may continually evaluate both dataset components and dynamic values to determine the best available ALS, or a weighted hierarchy of alternatives (if more than one exists). The system may initially select sites from those nearby landing sites provided by the dataset. The system may consider additional sites suitable for a given aircraft (but more distant from the initial flight plan) if those sites fall within a predetermined range of the aircraft's current position (i.e., the target radius) or an emergency state is declared.

For any given set of more than one ALS, the system may assign a weighted value to each individual ALS, corresponding to that site's suitability for landing based on available current (anticipated at arrival time) conditions. This assignment may account for a variety of factors including: (1) the site's distance from current position; 2) atmospheric conditions at current position and at the ALS (if available or derivable); (3) ground terrain at the ALS, including surface composition and the presence of nearby trees, brush, vegetation, or other obstacles; (4) the presence of hospital, security, repair, or other facilities near the ALS; and (5) the difficulty of navigating to and landing at the ALS for a pilot of given skill (current performance) and experience level.

This assignment, and the resulting best ALS or hierarchy thereof, may continually refresh as conditions and contributing factors change. The results of this assignment may be available for display to the pilot, refreshing as system results update.

The system may plot an optimal path to each identified ALS. This path may be represented by a set of points in three dimensions comprising a navigable path from the aircraft's current position to a ground-level touchdown point at the ALS. In plotting these paths, the system may incorporate aviation rules and best practices (e.g., landing into headwinds where possible to minimize landing speed, maintaining safe distances from neighboring air (ground) traffic, setting a touchdown point that maximizes the available landing surface). The system may continually revise paths as the hierarchy of potential landing sites (as well as the aircraft's precise position along its flight path) changes.

Figure 3:
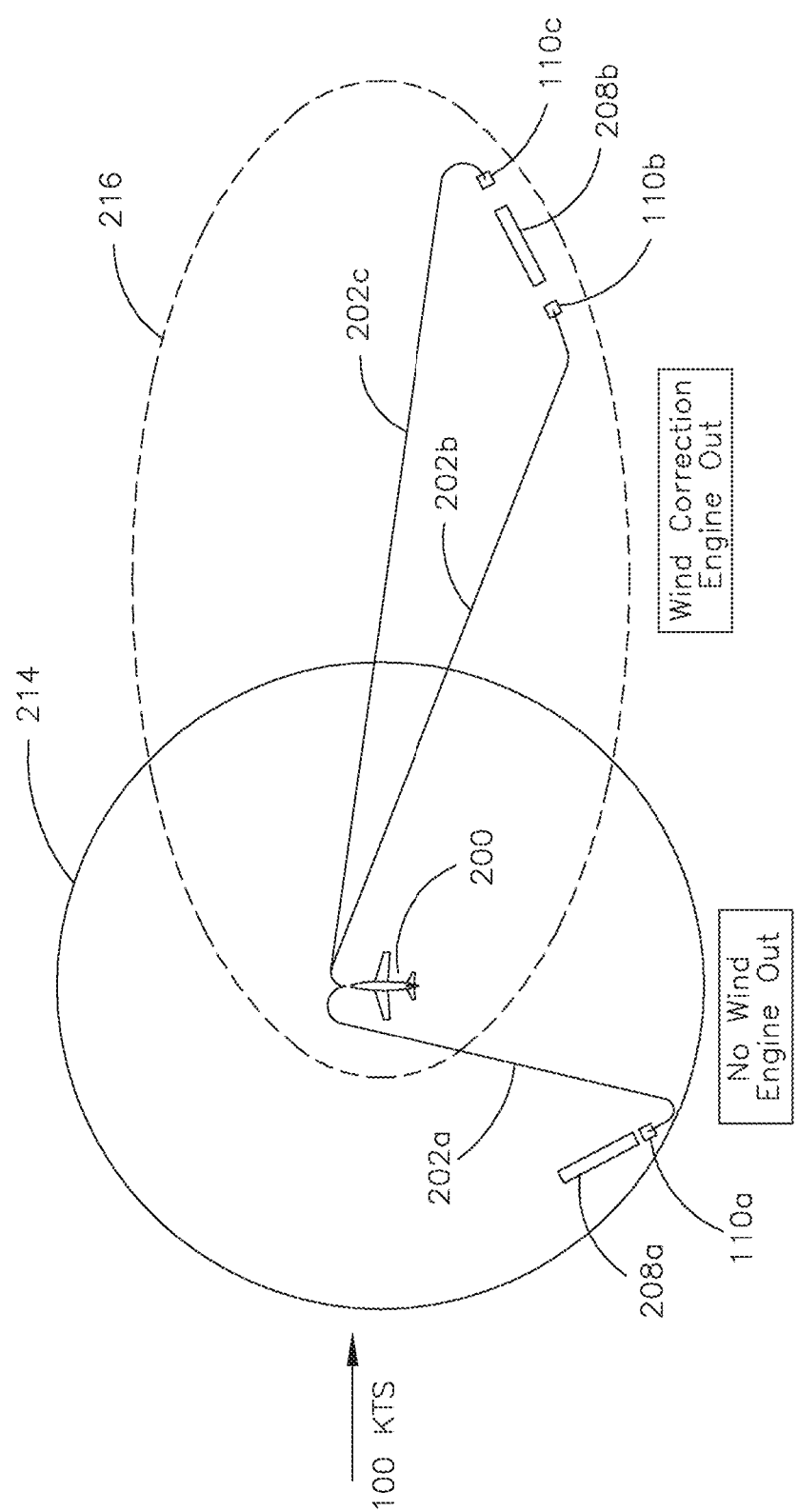
FIG. 3 is a top plan view of an "on" condition pilot display of an embodiment of the present invention illustrating areas of landing (ditching) opportunities (target radius) available upon a particular condition, wherein the pilot may operatively select to accept and fly a suggested new (emergency) procedure set, or in the alternative to accept each item from said new procedure set in seriatim.

FIG. 3 depicts aircraft 200 in an engine-out state, in need of immediate landing. Without allowing for wind, the system uses target radius 214 (reflecting an immediate need to land) in order to determine the best available ALS at runway 208a, here the site nearest aircraft 200's position. The system then plots emergency course 202a to opportunity gate 110a and landing on runway 208a. As a substantial wind may affect aircraft 200's glide capability in an engine-out state, it may also affect the system's choice of best available ALS. Here the presence of wind over aircraft 200's port side (100 kts) flattens the circular target radius into an ellipse 216, and runway 208b is selected as the best available ALS despite its greater physical distance from aircraft 200's position. The system then plots paths along 202b, 202c to opportunity gates 110b or 110c for landing at runway 208b.

Figure 4A:
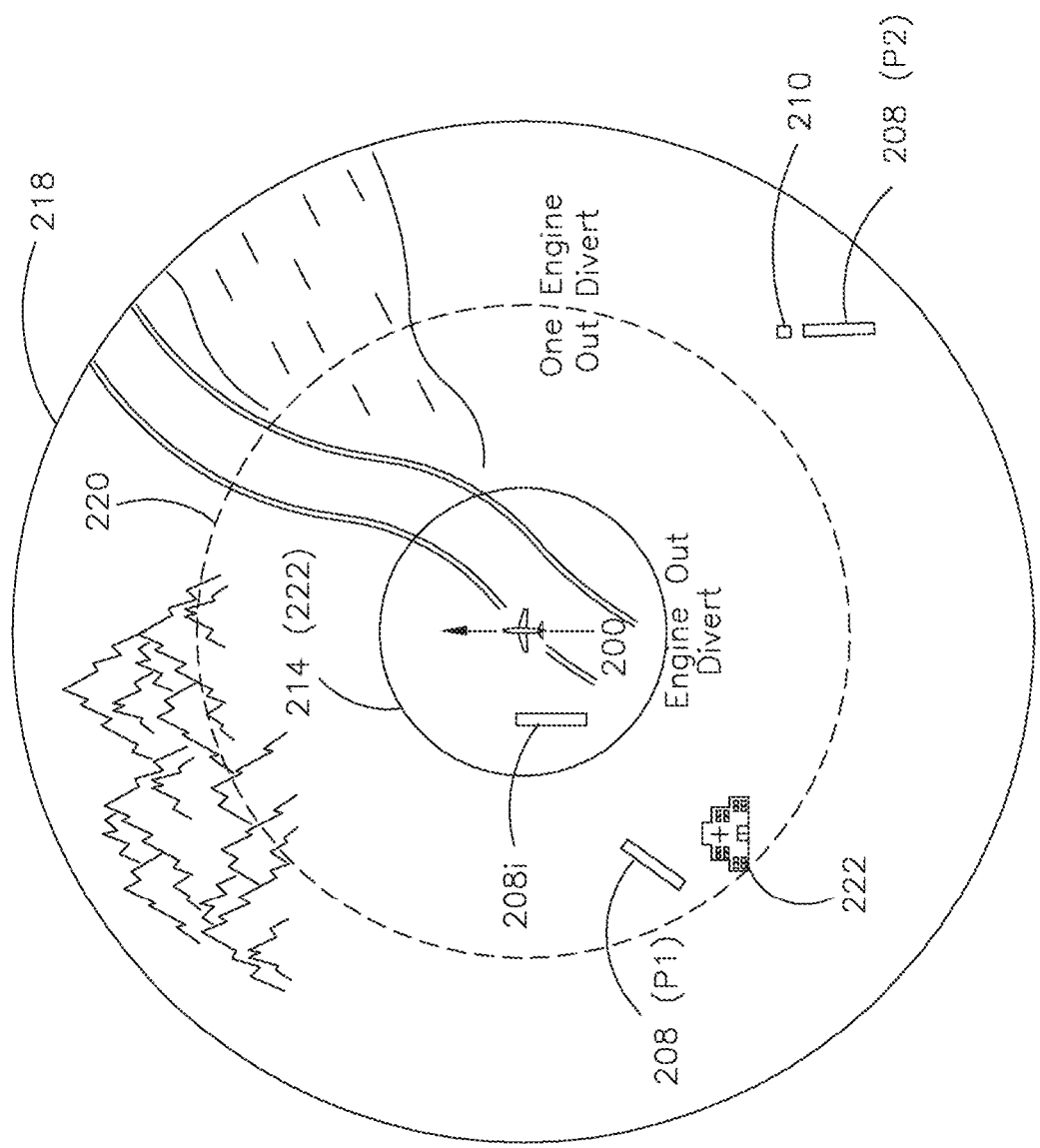
FIG. 4A is a top plan view of a continuously updated pilot display of an embodiment of the present invention illustrating areas of landing (ditching) opportunities (target radius) available upon a particular condition, wherein the pilot may operatively select to accept and fly a suggested new (emergency) procedure set, or in the alternative to accept each item from said new procedure set in seriatim.

FIG. 4A depicts aircraft 200 and potential alternative landing sites 208(P2), 208(P1), and 208i. If an emergency state is declared, the system parameters for determining the best available ALS may change. Target radius 218 represents a need to land as soon as practicable (considering any available services within a broad radius), while radius 220 reflects a more pressing need if aircraft 200 is in single-engine state (i.e., one of aircraft 200's two engines has failed) to land as soon as possible (e.g., first safe opportunity depending on VFR). While one landing site 208(P2)) may be an airport runway, if aircraft 200 is in a single-engine state it may lose priority as an ALS to closer landing sites 208(P1) and 208i). The presence of hospital 222 adjacent to 208(P1) means that if aircraft 200 is in a medical-emergency state, 208(P1) may gain priority as an ALS due to nearby facilities. Finally, if aircraft 200 is in an engine-out state (all engines have failed), the system's land-immediately target radius 214 is narrower still. Landing site 208i, situated inside target radius 214, may maintain priority as an ALS.

Figure 4B:
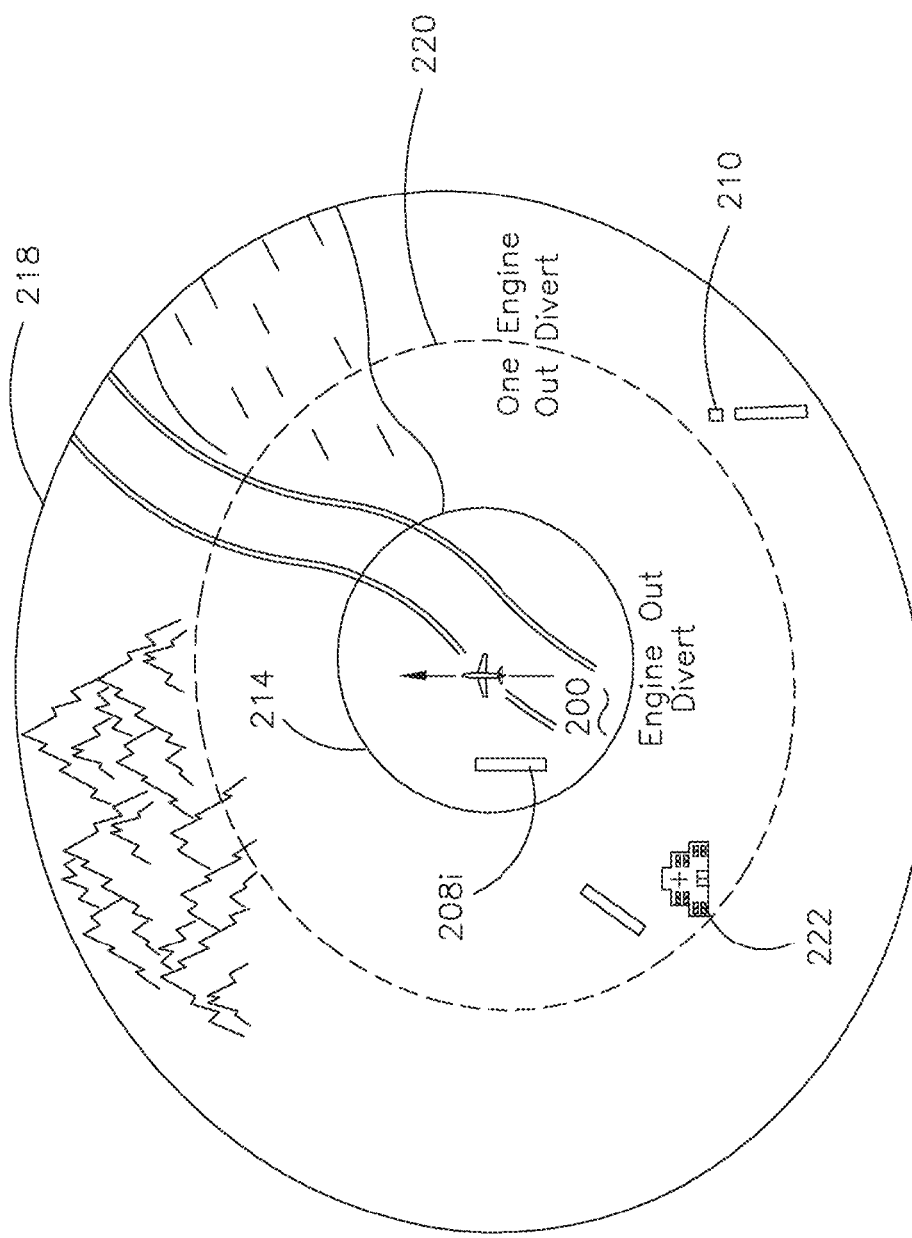
FIG. 4B is a diagram explaining generally how wind speed and direction may affect the target radius of available alternative landing sites reachable by a given aircraft under undesirable conditions.

FIG. 4B explains generally how wind speed and direction may affect the range of an aircraft experiencing engine failure, and consequently the shape of the target range used to select best available landing sites. A slight wind over aircraft 200's starboard side elongates aircraft 200's target radii 214, 220, 218 slightly on that side.

| Condition | Indicator | Possible Scenario | Radius |
| --- | --- | --- | --- |
| Land immediately | $R_I$ | Dead Stick | 214 |
| Land as soon as possible | $R_{P1}$ | Single Engine | 220 |
| Land as soon as practicable | $R_{P2}$ | Medical Emergency | 218 |

The present invention may display landing opportunities within ranges ($R_I$, $R_{P1}$, $R_{P2}$) as circles (ellipses) on an aircraft's Multi-Function Display (MFD) or the like. Additionally, ALS suitability may be represented and displayed by color-coded icons (green, yellow, orange, red, or the like). The display range at which this and other information is presented may be user or system selected. In operation, an MFD (HUD or the like) serves to display information when the selected (user or system) range makes various classes (types) of information relevant. For example, in an effort to reduce clutter on moving map displays and the like, detailed surrounding terrain is displayed depending on altitude, airspeed, glide range, and distance (e.g., 20 NM). To reduce clutter traffic information may nominally be displayed at ranges between five and ten NM. Weather (and the like) is generally displayed at ranges of 200 NM and less.

Figure 5:
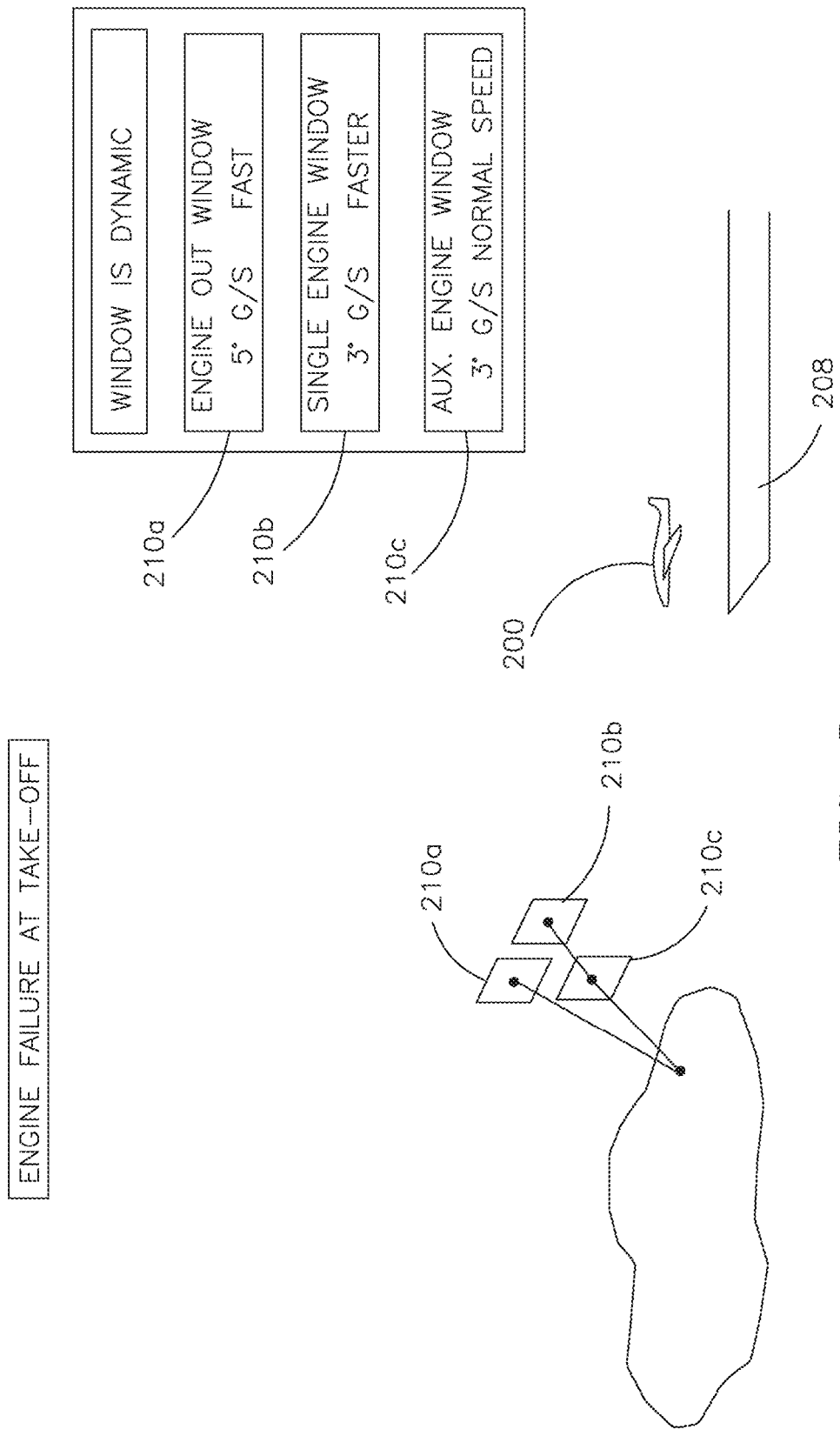
FIG. 5 is a highly diagrammatic perspective view of an emergency condition (engine failure at takeoff) forced landing (straight ahead) procedure overview (display) with an associated queue wherein an embodiment of the present invention suggests a risk profile accessed emergency procedure set providing a return to airport (re-land) procedure.

Approach courses, and the corresponding target windows projected by the HUD, may vary depending on the specific emergency state. FIG. 5 depicts aircraft 200 experiencing engine failure after takeoff from runway 208. The system has selected a nearby open field as the best available ALS. Aircraft 200's glide slope and speed may vary depending on whether its emergency state is single-engine 210b), aux-engine 210c), or engine-out 210a), and the optimal approach course (and corresponding opportunity gates) may vary accordingly. If aircraft 200 is in an engine-out state, for example, its glide slope may be steeper and its corresponding opportunity gate 210a) higher relative to the final touchdown point.

Figure 6:
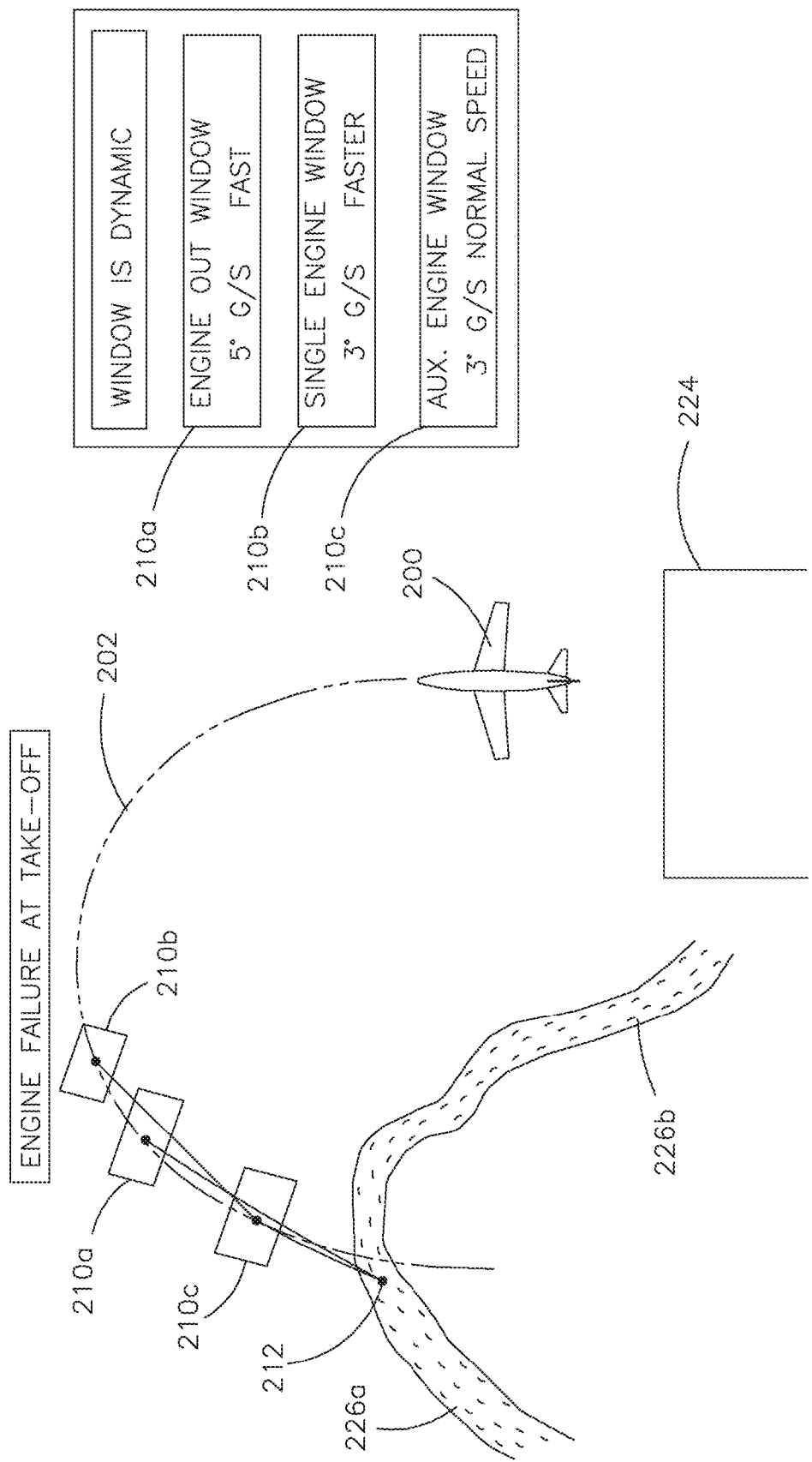
FIG. 6 is a highly diagrammatic perspective view of an emergency condition (engine failure at takeoff) ditching procedure overview with an associated queue wherein an embodiment of the present invention suggests a risk profile accessed emergency procedure set (the procedure set being dependent on the specific nature of the engine failure) providing a best safe landing (ditching) opportunity procedure.

FIG. 6 depicts aircraft 200 experiencing engine failure immediately after takeoff from originating airport 224. The system is directing aircraft 200 along emergency course 202, and preparing to ditch in a nearby river 226a (section 226b, being unreachable by aircraft 200, is unsuitable for ditching). Again, the aircraft's specific engine emergency (engine-out/210a, single-engine/210b, aux-engine/210c) may determine its glide slope and speed, and its precise approach and corresponding opportunity gate 210a, 210b, 210c) toward touchdown point 212 may vary accordingly.

Figure 7:
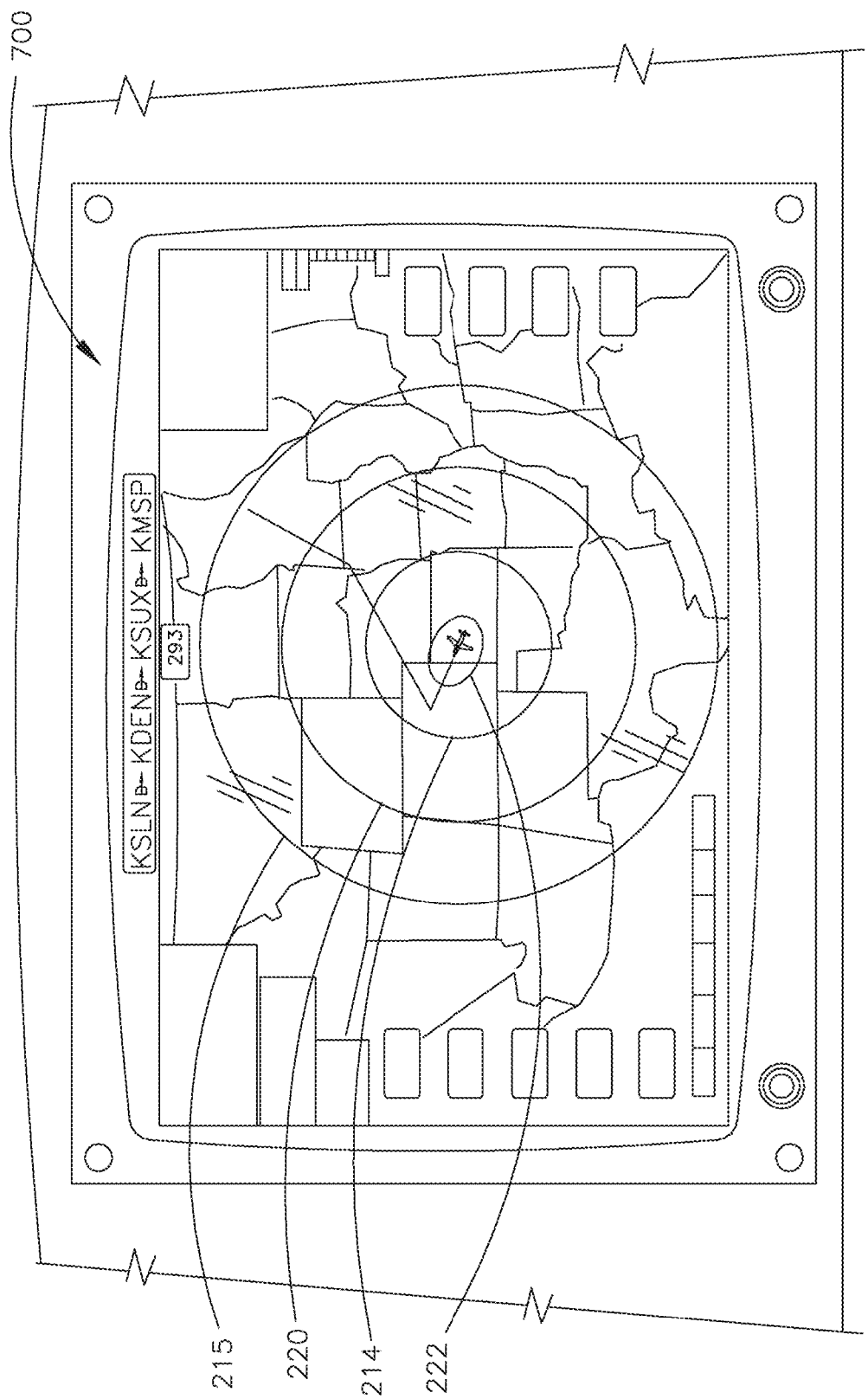
FIG. 7 is an environmental drawing of alternate landing site (ALS database, and subscription of an embodiment of the flight assistant of the present invention.

FIG. 7 depicts an onboard display unit 700, which shows an aircraft in-flight from KSLN/Salina to KDEN/Denver to KSUX/Sioux City to KMSP/Minneapolis-Saint Paul per its initial flight plan (not over KMCK). Onboard display unit 700 also displays initial target radii calculated by the system for immediate landing 222, landing as soon as possible 220, and landing as soon as practicable 218, as well as a no-wind opportunity radius 214.

The system may record all data generated in-flight in memory storage. Flight data is streamed (or batch loaded) for incorporation into a database of the present invention for auxiliary purposes (e.g., comparison of a current flight to previous flights in order to predict and/or detect unusual conditions).

At least two primary embodiments of the present invention may be delineated in operation by the means utilized to determine the existence of an unusual condition. Where data is available from existing aircraft systems, such as position, airspeeds, flight control positions, attitude and angle of attack, propulsion and cabin condition, that data may be utilized by the present invention via the bus 532 (FIG. 2) to assist an apparatus of the present invention in ascertaining status and/or an unusual condition. For example, an ARINC 429, MIL-STD-1553, UNILINK, or like avionics data bus protocol may be utilized by the present invention. Likewise, an embodiment of the present invention may sufficiently derive the necessary information from limited available data. For example, an aircraft equipped with a GPS or other navigation system (inertial guidance, VOR, RNAV, LORAN, and/or ADF or the like) may be sufficient. Likewise, an embodiment of the present invention may include a GPS. In operation such an embodiment receiving continually refreshed GPS data related to the aircraft's position inflight may derive from those data further information related to the aircraft's airspeed, heading, attitude, rate of climb or descent, configuration, propulsion, or cabin conditions, and thereby assist an apparatus of the present invention in ascertaining status and/or an unusual condition.

For example, the present invention may interpret the aircraft 200's GPS coordinates as placing the aircraft (for any unique time $T_x$) at a point $P_x$ of coordinates ($X_x$, $Y_x$, $Z_x$), where $X_x$ and $Y_x$ correspond to that point's latitude and longitude, and $Z_x$ to its altitude above mean sea level (MSL) and ground level (AGL). The present invention may then interpret the point of takeoff as ($X_0$, $Y_0$, $Z_0$) at time $T_0$, where $X_0$ and $Y_0$ represent the latitude and longitude of the current flight's origin point and $Z_0$ (relative to the ground at the point of takeoff) is zero. The present invention may then interpret subsequent GPS data as representing a series of points $$\{P_0(X_0, Y_0, Z_0), \ldots, P_n(X_n, Y_n, Z_n), P_{n+1}(X_{n+1}, Y_{n+1}, Z_{n+1}), \ldots, P_L(X_L, Y_L, Z_L)\}$$

along the aircraft's flight path, from liftoff at $P_0$ to touchdown at $P_L$. For any two such points $P_a$ ($X_a$, $Y_a$, $Z_a$) and $P_b$ ($X_b$, $Y_b$, $Z_b$), the present invention may easily derive the total distance d traveled relative to the ground (over the time interval $T_a$ to $T_b$) as $$\cos^{-1}(\sin x_b \sin x_a + \cos x_b \cos x_a \cos(x_b - x_a)),$$

or $$2\sin^{-1}\sqrt{\left(\sin\frac{x_b - x_a}{2}\right)^2 + \cos x_a \cos x_b \left(\sin\frac{y_b - y_a}{2}\right)^2},$$

the initial course from $P_a$ to $P_b$ (of distance d) as $$\begin{cases} \sin(y_b - y_a) < 0 : \cos^{-1} \frac{(\sin x_b - \sin x_a)\cos d}{\sin d \cos x_a} \\ \text{else} : 2\pi - \cos^{-1} \frac{(\sin x_b - \sin x_a)\cos d}{\sin d \cos x_a} \end{cases},$$

and the rate of climb or descent over the time interval as:

$$\frac{(Z_b - Z_a)}{(T_b - T_a)}$$

The present invention may also derive information related to the aircraft's airspeed, allowing for variances in wind speed and atmospheric pressure. For the aircraft's takeoff and initial climb, beginning at liftoff $\{P_0(X_0, Y_0, Z_0), \text{time } T_0\}$, and concluding when the aircraft reaches $\{P_C(X_C, Y_C, Z_C), \text{time } T_C\}$, the aircraft reaches cruising altitude $Z_C$, climbing at an average rate of $$\frac{(Z_c - Z_0)}{(T_c - T_0)}$$

and traveling a distance (relative to the ground) of $\cos^{-1}(\sin x_c \sin x_0 + \cos x_c \cos x_0 \cos(x_c - x_0))$ while climbing. The present invention may also, for example, derive the aircraft's angle of climb as:

$$\tan^{-1} \frac{Z_c - Z_0}{\cos^{-1}(\sin x_c \sin x_0 + \cos x_c \cos x_0 \cos(x_c - x_0))}$$

A preferred embodiment of the present invention may ascertain the existence of an unusual condition by comparing available data related to the aircraft's performance in-flight (e.g., its position, altitude, airspeed, attitude, heading, rate of climb/descent) to performance norms (ideals) stored in an onboard dataset. Data sources from which these performance norms may be derived include the pilot's past performance history while flying the current route or under similar flight conditions, the aircraft's expected performance along a given flight plan or under similar flight conditions, or optimal performance conditions for a given aircraft at any point within a given flight plan (and/or flight segment).

Likewise, an embodiment of the present invention may note as an unusual condition any deviation of a particular performance factor, or set of factors, from performance norms and respond to a detected (ascertained) unusual condition according to one or more user selectable protocols (depending on the nature and severity of the condition). However, the precise course of action recommended by the present invention in response to an unusual condition may vary depending on the specific phase of flight in which the condition occurs (including taxi, takeoff, initial climb, cruise, descent, approach landing, and weather avoidance). Similarly, depending on the specific phase of flight in which a deviation from performance norms occur, the present invention may account for a broader or narrower deviation from performance norms in determining whether a deviation represents a routine event (associated with a configuration fix or procedure set that can be communicated to the pilot or autopilot system) or an unusual condition (including a potential emergency requiring diversion from the initial flight plan). For example, a deviation of two percent from expected cruising altitude may not be interpreted as an unusual condition (requiring only continued observation at that time, with possible action taken if the deviation persists or increases) while a similar deviation in altitude during the initial climb phase (approach or landing) may be interpreted as an unusual condition potentially requiring correction (and brought to the pilot's attention). Similarly, a preferred embodiment of the present invention may ascertain whether an unusual condition is a reroute, minor deviation, a configuration error, or a more serious problem (a potential emergency). The range of acceptable deviations from, for example, an idealized, expected norm, may be user/operator selectable and may vary by flight segment (and/or airspeed and altitude). Generally, in a preferred embodiment, tighter ranges (of acceptable values) are utilized the closer the aircraft is to the ground, other aircraft, or weather and the like.

For example, an embodiment of the present invention may identify a significant loss of airspeed inflight that may in turn indicate a partial or total failure of the propulsion system. If this loss of airspeed occurs at cruise, the present invention may suggest reconfiguration of the aircraft as a remedy, e.g., correction of improper use of flaps, power setting, and or angle of attack. If the loss of airspeed is not remedied by reconfiguration, the present invention may then suggest other courses of action. In the alternative, immediately after takeoff the present invention may interpret a significant loss of airspeed as an emergency or a potential emergency. Based on a variety of factors (including but not limited to the aircraft's altitude, the availability of alternative landing sites, and wind conditions), the present invention may then suggest an emergency landing, advising the pilot as to possible emergency procedure sets (turning in excess of 180° to land at the originating airport, gliding forward to an alternative airport, or touching down at some nearby alternative site suitable for landing) and the relative risk of each course of action.

In addition, embodiments of the present invention may track, collect and transmit data according to an established set of requirements. Such requirements may include a Flight Operations Quality Assurance (FOQA) program and the like. Such requirements may track operational data over time and transmit data to a central operational facility for follow on analysis. Future training or future simulator scenarios may be based on such analysis. Further, pilot specific data may be recorded for future pilot specific training. For example, should a specific pilot maintain a consistent set of errors over time, the systems of the present invention may create a training scenario for the specific pilot based on the consistent set of errors.

Figure 8A:
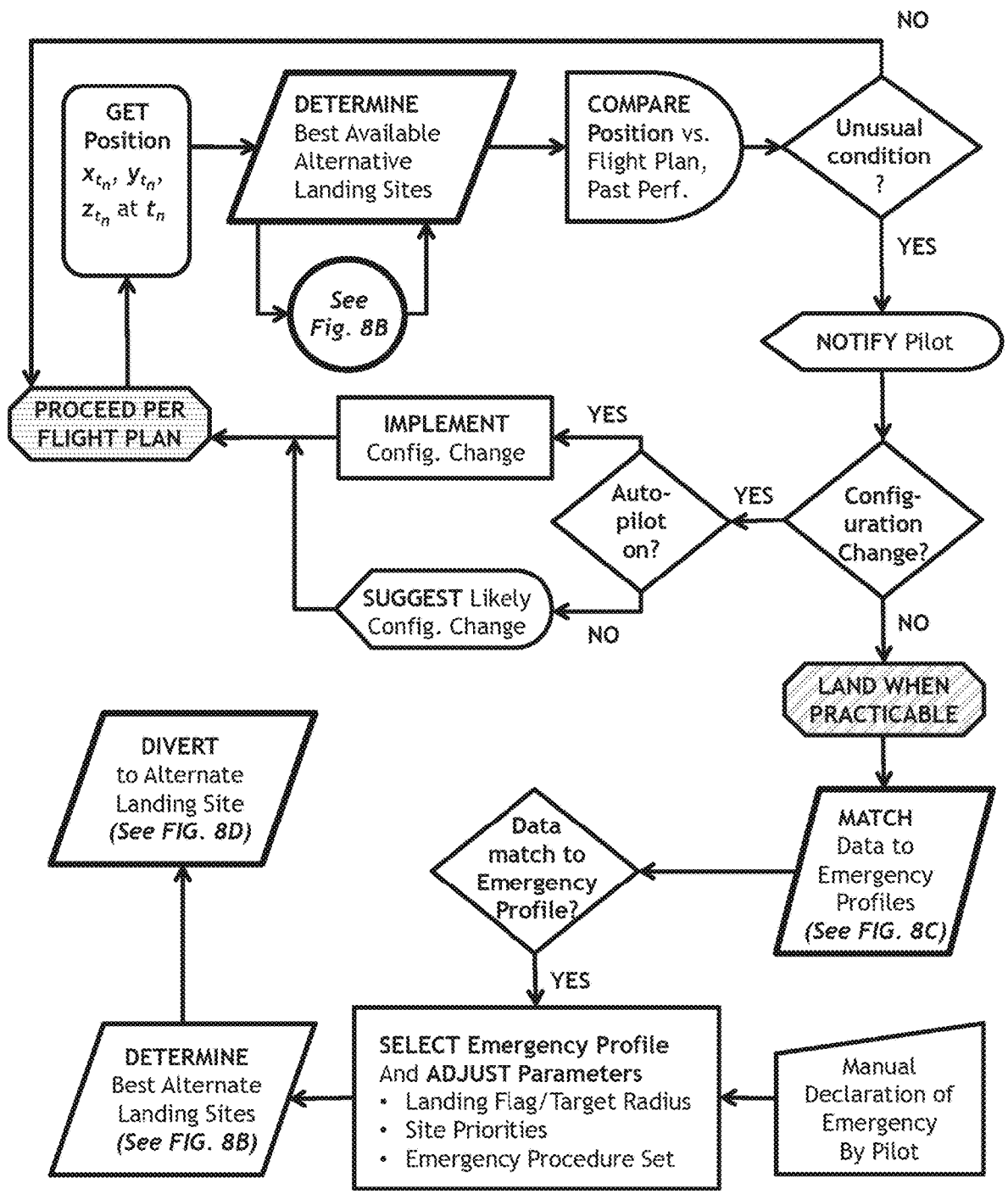
FIGS. 8A, 8B, 8C, 8D, and 8E are flow diagrams for presently preferred embodiments of operations of various aspects of the present invention.
Figure 8B:
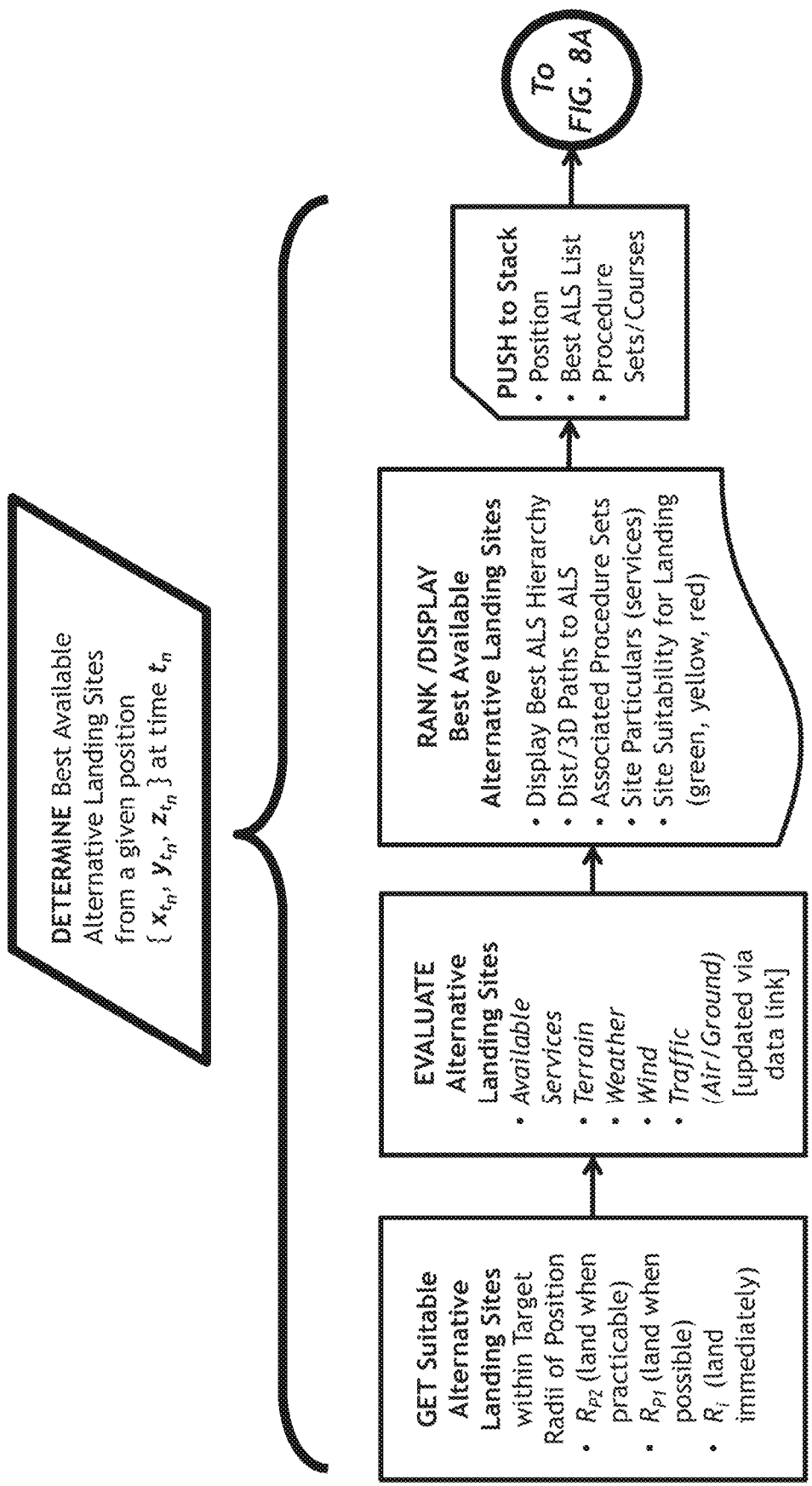

FIG. 8A depicts the underlying process by which, under routine flight conditions, the system of a preferred embodiment of the present invention may continually collect position data at selectable time intervals. Based on this information, the system may develop a continually refreshing hierarchy of the best available landing sites. FIG. 8B depicts the subroutine by which the system creates the ALS hierarchy, augmenting via ground-to-air data link the information previously downloaded from the onboard dataset (which may include terrain, traffic, and service information about airports and other alternative landing sites along the flight path). When this information is current, the system may then evaluate and rank available landing sites within a given radius, storing the results and displaying them to the pilot via display unit 700.

While this subroutine continually runs, the comparator 540 may also continuously assess incoming and derived flight data (which may include information about the aircraft's position, altitude, airspeed, attitude, etc.) in comparison to data patterns in the onboard dataset. These data patterns represent performance norms and may include expected data points relative to the history of a particular flight plan or leg, and the pilot's past performance on the current or similar routes. If a deviation from performance norms is detected or ascertained, the system may assess whether the deviation is sufficient to constitute an unusual condition. If an unusual condition exists, the system may notify the pilot via display unit 700, and may then further assess whether the unusual condition is associated with a configuration error (change) or, in the alternative, an emergency profile. If there is a configuration change associated with the deviation, the system will suggest the appropriate correction to the pilot via the display unit 700, or communicate the necessary changes to the autopilot system if it is currently active.

Figure 8C:
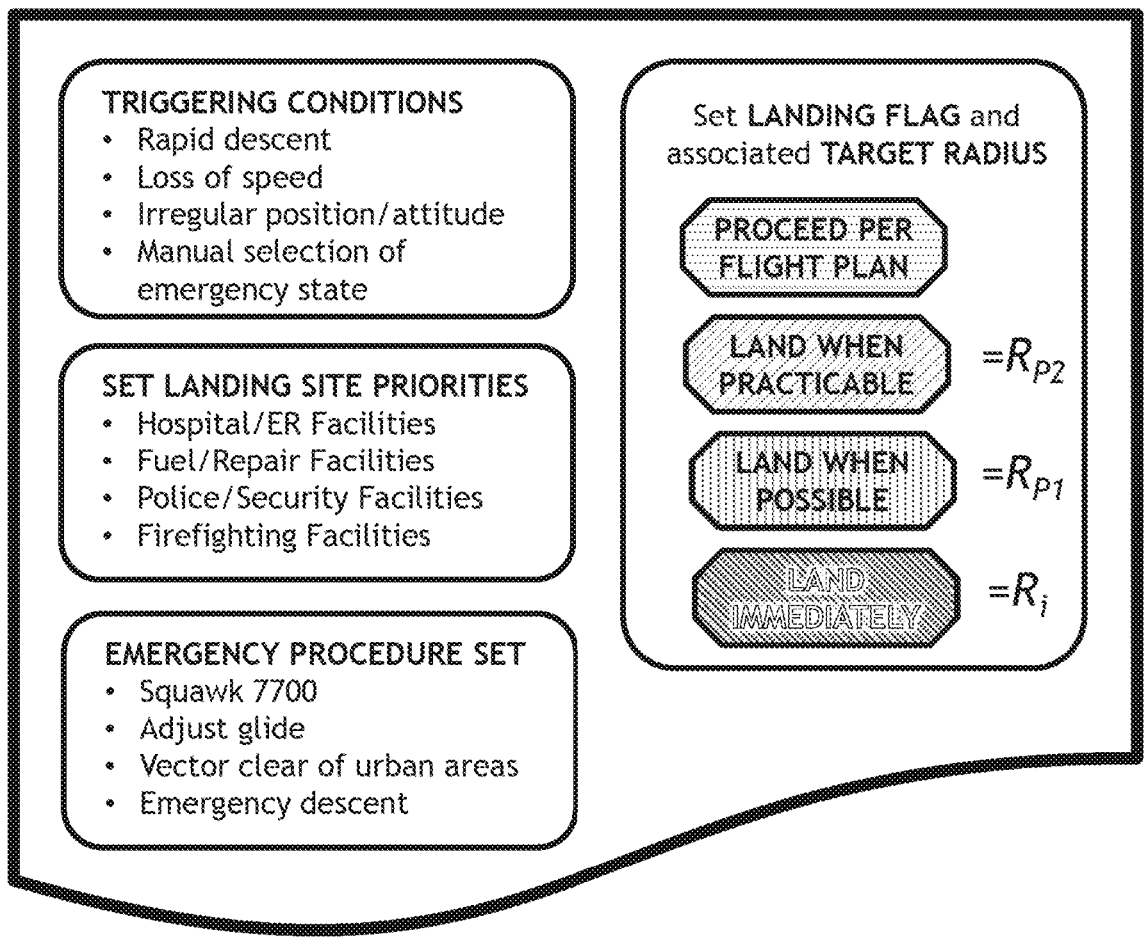

If there is no appropriate configuration correction (trouble solution or fix) to address the current deviation, the system may notify the pilot via the display unit 700, either recommending the activation of $R_{P2}$ land-when-practicable status or activating that status through the autopilot system. The system may then compare current flight data with emergency profiles stored in the onboard dataset in order to determine if the current deviation from performance norms is indicative of an emergency or potential emergency. FIG. 8C depicts data components included in an emergency profile by a preferred embodiment of the present invention. Certain conditions, e.g., a rapid descent or significant loss of speed at climb or descent, may be associated with a particular emergency profile such as an engine failure. The magnitude of the deviation (e.g., a 25 percent vs. 50 percent loss of speed at initial climb) may inform the system of the severity of the emergency, and the system may set the corresponding target radius accordingly ($R_{P2}$, $R_{P1}$, or $R_I$) depending on urgency. The system may then adjust landing site priorities depending on the specific emergency, prioritizing medical, security, or other services in addition to the size of the target radius and feeding these new priorities to the ALS search routine (FIG. 8B). Finally, the system may load checklists and emergency procedure sets associated with the particular emergency, displaying them to the pilot via the display unit 700 for execution or sending them to the autopilot system for execution in the event of a diversion. The pilot may also activate an emergency state manually through the system interface 550.

Figure 8D:
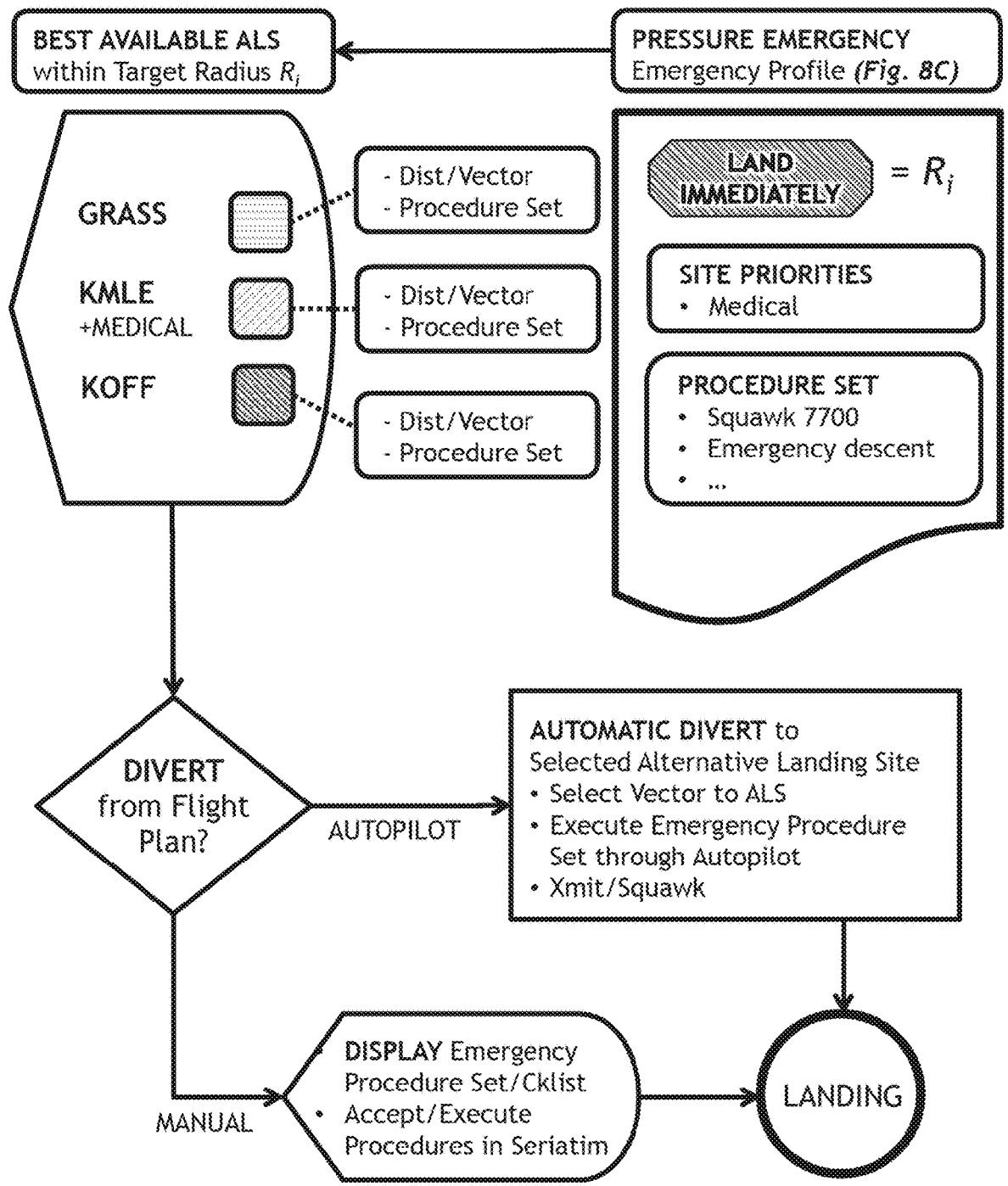

When an emergency state is active, the pilot may be presented with current ALS information pertinent to the current emergency, displayed via the display unit 700. The pilot may then divert to an ALS. FIG. 8D depicts the information that may be displayed to the pilot via the display unit 700 when an emergency state is active and a diversion is imminent. For every viable ALS identified by the system, the system may associate with that ALS a calculated path in three dimensions to that ALS, as well as a set of emergency procedures necessary to effect a landing there. The pilot may choose to divert automatically, in which case the autopilot system will execute the associated emergency procedure set. In the alternative, the pilot may choose to execute a manual diversion to a particular ALS. In this case, the display unit 700 will display the associated emergency procedure sets and checklists for the pilot to execute in seriatim.

Figure 8E:
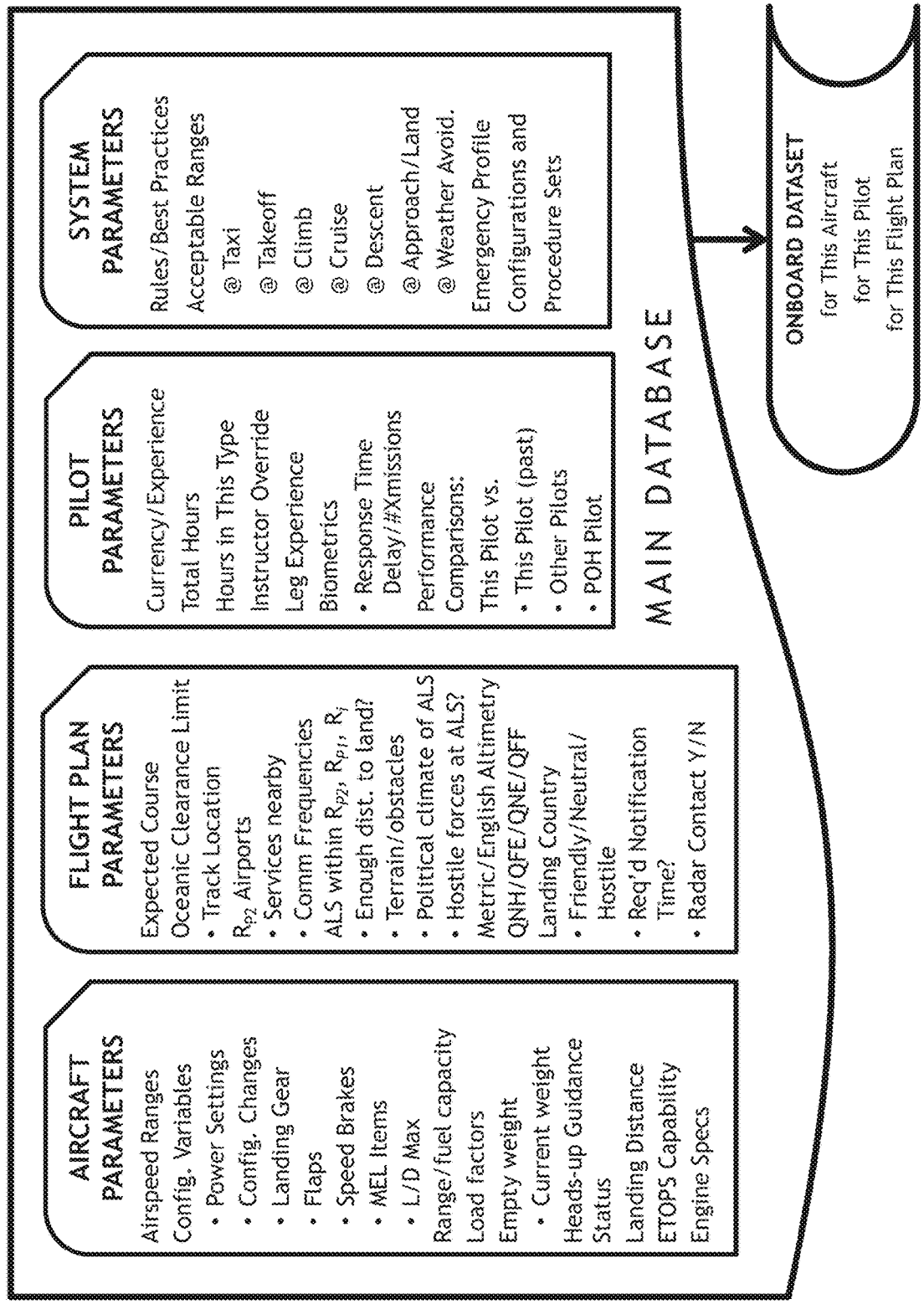

FIG. 8E depicts the data components of the main database and associated onboard dataset utilized by a preferred embodiment of the present invention. The database may contain information specific to pilots, aircraft and aircraft types, flight plans and legs, and selectable parameters for the system of the present invention. Prior to flight, the pilot may download from the main database information related to the pilot's history and past performance, the specifications and expected performance of his/her aircraft and aircraft type, the expected flight plan (including a history of expected performance associated with that particular flight plan or leg), and system parameters that may be selectable by the pilot or determined by a commercial carrier (including emergency procedure sets, system sensitivity settings and associated flight stages, rules and policies, and best practices). Parameters used by the system of the present invention may be scalable depending on aircraft categorization.

Aircraft are most typically categorized by weight and mission. For the purposes of an embodiment of the present invention aircraft may be categorized as: (1) general aviation (small<12,500 lbs and large>12,500 lbs); 2) commercial transport aircraft; or (3) military aircraft. Small general aviation aircraft tend to be low flying (non-pressurized) and have little excessive reserve performance. Commonly they are single-engine piston powered with only nominal performance reserve during all but taxi, descent, approach and landing flight segments. For this reason a reduction in or loss of propulsion is always an emergency ($R_I$). Larger general aviation aircraft tend to be pressurized and may have multiple turbine engines. Thus, larger general aviation aircraft are operated at significantly higher altitudes. Upon a loss of or reduction in propulsion, larger general aviation aircraft have an increased gliding distance and generally some propulsion. Thus, the loss of an engine generally requires descent and landing ($R_{P1}$). Commercial transport aircraft are certified under different standards and have required performance criteria making the continuation of a flight after the loss of an engine safer and less time critical ($R_{P2}$).

Military aircraft are generally designed to operate in extreme conditions at the boundaries of a broad flight envelope. In a hostile operating theater a damaged or failing aircraft may have few readily discernable options. In an operation of a military embodiment of the present invention, the apparatus may analyze aircraft and pilot performance in a threat theater and offer ALS risk analysis based upon identified options. For example, a wounded crew member, less than optimally performing pilot, a damaged aircraft, in an environment containing multiple threats (ground and/or air) will be greatly assisted by an embodiment of the present invention. As an embodiment of the present invention is notified of threat location and movement, aircraft and crew performance, mission plan, mission capabilities (changed or deteriorating), and position information, it may continuously display or point to a risk assessed option or set of options (e.g., mission abort, divert, egress direction). In highly critical situations an embodiment of the present invention may selectively execute a mission abort or selectively execute a return to base (RTB) where the crew is unresponsive. Additionally, such an embodiment of the present invention may be configured to transfer control of the aircraft to itself or ground (or wing) based control.

Figure 10:
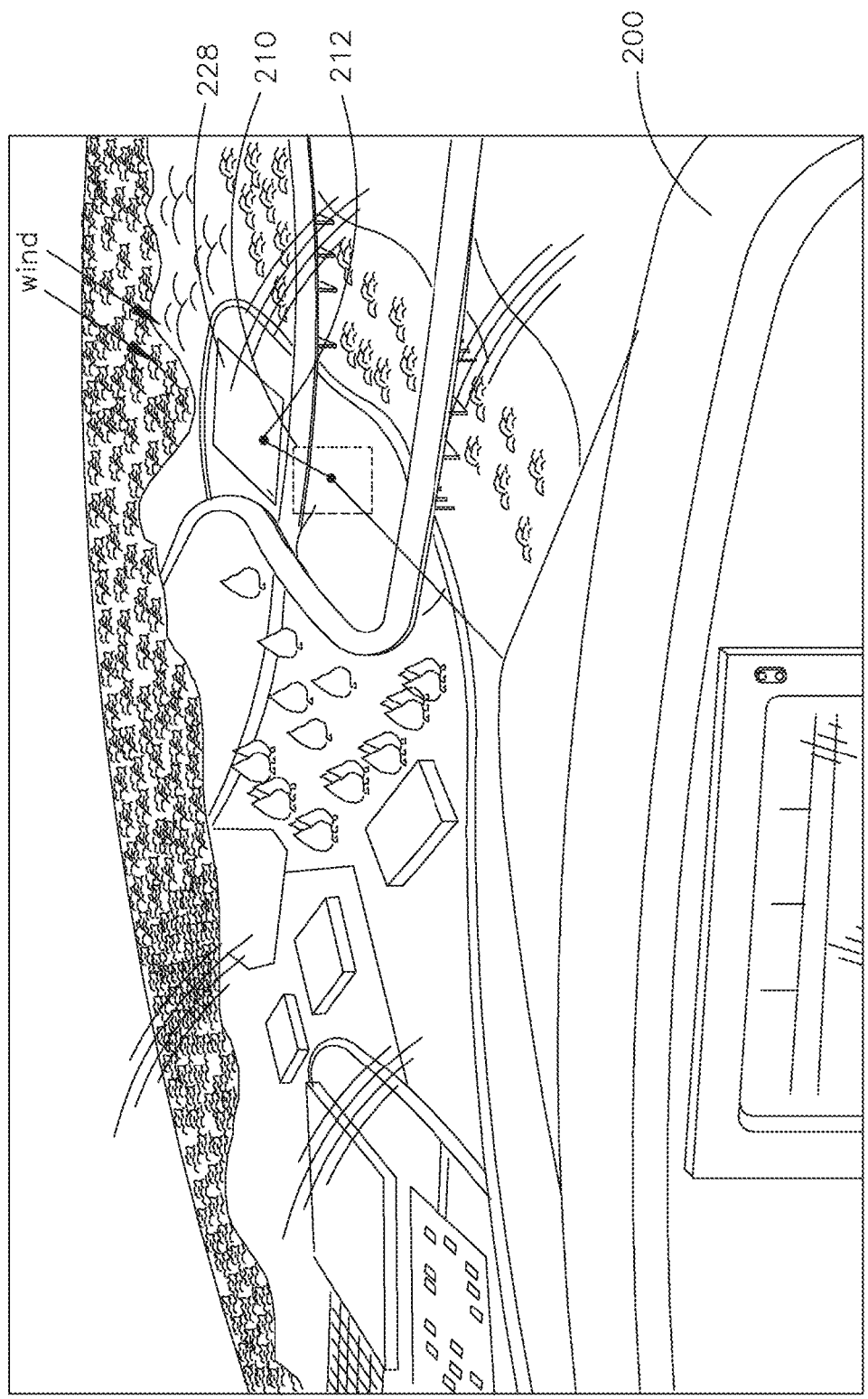
FIG. 10 is a perspective cockpit view of an embodiment of the present invention with a HUD (Heads Up Display) illustrating a suggested landing site selected by a system of the present invention (at least partially on aircraft and pilot performance, position, configuration, propulsion, traffic, weather, terrain, cabin environment, ground resources (services)), and preselected risk profile hierarchy.

FIG. 10 depicts aircraft 200 making an emergency landing in a suburban area. The system has selected field 228 (a relatively open area whose location allows the pilot to land into the wind) as the best available ALS, and the pilot has executed to divert. The projected window 210 represents the pilot's opportunity gate, assisting in targeting the near end of the ALS in order to maximize the available emergency landing space.

Figure 11:
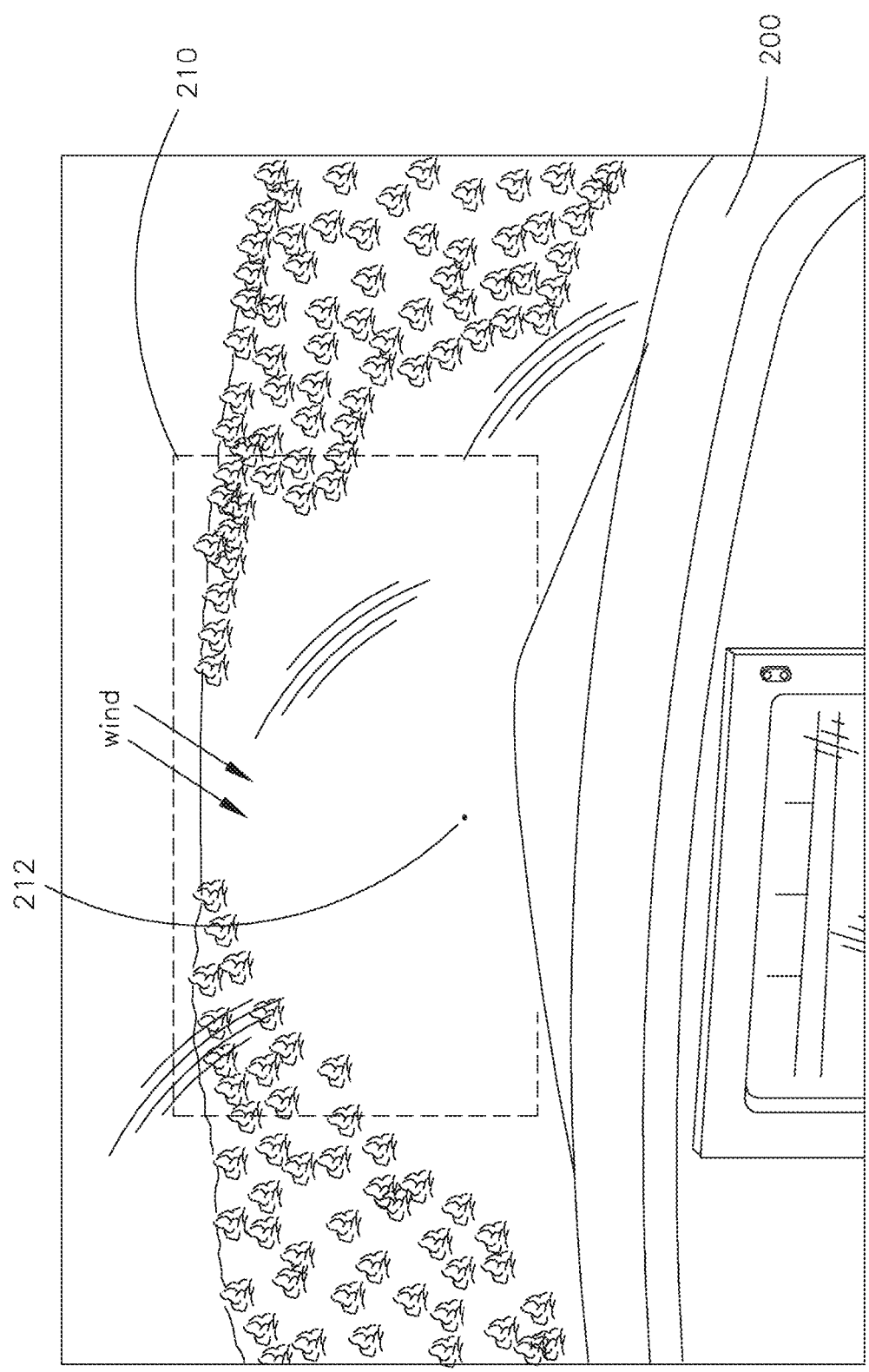
FIG. 11 is a perspective cockpit view of an embodiment of the present invention with a HUD (Heads Up Display) illustrating a suggested landing site selected by a system of the present invention at least partially on aircraft and pilot performance, position, configuration, propulsion, traffic, weather, terrain, cabin environment, ground resources (services), and a preselected risk profile hierarchy.

FIG. 11 depicts aircraft 200 continuing to land in the suburban area. The system has selected an ALS (consisting of an open area, relatively free of obstacles, with favorable winds) and identified an emergency touchdown point; the pilot has diverted to that ALS. Projected window 210 serves to assist the pilot in touching down in such a way as to maximize the available treeless area for landing.

Figure 12:
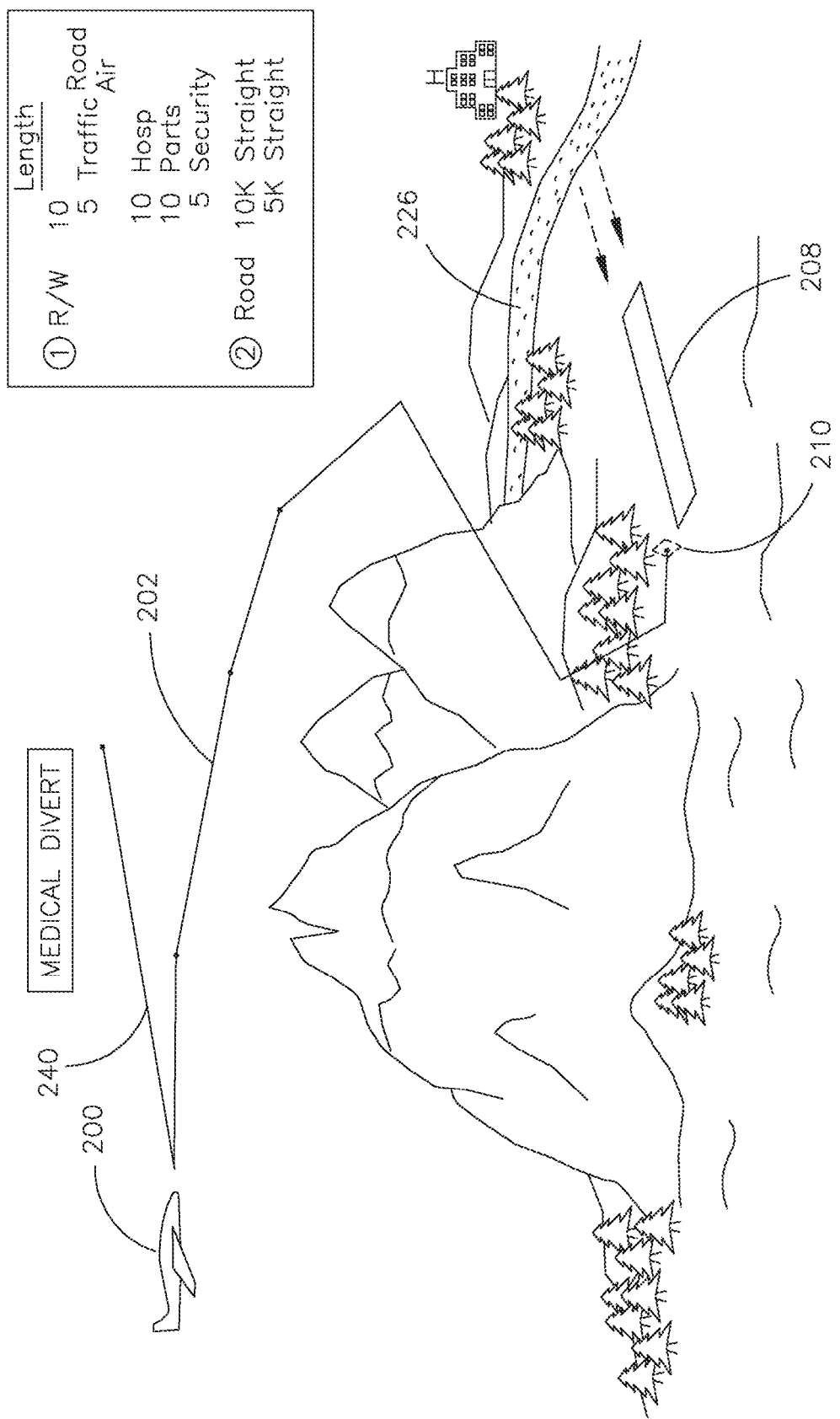
FIG. 12 is a highly diagrammatic perspective view of an emergency condition (medical divert) landing procedure overview with an associated queue wherein an embodiment of the present invention suggests a risk profile accessed emergency procedure set providing a landing procedure at an airport with suitable nearby medical facilities.

FIG. 12 depicts aircraft 200 in a medical-emergency state. After executing a divert from flight plan 240 to emergency course 202, aircraft 200 navigates to opportunity gate 210 to begin its final approach and land on runway 208, the best available ALS. In addition to runway 208, the system has evaluated nearby river 226 as a potential ALS. However, due to the fact that the medical emergency may require an $R_{P2}$ profile, river 226 may display on a lower level of the hierarchy. Note the presence of hospital facilities in close proximity to runway 208, and that aircraft 200's course enables landing into a headwind.

Figure 13:
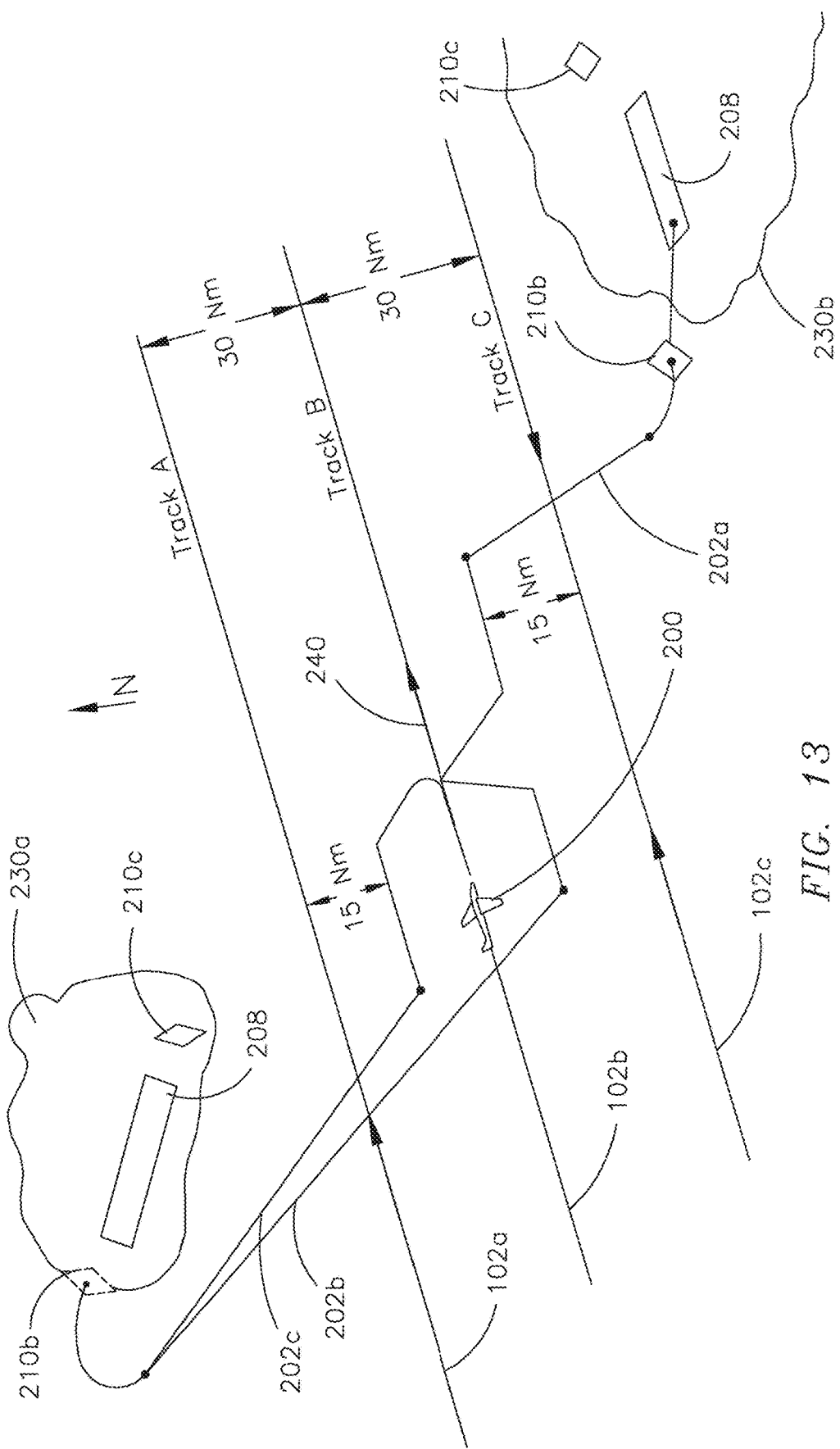
FIG. 13 is a highly diagrammatic perspective view of a landing procedure overview with an associated queue wherein an embodiment of the present invention suggests a risk profile accessed emergency procedure set providing for safe departure from the North Atlantic track route system and emergency landing at suitable nearby airports.

FIG. 13 depicts aircraft 200 inflight eastbound over the North Atlantic Ocean, along flight plan 240. In order to ensure aircraft separation in an area with high traffic and sporadic radar coverage, air traffic is directed along well-known parallel tracks 102a, 102b, and 102c, here depicted as 30 NM apart). Should aircraft 200 divert north to an ALS on island 230a, or south to an ALS on island 230b, the system may plot a course 202b, 202c) that first directs aircraft 200 parallel to track routes, maintaining a maximum distance of 15 NM from either adjacent track. Then, the system will allow aircraft 200 to exit the track system at an altitude safely below other aircraft.

Figure 14:
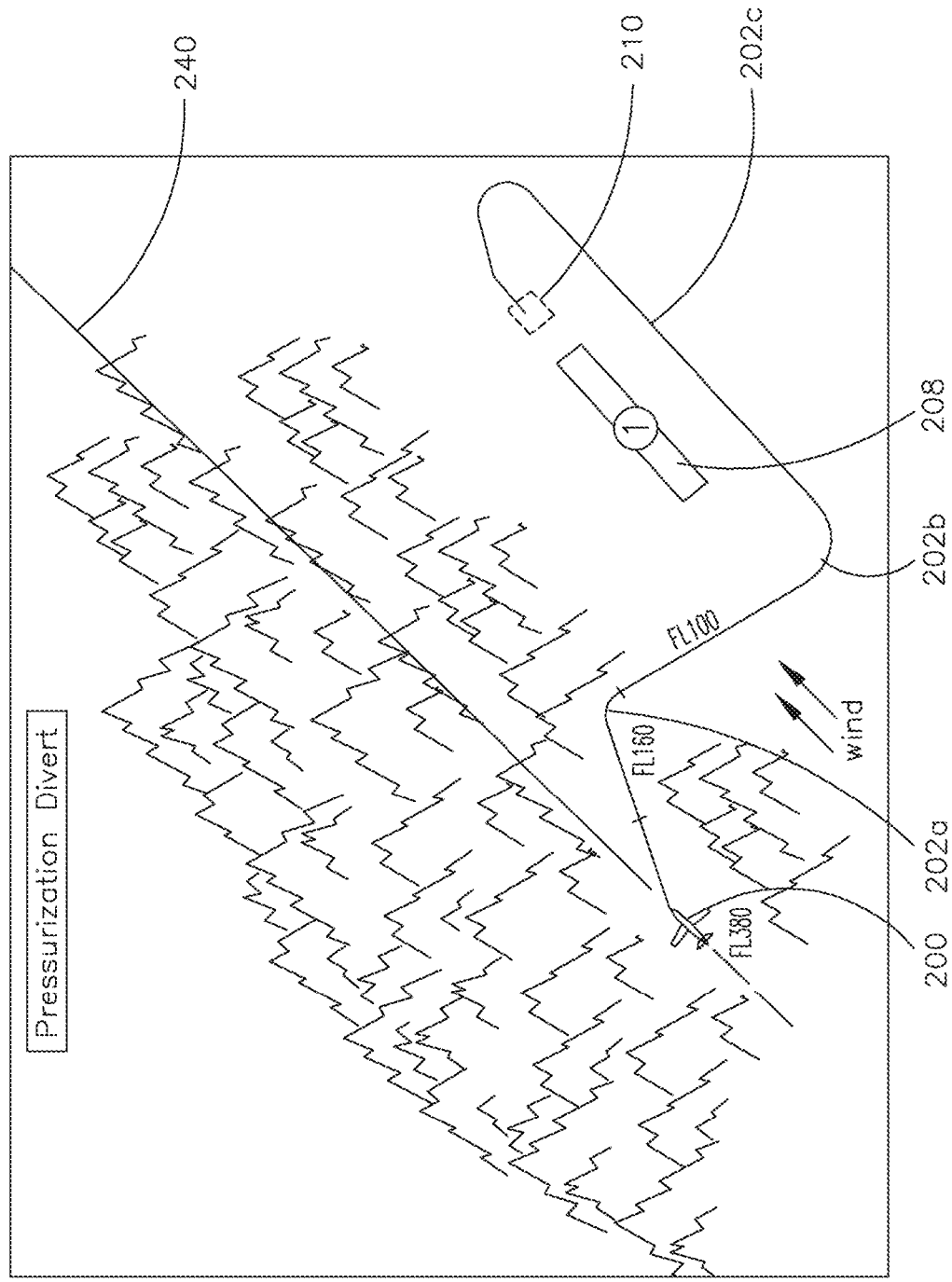
FIG. 14 is a highly diagrammatic perspective view of an emergency condition (pressurization emergency) forced landing procedure overview with an associated queue wherein an embodiment of the present invention suggests a risk profile accessed emergency procedure set providing for immediate descent to safe altitude and landing at the nearest available airport.

FIG. 14 depicts aircraft 200 in a pressure-emergency state, at cruising altitude (FL380="flight level 380"≈pressure altitude 38,000 ft) over mountainous terrain. In the event of a pressurization failure, aircraft 200 executes a diversion from initial flight plan 240. Aircraft 200's emergency path takes it through a mountain pass at FL160 (flight level 160≈16,000 ft, 202a). Once clear of mountainous terrain, aircraft 200 descends along path 202b to FL100 (flight level 100≈10,000 ft, 202b), at which altitude lack of pressure is no longer an immediate danger. Aircraft 200's emergency course then proceeds downwind 202c) to opportunity gate 210 for final approach and emergency landing on ALS 208, an airport runway.

Figure 15:
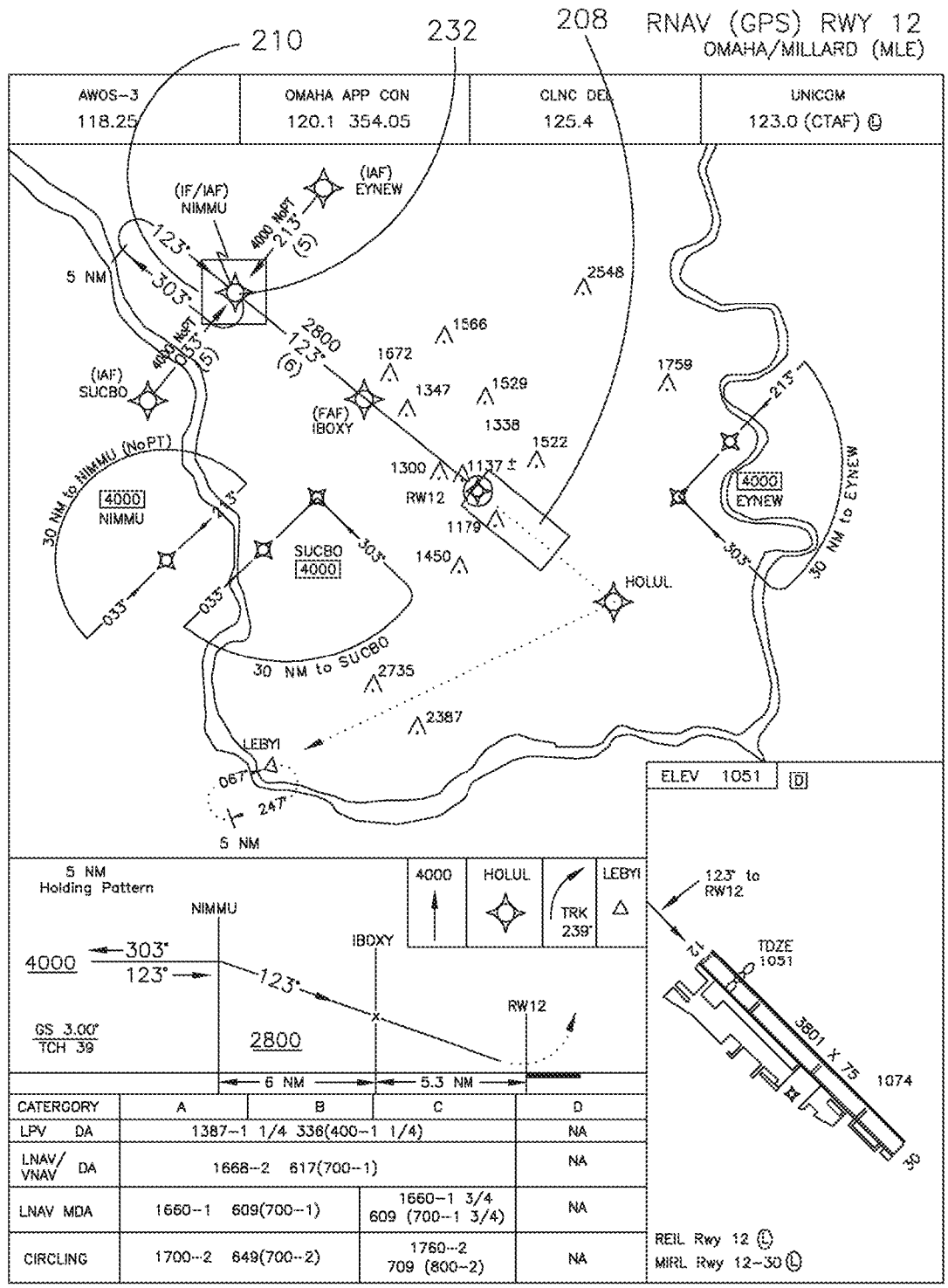
FIG. 15 is a pilot view of an onboard display unit wherein an embodiment of the present invention displays navigational information related to a final approach and landing.

FIG. 15 depicts RNAV navigational display information to aircraft 200 on approach to KMLE/Millard Airport, including navigational beacons and waypoints and nearby obstacles (and their elevations). Waypoint NIMMU serves as the initial approach fix 232 and opportunity gate 210 for final approach to land at KMLE Runway 12 208. Should aircraft 200 fly toward initial approach fix 232 in an incorrect configuration, the system may alert the pilot via display unit 700 of a suggested configuration change.

Figure 16:
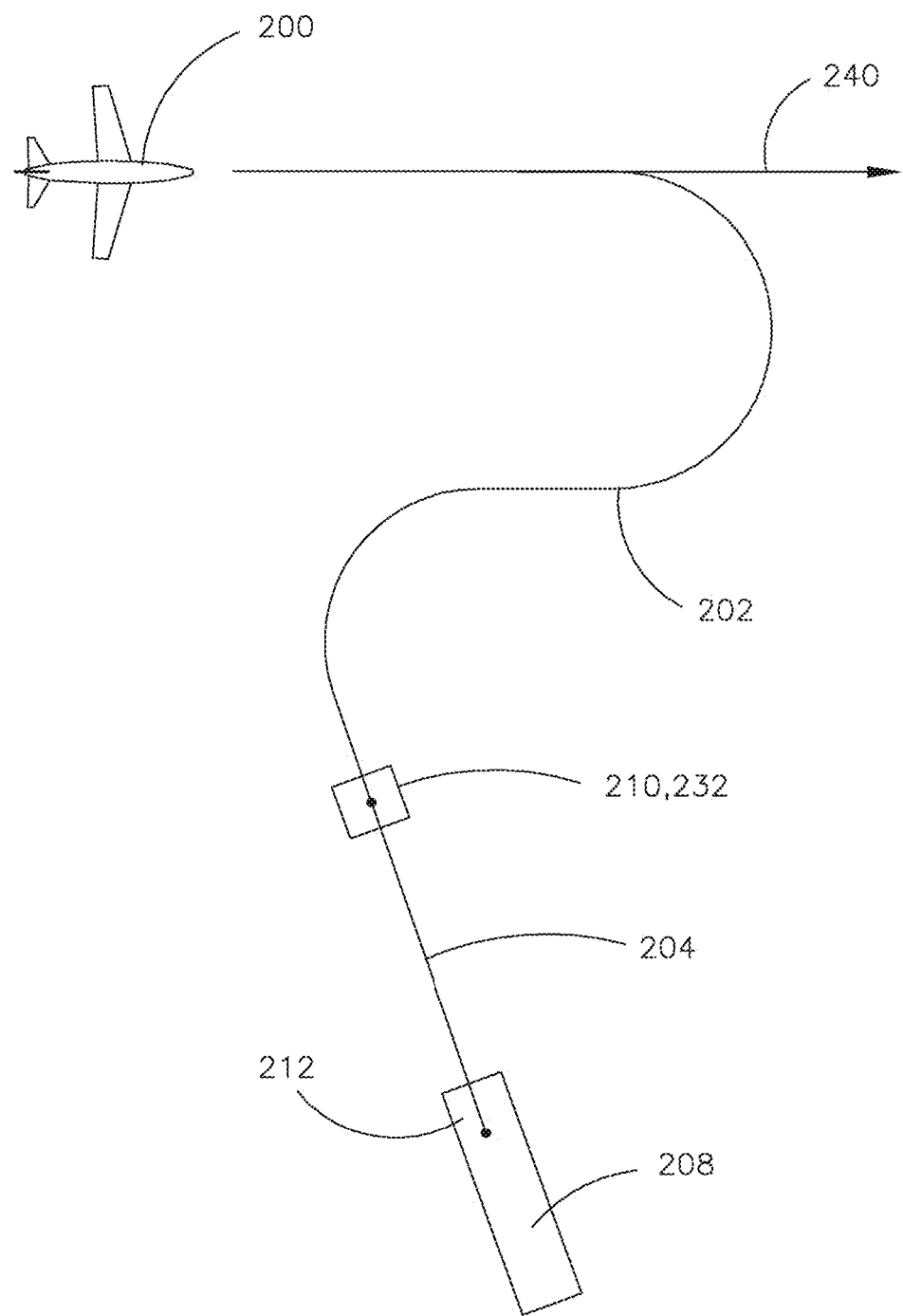
FIG. 16 is a highly diagrammatic top plan view of emergency condition landing procedure overview with an associated queue wherein an embodiment of the present invention suggests a risk profile accessed emergency procedure set providing a landing procedure at a nearby airport.

FIG. 16 depicts aircraft 200 diverting from its initial flight plan 240 to emergency path 202 (and executing the associated emergency procedure set). Emergency path 202 includes opportunity gate 210, which may also represent an initial approach fix 232 for final approach 204 to landing on runway 208; emergency path 202 provides for an obtainable (safe and desirable) touchdown point 212 on the portion of runway 208 nearest the position of aircraft 200 (in order to maximize available landing space).

In some embodiments of the present invention the pilot may, under emergency conditions, "divert" to a particular ALS by selecting the colored indicator displayed next to that ALS. Diverting to an ALS has several consequences. First, ground control may be immediately alerted of the diversion and of the pilot's intentions. Second, the pilot (or autopilot system, if active) may be directed to the selected ALS along the emergency course plotted by the system. Third, when the aircraft approaches the landing site, the heads-up display may project a virtual "window". This window may provide the pilot with a quick visual reference to use in approaching what may be an unfamiliar or unmarked site, and in targeting a touchdown point selected by the system to maximize the chance of a safe and normal landing. In the alternative, the system may suggest emergency procedures to the pilot, who may then accept and execute them in seriatim.

Figure 17A:
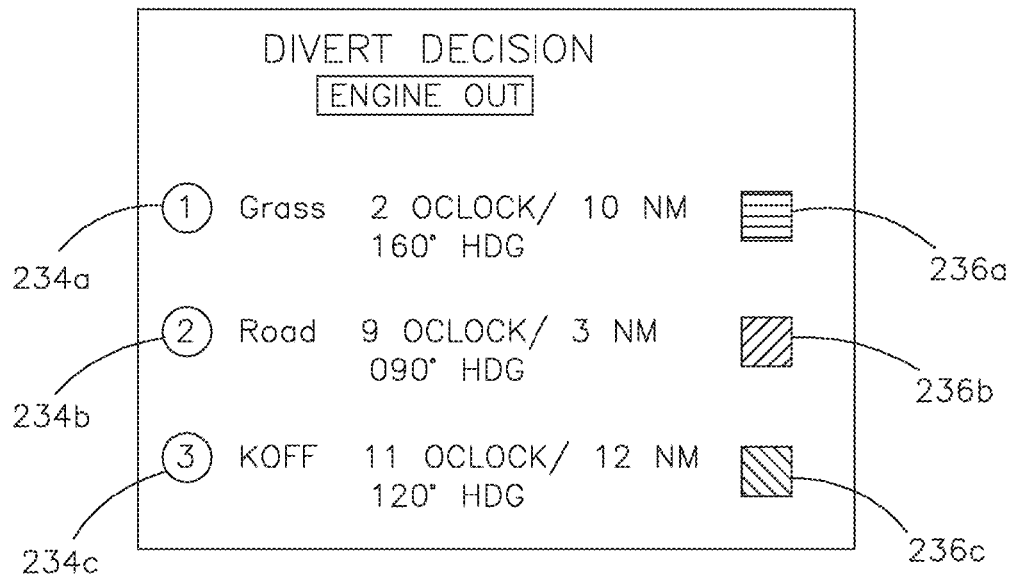
FIG. 17A is a pilot view of an onboard display unit in an emergency condition (engine out) diversion procedure overview with an associated queue wherein an embodiment of the present invention suggests a hierarchy of risk profile accessed emergency procedure sets providing for best safe landing opportunity procedures at suitable emergency landing sites.
Figure 17B:
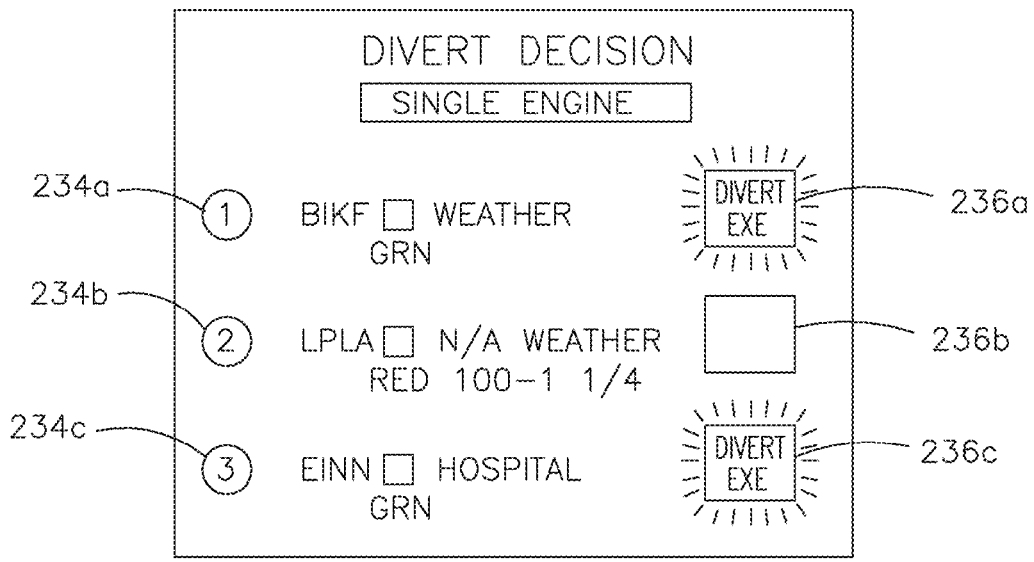
FIG. 17B is a pilot view of an onboard display unit in an emergency condition (single engine) diversion procedure overview with an associated queue wherein an embodiment of the present invention suggests a hierarchy of risk profile accessed emergency procedure sets providing for best safe landing opportunity procedure at suitable emergency landing sites, and the pilot may operatively select to accept and fly a suggested new (emergency) procedure set, or in the alternative to accept each item from said new procedure set in seriatim.

FIG. 17A and FIG. 17B depict embodiments of the present invention displaying onscreen divert options available to a pilot who has declared an inflight emergency state. The aircraft in FIG. 17A has declared an engine-out state over eastern Nebraska. Three potential alternative landing sites are indicated along with their distance, heading, and suitability status: a grass field, 234a (rated "green", 236a); a nearby road, 234b (rated "yellow", 236b); and KOFF/Offutt AFB, 234c (rated "red", 236c). The aircraft in FIG. 17B, inflight over the North Atlantic Ocean, has declared a single-engine state. Divert options are available to nearby emergency landing strips, along with their suitability color codes. The system has rated LPLA/Lajes Field 234b) "red" (236b) on account of adverse weather. However, divert options to either BIKF/Keflavik AFB 234a or EINN/Shannon Airport 234c—near which hospital facilities are found—are rated "green" (236a and 236c respectively) and available to the pilot by selecting the "DIVERT" indicator. In the alternative, the pilot may accept each component of the emergency divert procedure set in seriatim, manually changing heading (queuing configuration changes), contacting ground control, and so forth.

A display of the present invention may preferably indicate possible options to the pilot. The peace of mind of knowing one has "green" runway options available may offer the pilot valuable choices. As an aircraft leaves a runway at takeoff, all ALS options are red. As the aircraft climbs, ALS options turn green as they become viable $R_I$ options. With all options red, the pilot has limited options: eject or activate the airframe chute. As landing options turn green, the pilot has options from which to choose to safely land.

| Color Indicator/s | Options |
| --- | --- |
| ALL RED | EJECT/CHUTE/DITCH |
| 1 GREEN | LAND |
| 2+ GREEN | CHOICE & LAND |

An aircraft may encounter emergency conditions inflight that require diversion from the initial flight path. Conditions may require a precautionary landing (if further flight is possible but inadvisable), a forced landing (if further flight is not possible), or an emergency landing on water (generally referred to as a "ditching"). Emergencies may also dramatically reduce the time frame within which such a landing must occur. Emergency conditions may include: the failure of one or more engines (single-engine, aux-engine, or engine-out states); the failure of pitot/static, electrical, hydraulic, communications, or other onboard systems; a rapid decompression or other pressurization emergency; a medical emergency; an onboard fire; or an attempted hijacking (or similar security threat).

System input in the event of an emergency may be simplified to minimize demands on the pilot's attention and time. Should an emergency occur, the pilot may select from a menu of emergency states and "declare" the relevant emergency by selecting that state ($R_{P2}$, $R_{P1}$, $R_I$). Declaring an emergency state results in two immediate consequences. First, the system parameters for selecting an ALS may change depending on the specific emergency. Second, the pilot may be given the option to divert from the initial flight path to an ALS. The "divert" option represents an emergency procedure set ascertained/suggested by the system; in the alternative, the pilot may maintain manual control and accept each item of the emergency procedure set in seriatim (from a list, a flight director (with a queue key (scroll switch) or the like)).

When an emergency state has been declared and the "divert" option is available to the pilot, the hierarchical list of potential alternative landing sites (weighted according to their suitability as an ALS) may be displayed using a green/yellow/red color scheme. The most suitable landing sites (those closest to current position (for example), or with favorable surface and/or wind conditions, easily navigated headings, or nearby services) may be marked "green". "Yellow" sites may be acceptable for an emergency landing, but conditions there may be less than ideal (e.g., ground traffic, uneven landing surface, crosswinds, obstacles). A site rated "red" is contraindicated as an ALS. Pertinent information about each potential "divert" destination (e.g., airport designation if any, surface conditions, other information relating to the site assessment) may be displayed along with its distance, heading, and color indication. In addition, should an aircraft be on one of the selected profiles ($R_{P2}$, $R_{P1}$, $R_I$) the system may continue to update possible ALS data if conditions change. For example, an aircraft is flying an $R_{P2}$ profile and all engines fail. In this condition, the pilot may select and/or execute the $R_I$ profile, allowing for safe forced landing at the selected ALS.

Figure 18:
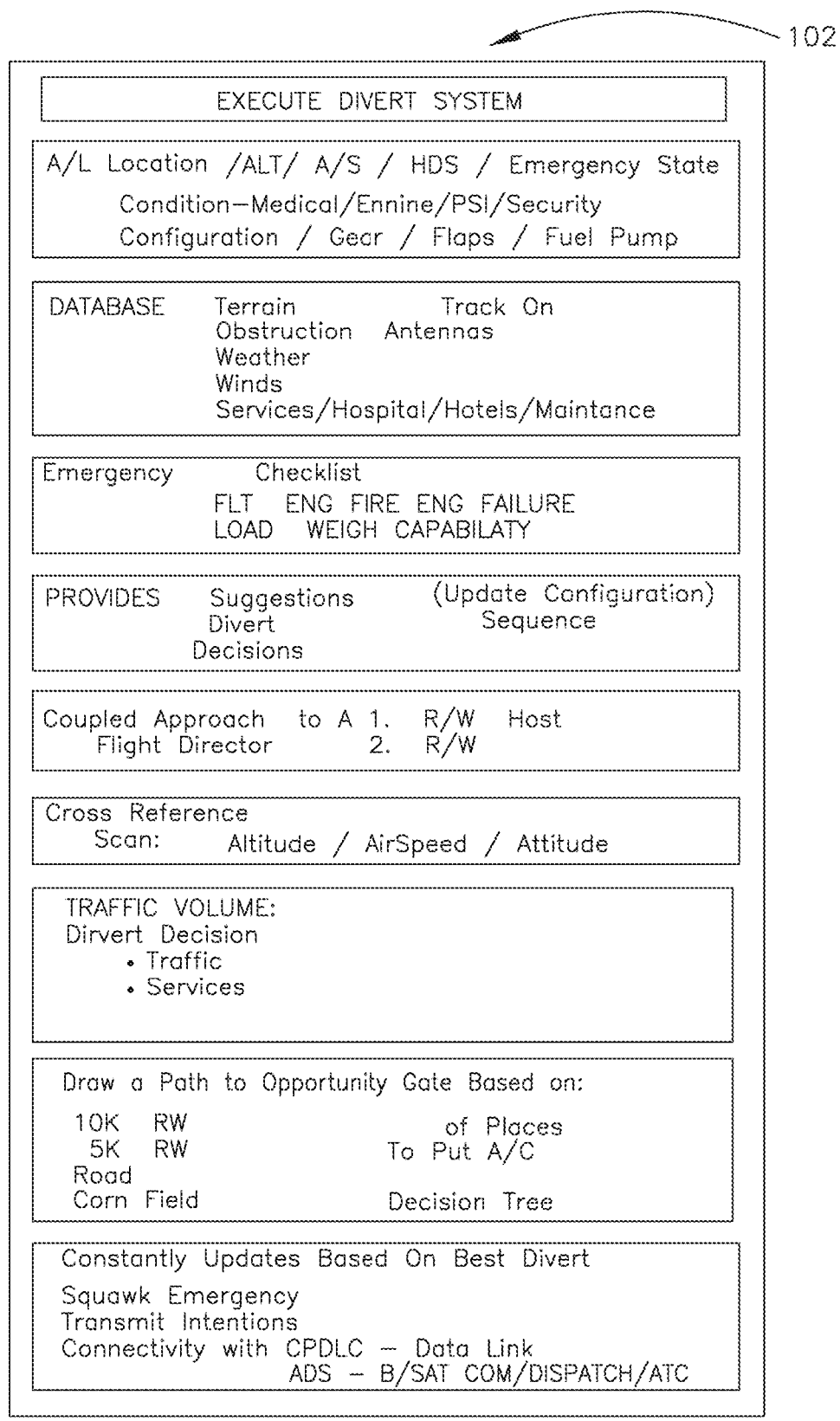
FIG. 18 is a tabular representation of data inputs utilized by an embodiment of the present invention to generate procedure sets, and actions related to the generation of procedure sets and to the outcomes of those procedure sets.

FIG. 18 represents the datasets and components that inform the system's selection of best available alternative landing sites and corresponding emergency procedure sets: the aircraft's airspeed, location, condition and configuration; current data on terrain and obstacles (natural and manmade), weather systems, winds, and ground services; available emergency states; available decision trees and courses of action (automatic diverts vs. manual decisions in sequence); coupled approaches to identified runways and landing sites; cross-referencing for airspeed/altitude/attitude; current data about local air traffic; glide potential; obtainable descent profiles; and factors influencing the selection of emergency courses and opportunity gates such as the length of runway, road or field required for landing; and other actions to be taken in the event of a divert such as transmitting intentions, squawking emergency, and maintaining contact with ground control (dispatch/ATC) and other authorities.

Figure 19A:
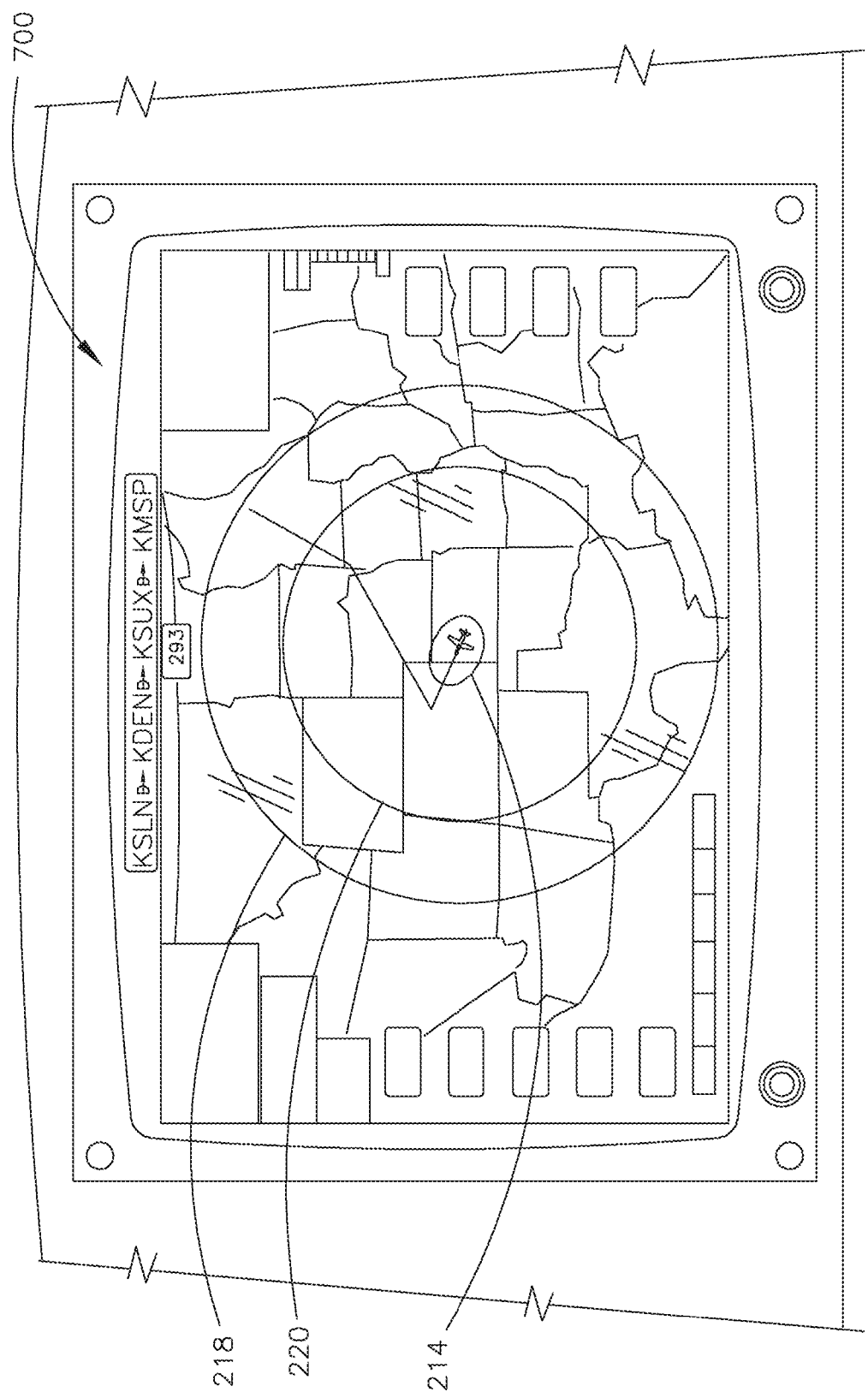
FIG. 19A is a pilot view of an onboard display unit wherein an embodiment of the present invention displays the initial flight plan and illustrates initial areas for landing (ditching) opportunities (target radii) available upon a particular condition.
Figure 19B:
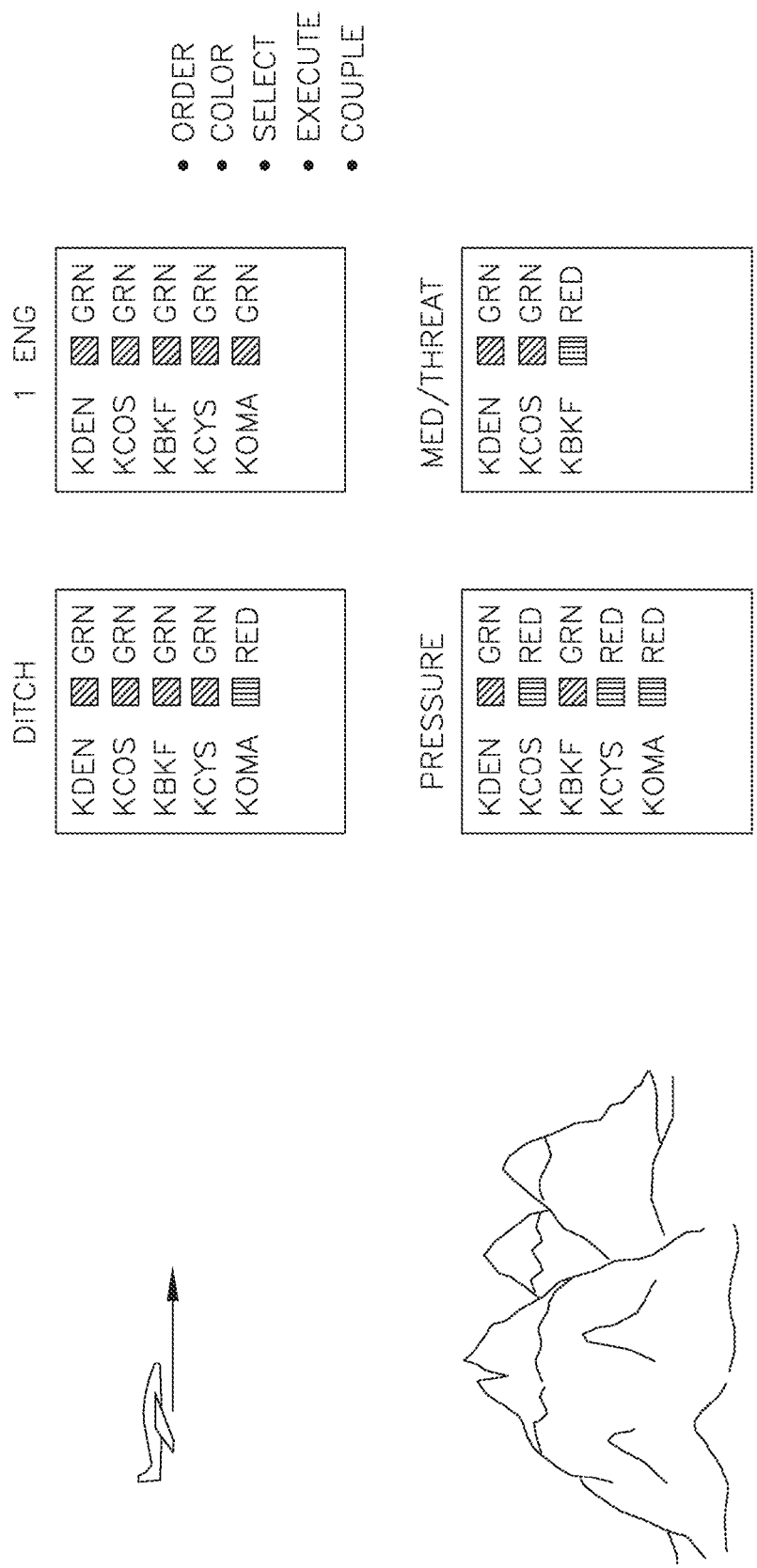
FIG. 19B is a highly diagrammatic perspective view of an emergency condition diversion and landing procedure overview with an associated queue wherein an embodiment of the present invention suggests a hierarchy of risk profile accessed emergency procedure sets (the precise procedure set/s, and the hierarchical weight of each set, being dependent on the specific nature of the emergency) providing a best safe landing (ditching) opportunity procedure.

FIG. 19B depicts an aircraft inflight over the Colorado Front Range; nearby fields suitable for landing are KDEN/Denver, KCOS/Colorado Springs, KBKF/Buckley AFB (Aurora, Colo.), KCYS/Cheyenne, and KOMA/Eppley (Omaha). If an emergency state is declared, available divert options may vary depending on the specific emergency. If $R_I$, a land-immediately or "ditch" state, is declared KOMA is rated "red" due to its extreme distance. If the aircraft is in $R_{P1}$, a single-engine state ("1 ENG") KOMA may not be ruled out if it would be feasible to reach that destination safely and without incident. If a medical emergency is declared, however, landing is a more imminent priority and the system's target radius therefore narrows considerably. Only KDEN and KBKF are rated "green" due to their proximity and services. Finally, if a medical or threat emergency is declared both KOMA and KCYS are disregarded due to distance, KDEN and KCOS are both rated "green" as a suitable ALS, while KBKF is assessed and rated "red" despite its proximity due to lack of appropriate facilities.

Figure 20:
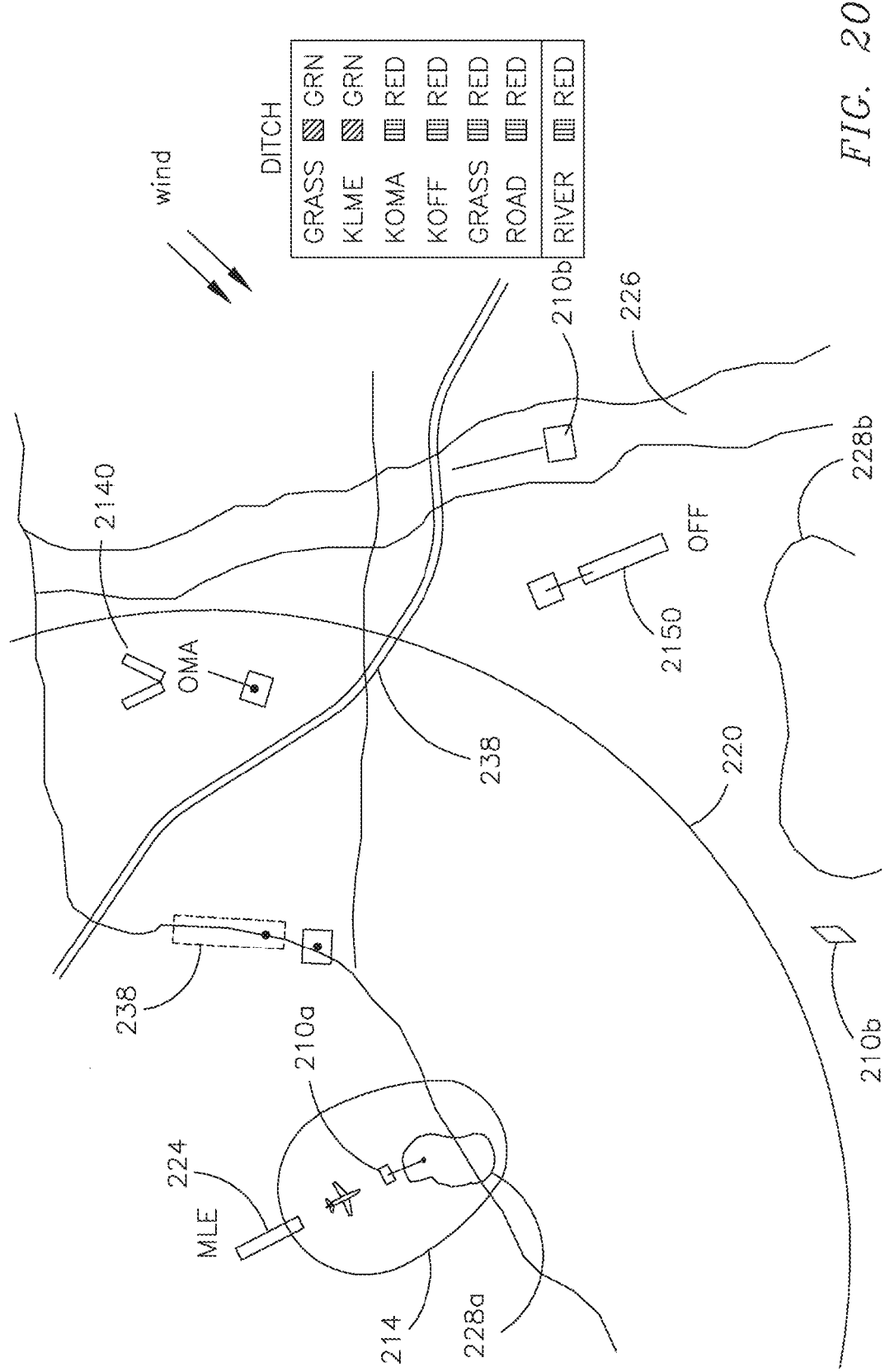
FIG. 20 is a highly diagrammatic top plan view of an emergency condition (engine failure at takeoff) overview with an associated queue wherein an embodiment of the present invention suggests a hierarchy of risk profile accessed emergency procedure sets providing a best safe landing (ditching) opportunity procedure.

FIG. 20 depicts aircraft 200 in $R_I$, a land-immediately or "ditch" state, having experienced engine failure immediately after takeoff from originating airport KMLE/Millard, NE 224. Several alternative landing sites have been evaluated, but most have been rated "red" due to their distance: KOMA/Eppley 2140, KOFF/Offutt AFB 2130, Interstate 680 238 (indicated by the system display as ROAD), a large field south-southwest of Offutt AFB 228b (indicated as GRASS), and the Missouri River 226 (indicated as RIVER). Within $R_I$ range 214, however, are two options rated "green": a field 228a directly ahead (opportunity gate 210a) and originating airport 224. Field 228a, however, is given higher priority than airport 224 as an ALS.

While returning aircraft 200 to the originating airport might appear to be the obvious emergency landing option in the event of engine failure, circumstances often indicate otherwise. Depending on aircraft 200's airspeed and altitude, as well as the experience and reaction time of its pilot (among many other considerations), executing a turn in excess of 180° back to originating airport 224 while in glide descent (the excess being necessary to realign the aircraft with the runway) may not be the safest available option. In FIG. 20, a field directly ahead of aircraft 200's position serves as a suitable, and safely reachable, ALS. If otherwise unfamiliar with the local terrain, aircraft 200's pilot may not have considered a landing in the field, instead attempting to return to originating airport 224 at considerable risk.

Figure 21:
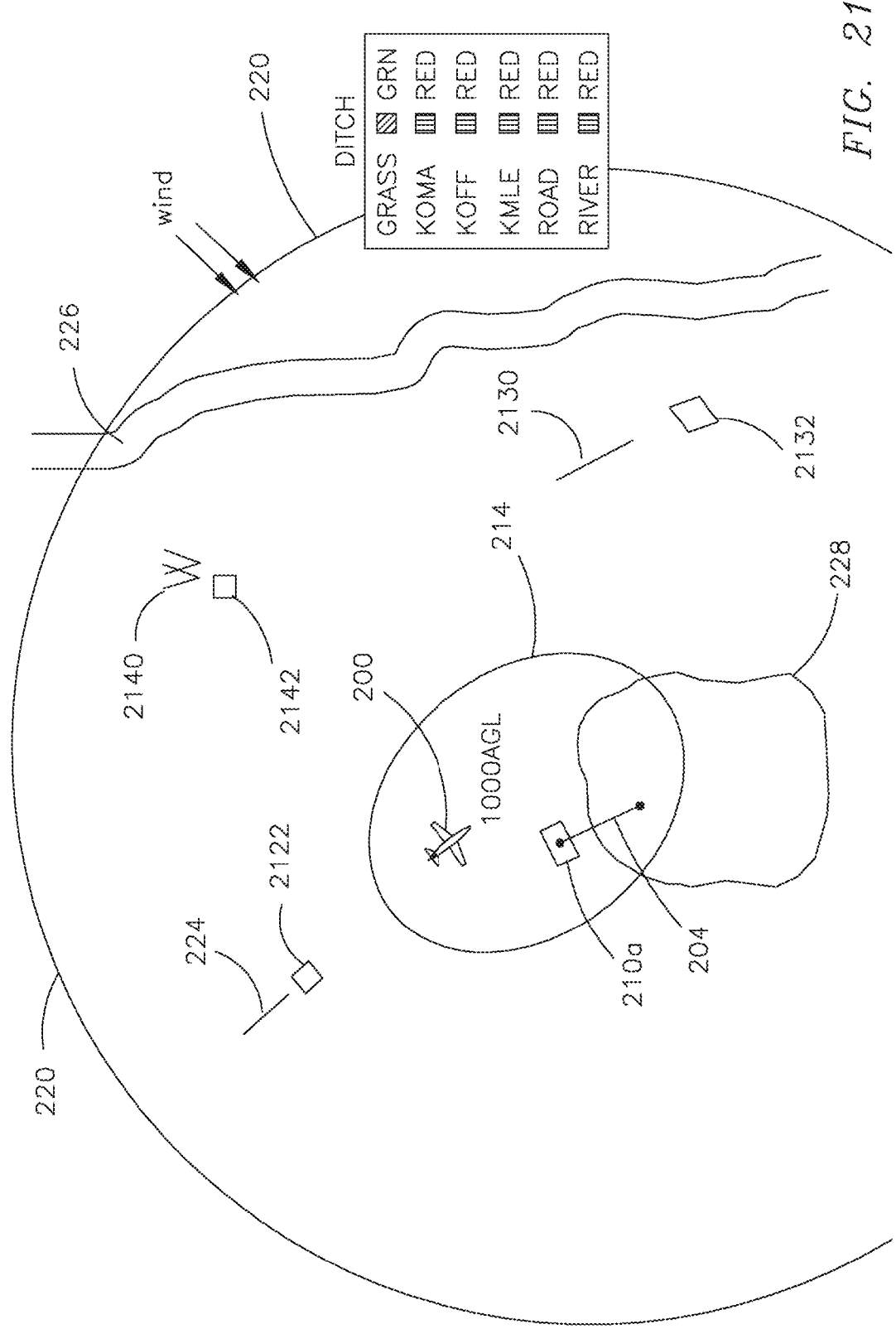
FIG. 21 is a highly diagrammatic top plan view of an emergency condition (engine failure at takeoff) overview with an associated queue wherein an embodiment of the present invention suggests a hierarchy of risk profile accessed emergency procedure sets providing a best safe landing (ditching) opportunity procedure.

Similar to FIG. 20, FIG. 21 depicts aircraft 200 in a land-immediately ("ditch") state at 1,000 feet above ground level (AGL). Multiple landing sites fall within aircraft 200's $R_{P1}$ radius 220, some of them airport runways: originating airport KMLE/Millard 224, opportunity gate 2122; KOMA/Eppley 2140, opportunity gate 2142; KOFF/Offutt 2130, opportunity gate 2132; and the Missouri River 226. Only one site, however, lies within $R_I$ radius 214: open field 228 (indicated as "GRASS") at a roughly 1 o'clock heading relative to aircraft 200. Therefore field 228 has been rated "green" as an ALS (opportunity gate 210a, final approach 204). Because hard-surface runways are available, the system may not display river 226 as an option.

Figure 22:
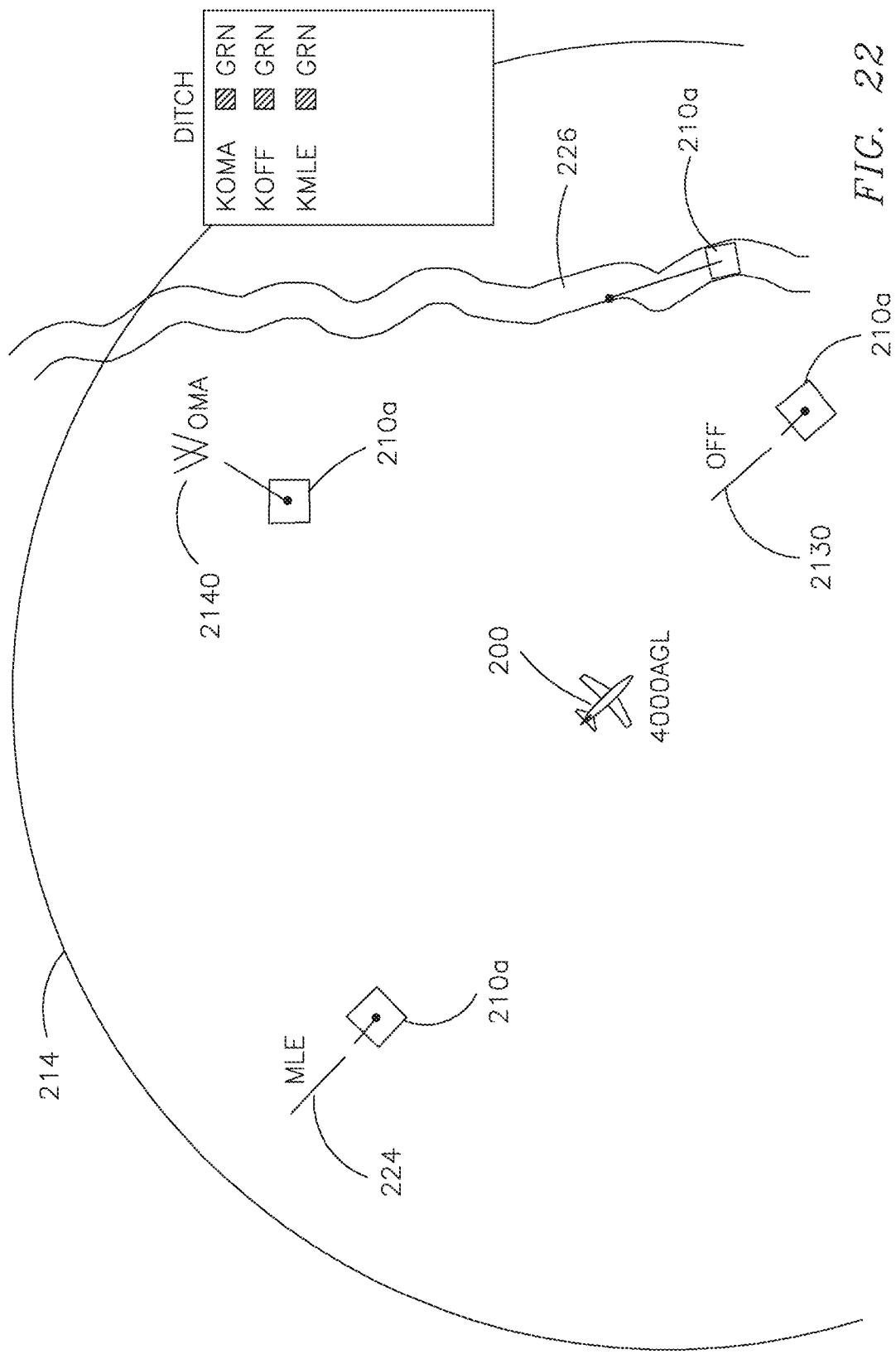
FIG. 22 is a highly diagrammatic top plan view of an emergency condition (engine failure at initial climb) overview with an associated display queue wherein an embodiment of the present invention suggests a hierarchy of risk profile accessed emergency procedure sets providing a return to airport (re-land) opportunity procedure.

FIG. 22 depicts aircraft 200 in a land-immediately ("ditch") state, but at 4,000 feet AGL. At this higher altitude, an ALS that might not have been within 200's glide range at 1,000 feet may now be safely reachable. Therefore aircraft 200's land-immediately radius 222 now includes originating airport KMLE/Millard 224 (opportunity gate 210a), KOFF/Offutt 2130, KOMA/Eppley 2140, and the Missouri River 226. All three airports are rated "green" as an ALS.

Figure 23:
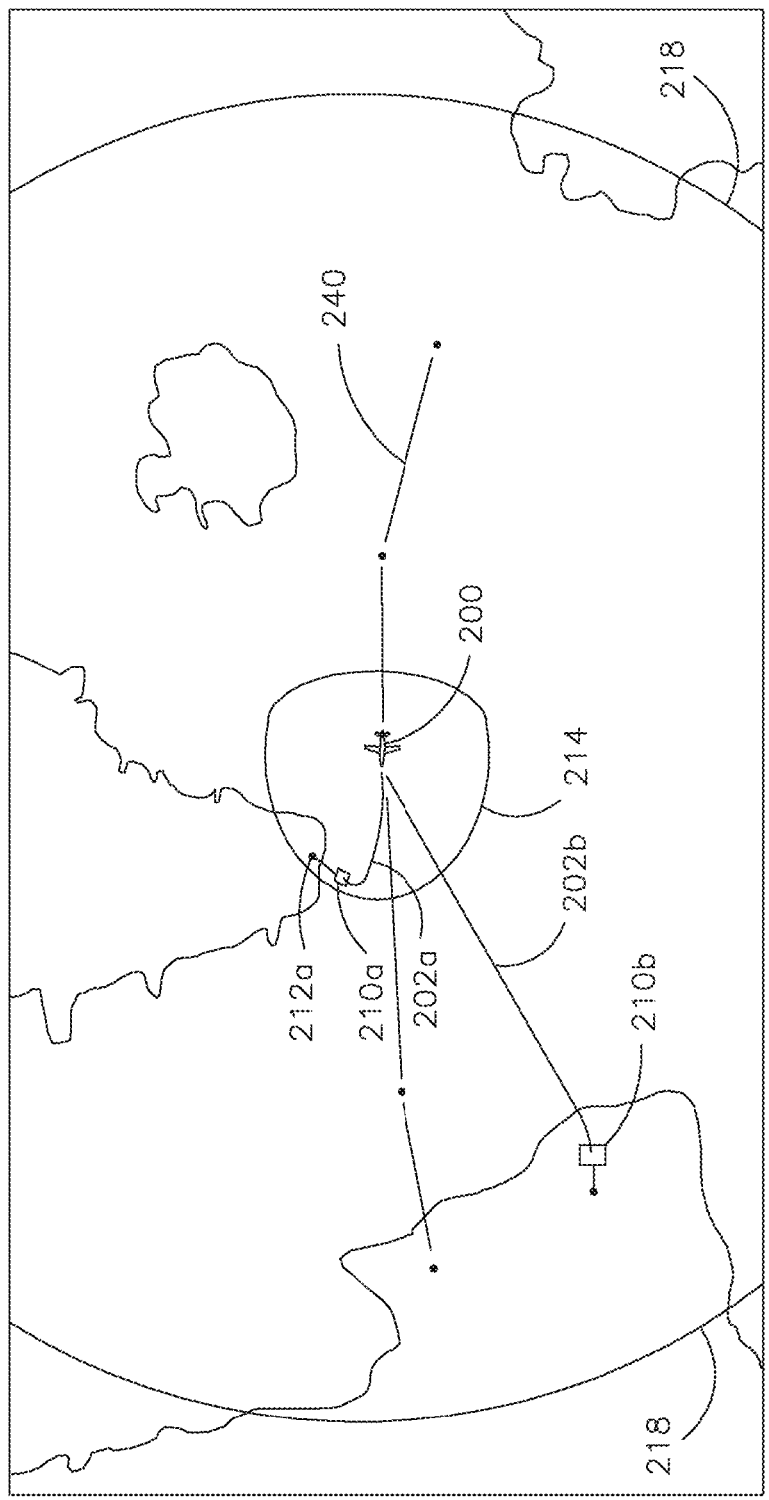
FIG. 23 is a highly diagrammatic top plan view of an embodiment of the present invention illustrating areas of landing (ditching) opportunities (target radius) available upon a particular condition, wherein the pilot may operatively select to accept and fly a suggested new (emergency) procedure set, or in the alternative to accept each item from said new procedure set in seriatim.

FIG. 23 depicts aircraft 200 in-flight westbound over the North Atlantic Ocean. In-flight under normal transatlantic conditions via course 240, the system may search broadly for an ALS within target radius 218, reflecting a need to land only when practicable. Here, the $R_{P2}$, and $R_{P1}$, values may be equal indicating a similar range between an all engines range and a single engine range. Within target radius 218, the system has identified an ALS in Greenland along path/procedure set 202a to opportunity gate 210a and touchdown point 212a, and an ALS in Labrador along path/procedure set 202b to opportunity gate 210b. Should aircraft 200 declare an engine-out state, however, the search radius narrows to $R_I$, or target radius 214, reflecting an immediate need to land. As the Greenland ALS lies within the engine-out radius, it may be the only option available in an engine-out situation.

Figure 24:
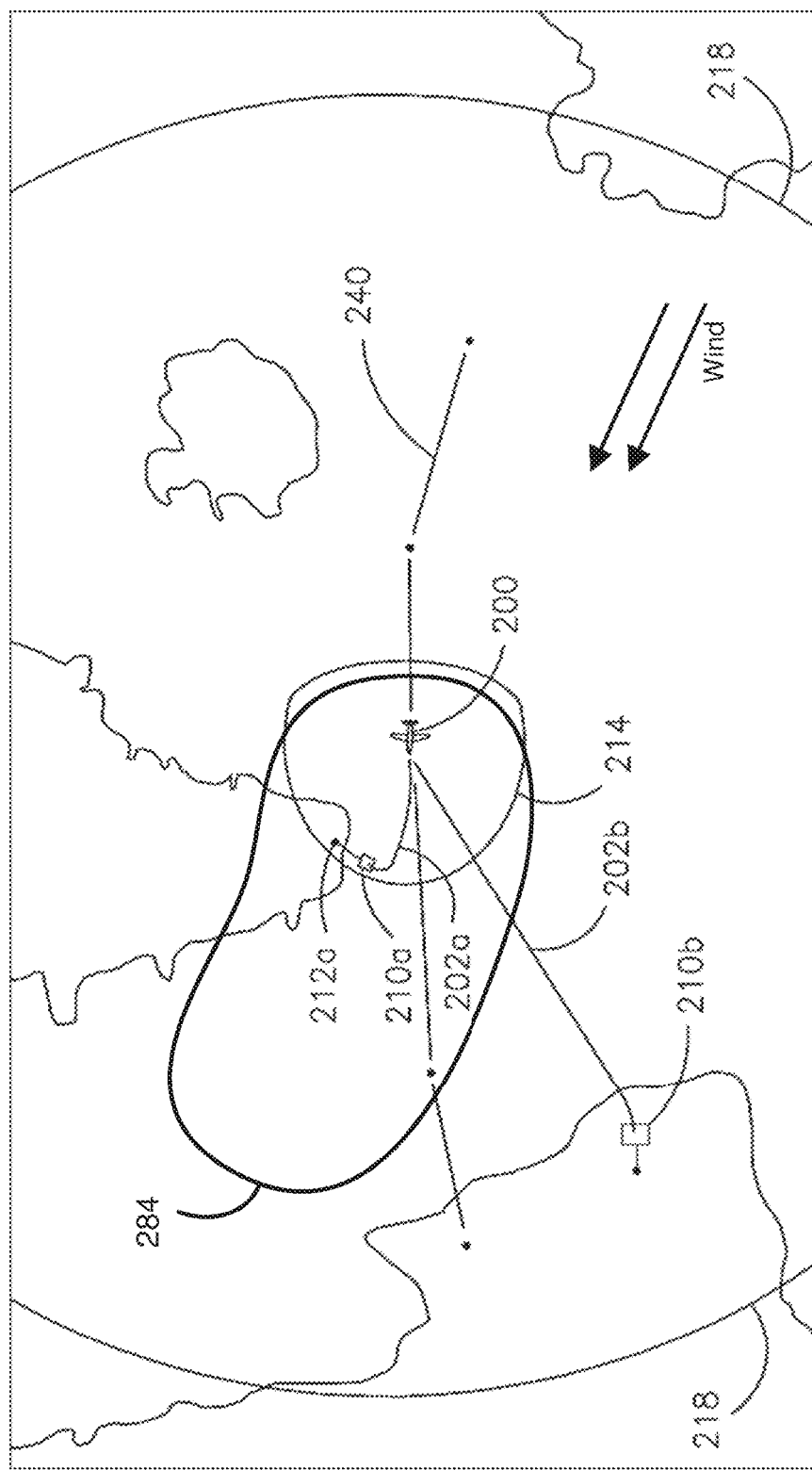
FIG. 24 is a highly diagrammatic top plan view of an embodiment of the present invention illustrating areas of landing (ditching) opportunities (target radius) available corrected for wind.

FIG. 24 depicts aircraft 200 in westbound over the North Atlantic Ocean. System 300 has corrected the $R_f$, or target radius 284 for wind making a larger range possible for aircraft 200 to reach an ALS.

Figure 25:
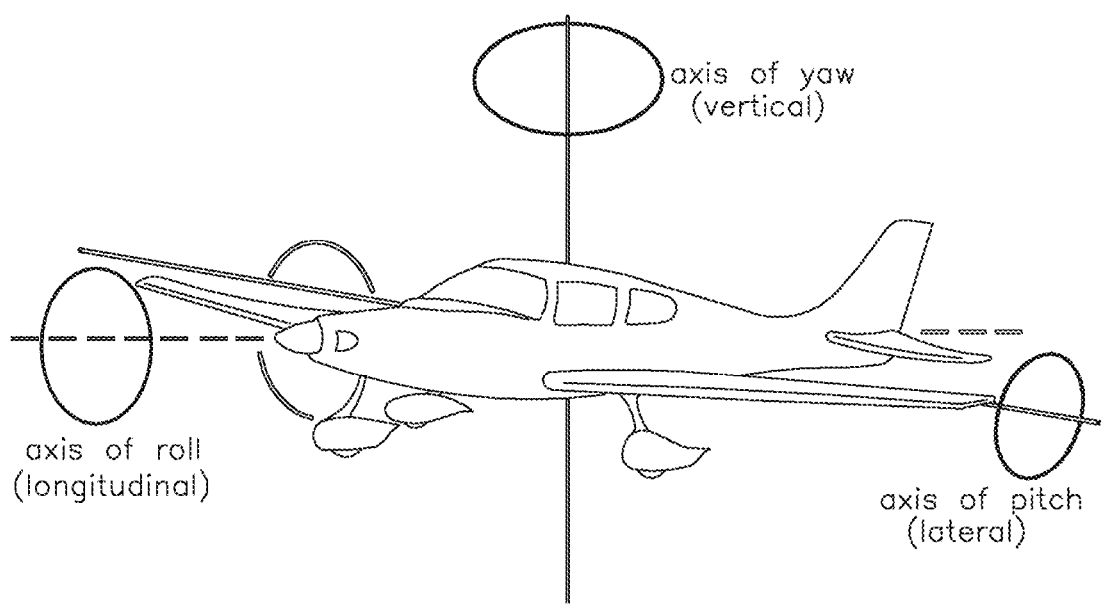
FIG. 25 is a diagram illustrating angle of attack and rotational axes.

FIG. 25 diagrammatically depicts the various axes of rotation of an aircraft, which together produce a particular angle of attack into the relative wind. Flight control surface position selected via pilot or autopilot inputs largely dictate angle of attack. Aircraft airspeed is at least partially selectable by angle of attack and aircraft configuration. Power settings in combination with pitch and configuration control altitude and airspeed. Thus, in operation of a preferred embodiment of the present invention, a particular aircraft configuration is desired for each of the various segments of flight, generally, taxi, takeoff, climb, cruise, descent, approach, landing, and the like. Each model (type) of aircraft has known flight performance characteristics in a particular configuration within a particular flight (operational) segment. The present invention utilizes a lookup table (register or the like) extracted from the dataset, containing these aircraft performance characteristics for comparison with current or realized characteristics 540 against expected (most likely desired) flight segment characteristics (given weather, traffic, routing, and the like).

Figure 26:
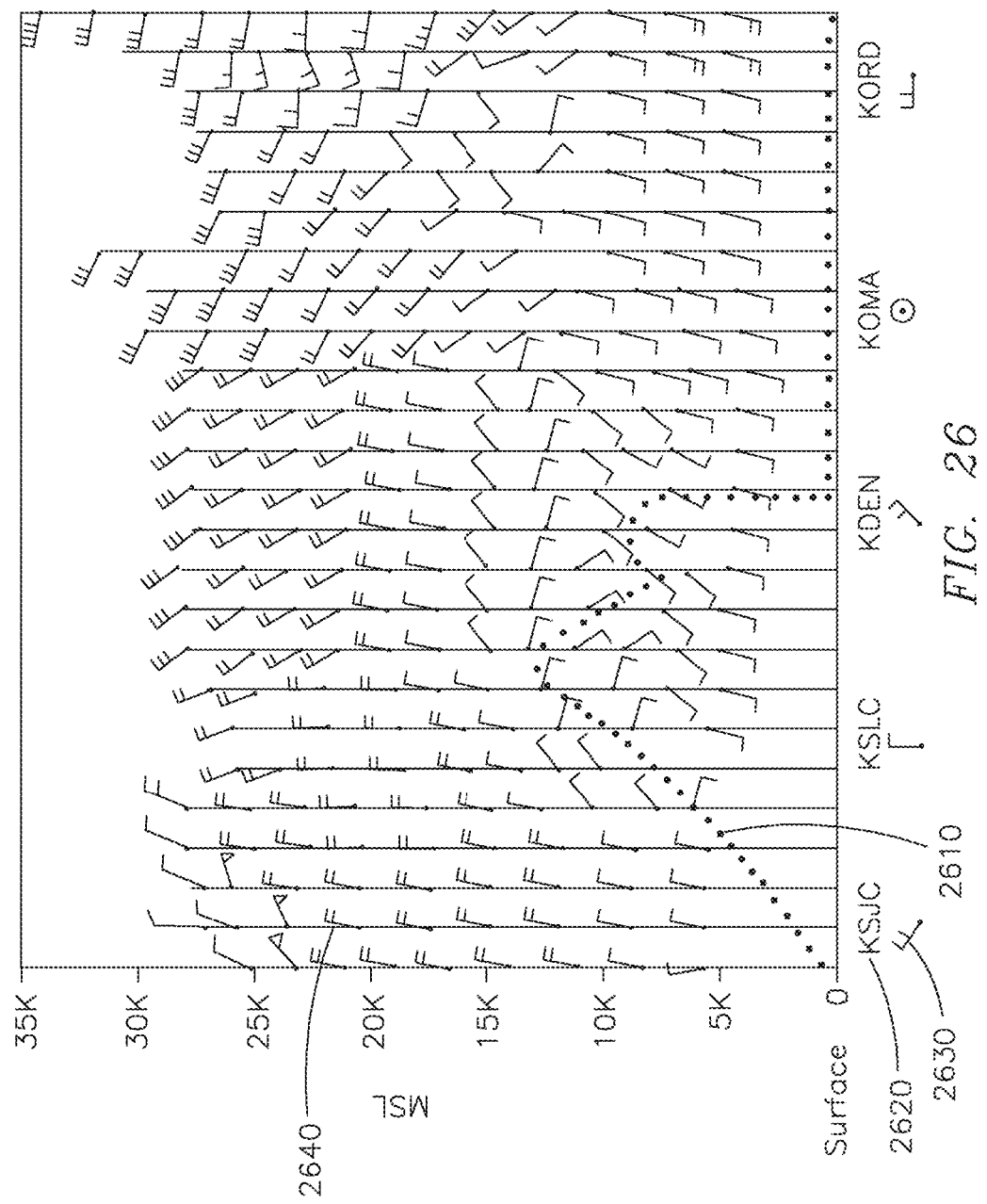
FIG. 26 is a graph illustrating surface and aloft winds at selected altitudes along a flight plan.

FIG. 26 depicts how wind speeds and headings can vary dramatically along a flight plan, and at a single geographic location, depending upon the altitude. The dotted line 2610 depicts a flight from KSJC/San Jose 2620 to KSLC/Salt Lake City to KDEN/Denver. A weather report might describe the wind as 10 knots from the northwest (300°) at KJSC 2630, 5 knots from the north (360°) at KJSC, and 10 knots from the northeast (60°) at KDEN. At any given altitude 2640 over any of these points, however, the reported wind direction and speed may not be accurately represented or forecast. The apparatus of the present invention may be preferably programmed/set for offsetting the variability of forecasts and/or moderating the display based upon most likely (worst case) conditions.

FIG. 27 depicts a hypothetical dataset display utilized/presented by the system to catalog available services (hospital, lodging, security, maintenance, and the like) and approach procedures for various airports, ALS's, and other pertinent locations. For example, at KAIA/Alliance Municipal Airport, hospital services and police are nearby, and a broad variety of instrument approach procedures are available, including RNAV, VOR, ILS, and LOC/DME.

In the context of embodiments of the present invention configuration and configured mean (1) the position of the aircraft relative to an expected position, (2) the attitude of the aircraft relative to an expected attitude, and (3) the position of controllable members and settings (e.g., gear, flaps, elevator, rudder, ailerons, spoilers, throttle(s), selection of navigation/communication frequencies, and the like) relative to expected settings. A flight plan may be described as a series of scalars describing the vector of an aircraft from one location to another (gate-to-gate, hanger-to-ramp, runway to runway, and the like). The vector describing this path will be altered in operation by, for example: (1) ATC (altitude changes, course changes, airspeed restrictions, arrival and departures, traffic, and holds or the like), (2) weather (deviations around, ground speeds, turbulence, and the like), and (3) pilot and aircraft performance. In an embodiment, system experience with a particular pilot or leg may be stored, compared, and made part of an analysis in determining what constitutes a departure from an expected vector (path). Deviation from what is expected may be tolerance dependent. For example, on takeoff, climb out, approach, and landing, system sensitivity to a deviation may be higher. Deviations resulting from ATC or weather may be ascertained, for example, by ATC communication patterns (i.e., a change in heading, altitude, and/or airspeed precedes an ATC/pilot communication) or by a change in weather condition or forecast received by an embodiment of the present invention not preceded by a change in heading, altitude, and/or airspeed (or the like). Thus, where a deviation is found unlikely (improbable) by the system of an embodiment of the present invention to be associated with ATC and/or weather, depending of flight phase/segment and the magnitude of the deviation, the system may warn the pilot of a likely configuration error and under certain conditions it may suggest a configuration change. However, if altitude, airspeed, weather, or traffic indicate few safe options (e.g., loss of power on takeoff) an embodiment may immediately suggest an ALS with an associated procedure set (insufficient ALS options given the total energy TE available to aircraft 200).

In the context of embodiments of the present invention unusual condition (262, 264, 266) means a deviation having a magnitude outside of a preselected range of acceptable values for a particular flight segment/phase. In a preferred embodiment a pilot, user, dispatcher, owner, or other entity may preselect what constitutes an unusual condition for each segment/phase of flight. Conversely, a system of a preferred embodiment of the present invention may operationally determine a range of acceptable values for a particular pilot, aircraft, segment, leg, or the like from past flight data.

In the context of embodiments of the present invention flight segment, flight phase, segment, phase, or segment/phase means a portion of a flight having a particular aircraft configuration or desired aircraft configuration. More particularly, in the context of an embodiment of the present invention an aircraft in a certain configuration will produce a corresponding airspeed, rate of ascent/descent, course change, or the like. Aircraft being operated on a flight plan with an embodiment of the present invention and its associated database(s) (FIG. 2 and the like) in a particular segment of flight should be progressing along the desired vector (path) at an expected rate (relative to the ground and destination) within an expected tolerance. Deviations from expected tolerances may be user (pilot and the like) selectable and are presented to the pilot.

In addition, during each phase/segment of flight an aircraft possess a finite energy state (kinetic+potential energy=total energy (KE+PE=TE)). Aircraft energy state (total energy) directly effects range. For example, an aircraft at FL380 (38000 MSL) has more energy than one at 8000 MSL. Similarly, an aircraft at 500 knots and 500 MSL in a bombing run with full stores has more energy than one at 200 knots and 500 MSL. Energy equals options. An embodiment of the present invention monitors total energy and utilizes known total energy to ascertain available options by, for example, criticality and flight segment.

Figure 9A:
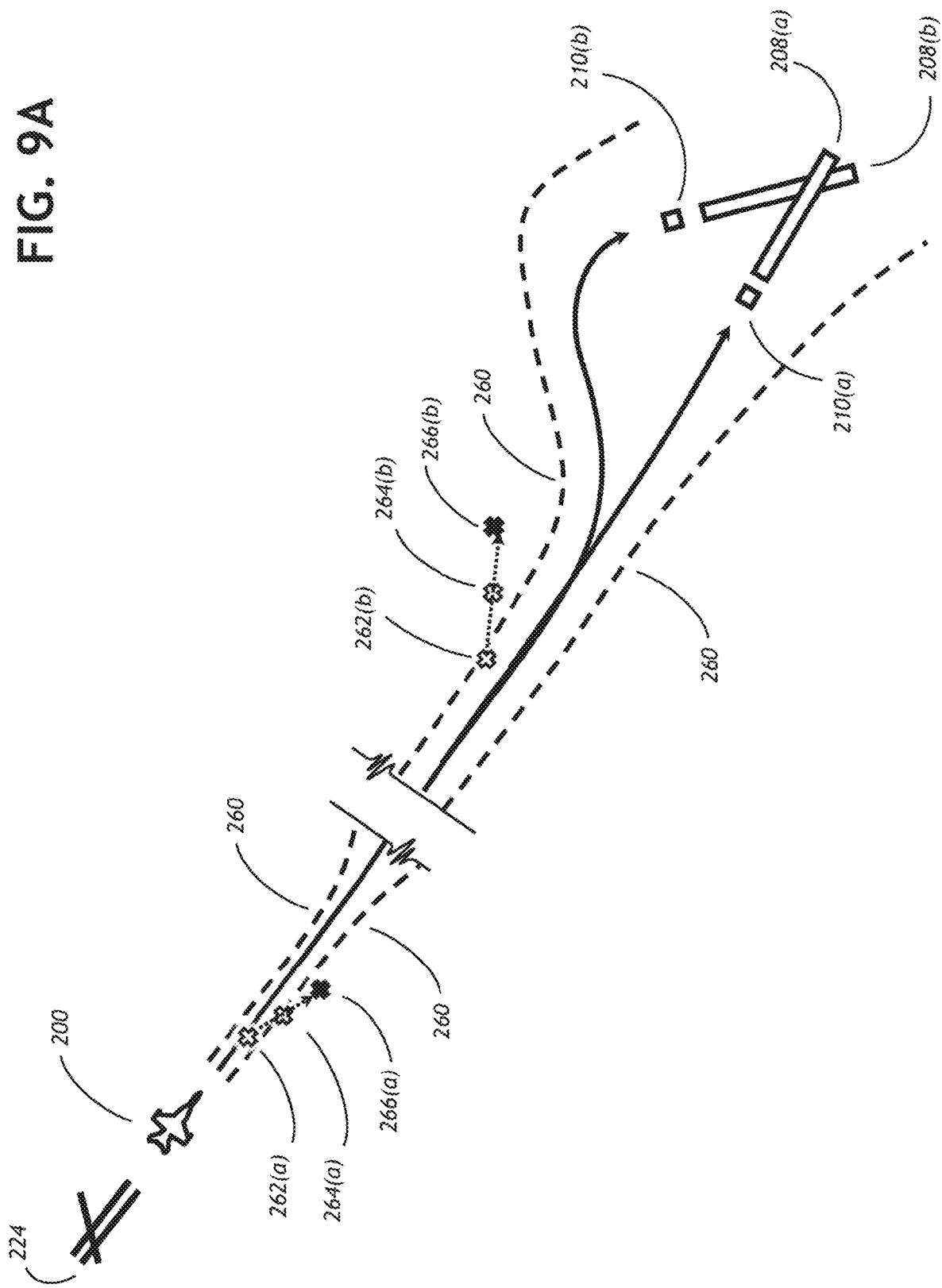
FIGS. 9A and 9B are a diagrammatic plan elevation and plan of a flight plan of an embodiment of the present invention from and to an airport illustrating unusual condition detection and reporting.

FIG. 9A diagrammatically illustrates an aircraft 200 departing from an airport 224 for a destination airport having runways 208(a) and (b). Depending on wind conditions the aircraft may be landing via and approach 210(a) and (b). In operation an aircraft may be expected to operate between an area of expected operation 260 (dashed lines) while on a flight plan (solid line) during flight operations and associated phases of flight (242-256). An aircraft on takeoff and climb, in a preferred embodiment, will be considered in an unusual condition 262(*a*) with even a slight deviation from the expected flight path. Corrective actions may be expected or prompted by the system when the unusual condition 262(*a*) is detected. If the aircraft 200 proceeds, to for example, a likely unusual condition 264(*a*) the system of an embodiment of the present invention may be more insistent (perhaps requiring a pilot acknowledgement or the like) in order to neutralize further warnings. Should the aircraft 200 appear to the system to be proceeding to a position 266(*a*) (anticipated position) dangerous to the aircraft, the system of an embodiment of the invention may become still more insistent (or the like), requiring some aircraft reconfiguration, flight plan cancellation or alteration, corrective action (or the like). An aircraft 200 enroute (or transiting another less critical flight phase) may deviate from expected position substantially more before an embodiment of the present invention detects an unusual condition 262(*b*). An embodiment of the present invention may not draw the pilot's (crew's) attention to the deviation until the aircraft 200 has exited the expected operation area 260 and is in a likely unusual condition 264(*b*). The system may become more insistent if it predicts the aircraft 200 is proceeding to a position 266(*b*) (anticipated position) dangerous to the aircraft.

Figure 9B:
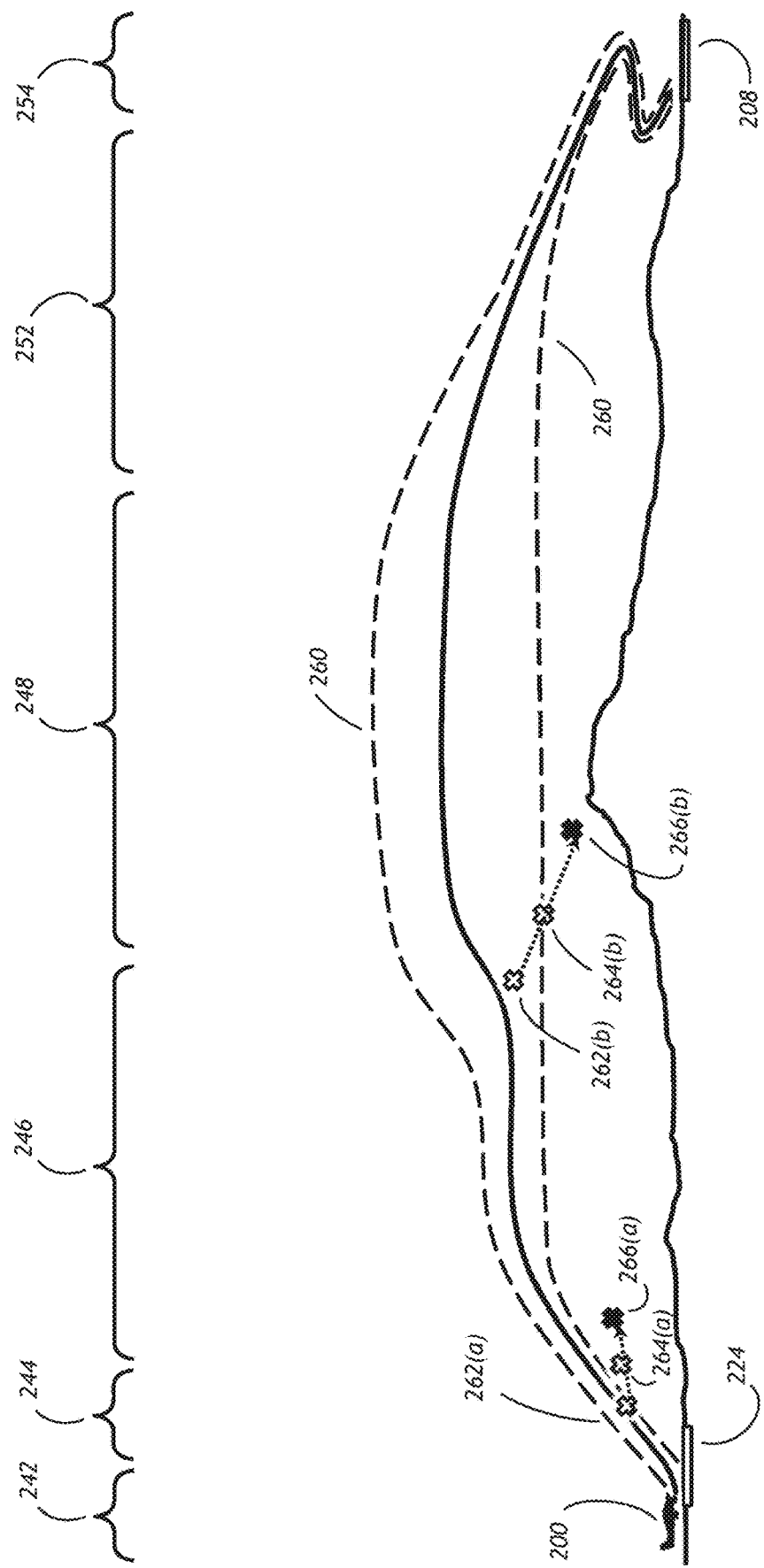

FIG. 9B is a diagrammatic elevation of a flight plan (expected path/course) of an aircraft 200 from an originating airport 224 to a second airport 208. The expected area of operation of the aircraft 200 is schematically defined by dashed lines (260). The expected area of operation is diagrammatically illustrated as substantially narrower during take-off 242, climb 244, descent approach 252, and landing 254). A variation in position is tolerated by an embodiment of the present position most preferably by altitude (AGL), airspeed (GS), and aircraft configuration.

An aircraft on takeoff and climb (FIG. 9B), in a preferred embodiment, will be considered in an unusual condition 262(*a*) with even a slight deviation from the expected flight path. Corrective actions may be expected or prompted by the system when the unusual condition 262(*a*) is detected. If the aircraft 200 proceeds to, for example, a likely unusual condition 264(*a*) the system of an embodiment of the present invention may be more insistent (perhaps requiring a pilot acknowledgement or the like) in order to neutralize further warnings. Should the aircraft 200 appear to the system to be proceeding to a position 266(*a*) (anticipated position) dangerous to the aircraft, the system of an embodiment of the invention may become still more insistent (or the like), requiring some aircraft reconfiguration, flight plan cancellation or alteration, corrective action (or the like). An aircraft 200 enroute (or transiting another less critical flight phase) may deviate from expected position substantially more before an embodiment of the present invention detects an unusual condition 262(*b*). An embodiment of the present invention may not draw the pilot/crew's attention to the deviation until the aircraft 200 has exited the expected operation area 260 and is in a likely unusual condition 264(*b*). The system may become more insistent if it predicts the aircraft 200 is proceeding to a position 266(*b*) (anticipated position) dangerous to the aircraft.

Thus, in various preferred embodiments of the present invention, the invention may provide at least one of emergency guidance (Safety Hierarchical Emergency Pilot Helper Engageable Runway Diverter: "SHEPHERD") and configuration error identification and configuration suggestions (Safety Interface Mission Operations Navigation: "SIMON").

In operation, a database of potential alternative landing sites (ALS's) may be created and maintained utilizing airport directory information, satellite imagery, survey data, surface temperature data (variations over time), traffic data, current and historic Landsat imagery, remote sensing (road and field), LDCM (Landsat Data Continuity Mission), TIRS (thermal infrared sensor), and the like. Airport directories such as AeroNav (www.aeronav.faa.gov), AOPA (www.aopa.org/members/airports), AirNav (www.airnav-.com/airports), and world airport directories such as www.airport-directory.com and airport.airlines-inform.com may be utilized by embodiments of the present invention. The present invention may utilize satellite imagery such as Landsat, LDCM, TIRS and with terrain data from USGS (www.usgs.gov), WeoGeo, and TopoQuest, Google Maps and the like to determine the acceptability of potential off-airport landing sites. Likewise, road and traffic information may be analyzed for additional potential off-airport landing sites and incorporated into the ALS database 526 via the flight assistant 100 and through a subscription 600 of an embodiment of the present invention. Generally, traffic data may be obtained via the onboard database associated with the network of GPS satellites (for general traffic patterns), US Department of Transportation traffic sensors, reflected data from GPS-enabled vehicles and mobile devices, or from aftermarket data providers and data aggregators such as Google Maps, Inrix, Radio Data Service, Sirius/XM, MSN, and the like.

An embodiment of the present invention may utilize data from the Automatic Dependent Surveillance-Broadcast (ADS-B) as well as the full compliment of the Next Generation Air Transportation System (NextGen). In operation an embodiment of the present invention may receive traffic, weather, terrain, and flight information from ADS-B as an exclusive source (or enhancing cumulative or partially cumulative source) for processing by an apparatus of the present invention for detecting unusual conditions (positions) and configuration errors (and the like) and selectively suggesting either a new flight profile or flying a suggested flight profile.

Figure 28:
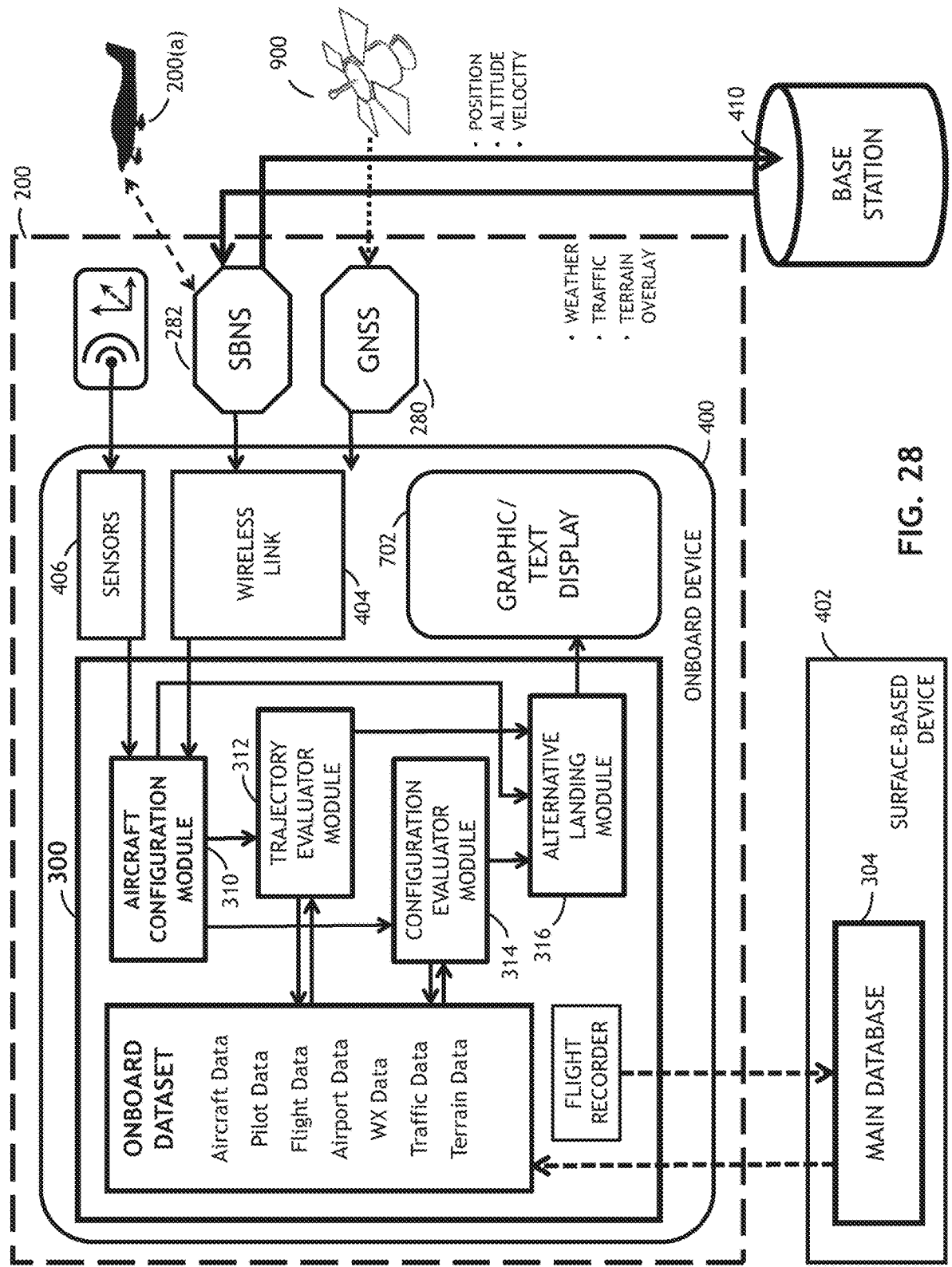
FIG. 28 is an environmental block diagram of a surface- and space-based embodiment of the present invention, configured before or during flight for implementation by a portable computing device aboard an aircraft.

FIG. 28 is a diagrammatic representation of an environment of a surface-based embodiment of the present invention, including both hardware components of the apparatus and data components used by the system. In this configuration the system 300 is implemented by a portable computing device 400, which can be carried aboard aircraft 200, and a surface-based computing device 402. Device 402 includes a main database 304. For a given aircraft, database 304 includes information about the aircraft's specifications (e.g., empty and gross weight, engine operational parameters, fuel capacity and consumption, flight configuration characteristics and performance envelope, optimal glide ratio and best glide speed, emergency procedures and checklists, safe landing and ground-roll distance, and how landing is affected by a variety of surface characteristics such as slope, moisture, temperature and pressure at ground level, etc. In a preferred embodiment, all or substantially all information located in the Pilot's Operating Handbook or aircraft flight manual (DASH-1) may be included in database 304, along with any additional data derivable therefrom.

For a given pilot, database 304 may include information about pilot currency and experience level, such as total flight time for a given aircraft. Database 304 may also include a general assessment of the proficiency of a given pilot, either generally or with respect to specific flight segments or procedures (e.g., engine-out landings). Once a flight is completed, database 304 may be updated with additional information specific to the completed flight.

For a given flight, database 304 may include an initial flight path in addition to terrain data for the flight path and a surrounding operating zone of predetermined radius. Terrain data may include: topographic information about any obstacles, natural or manmade, along the flight path; any airports or runways along the flight path suitable for landing; information about approaches to these airports, including navigational/communication frequencies and traffic patterns; and information about services offered at or near these airports, including fuel, maintenance, transport, medical, or emergency services. Terrain data may also include information about potential alternative landing sites in the operating zone and their suitability for landing. Database 304 may indicate as a potential alternative landing site any open area (field, clearing, etc.) of sufficient size to accommodate a given landing distance, any sufficiently large paved or level surface (such as a parking lot, highway, or road), or any sufficiently large body of water. For any highway or road so identified, database 304 may contain information about ground traffic, including current traffic data or traffic projections based on historical patterns. Database 304 may also include weather information for the operating zone, such as current forecasts, temperatures and dew points, historical weather patterns, ground level and aloft wind characteristics, and visibility. Data recorded inflight may help calibrate flight data to reflect performance along a certain route by various pilots, aircraft, or types of aircraft.

In a preferred embodiment of the present invention, prior to departure system 300 may export from database 304 a dataset specific to the aircraft, the pilot, and the flight plan. This dataset may be downloaded to portable device 400 for use by system 300, and may include a preflight assessment of likely weather conditions, obstacles, and alternative landing sites for a particular flight. This preflight assessment may take into consideration the pilot's proficiency in determining the feasibility of a given potential alternative landing site. A less proficient pilot may require a greater safety margin in determining the distance necessary to safely land the aircraft and bring it to a complete stop on the ground. Given available information about adverse weather and atmospheric conditions along the flight path, device 402 may identify likely points along the flight path where aircraft 200 may encounter said adverse conditions, and prioritize the selection of alternative landing sites safely reachable from those points.

Once flight has commenced, aircraft configuration module 310 may continually assess, on a selectably periodic basis, the comprehensive configuration of aircraft 200, including its current position, current altitude, current airspeed and groundspeed, current attitude, angle or rate of climb or descent, power levels and energy state, component configuration, flight segment, acoustic profile, etc. In a preferred embodiment of the present invention, aircraft configuration module 310 may continually receive updated positional information via wireless link 404, communicatively connected to onboard GNSS receiver 280 and surface-based navigational service (SBNS) receiver 282 of aircraft 200. SBNS may include any surface-based navigational or surveillance system broadcasting or transmitting ground-to-air, air-to-air, or via space-based satellites (e.g. ADS-B In and ADS-B Out). SBNS receiver 282 may provide system 300 with continually updated data about nearby air traffic, terrain overlay, and weather conditions (e.g., METARs, TAFs, AIRMET/SIGMETs, TFRs). System 300 may then display relevant portions of this data to the pilot via display unit 702. GNSS receiver 280 may continually receive updated position data from satellite constellation 900, said constellation including GPS, GLONASS, Galileo, Compass, IRNSS, or other navigational satellites. SBNS receiver 282 may continually receive updated traffic and weather information from base station 410, as well as traffic data broadcast air-to-air by aircraft 200(*a*). Aircraft configuration module 310 may also continually receive data from at least one sensor 406. In a preferred embodiment, sensor 406 may include a microphone incorporated into portable device 400, configured to analyze audio levels and frequencies onboard aircraft 200. Sensor 406 may additionally include a barometer, magnetometer, or accelerometer incorporated into portable device 400, or otherwise installed onboard aircraft 200 and communicatively connected to portable device 400.

In a preferred embodiment, output data from aircraft configuration module 310 may be processed on a continual and selectively periodic basis by trajectory evaluator module 312 and configuration evaluator module 314. As aircraft configuration module 310 produces a continually updated "snapshot" of the configuration of aircraft 200 at any given moment, trajectory evaluator module 312 may analyze each successive aircraft configuration in comparison to the expected configuration of aircraft 200. The expected configuration of aircraft 200 may be based on the flight plan of aircraft 200 and historical performance by the pilot, by the aircraft, or along the flight path; if the current aircraft configuration represents where aircraft 200 is and what it is doing, the expected aircraft configuration represents where aircraft 200 should be, and what it should be doing. Based on sensitivity parameters selectable by the pilot of aircraft 200, or defined by appropriate business policy or military protocol, trajectory evaluator module 312 may determine that aircraft 200 has significantly deviated from its expected trajectory, suggesting corrective action or indicating a possible emergency.

Similarly, configuration evaluator module 314 may analyze each successive aircraft configuration in order to ascertain possible solutions to configuration errors at a given point in time. A configuration error may include improper positioning of landing gear, improper extension or retraction of flaps, improper flight control position, improper rotational angle or angle of attack, insufficient or excessive speed or climb/descent rate, or any other potentially correctable aspect of the performance of aircraft 200. Configuration evaluator module 314 may then compare the current configuration of aircraft 200 to its expected configuration, depending on the current flight segment or other conditions. Configuration evaluator module 314 may then determine (to a selectable level of confidence) that aircraft 200 is improperly configured, recommending corrective action relevant to the specific configuration error (e.g., extending or retracting flaps) or indicating a possible emergency.

In a preferred embodiment of the present invention, alternative landing module 316 may continually assess the best potential alternative landing sites for aircraft 200, based on landing site data downloaded from database 304 as well as the current configuration of aircraft 200 and external conditions such as weather and local traffic. Alternative landing site 314 may determine an operative range defined by the area reachable by aircraft 200 under a set of conditions. The effective range of aircraft 200 from a given position or altitude may be determined in part by the performance capabilities of aircraft 200 (e.g. glide ratio, configuration), the proficiency of its pilot, and dynamic inflight parameters subject to constant change (e.g., weather patterns, atmospheric conditions, air and ground traffic). In the alternative, the pilot may select the effective range: alternative landing module 316 may use as its default effective range the area reachable by aircraft 200 when it must land whenever practicable ($R_{P2}$).

For a given effective range, alternative landing module 316 may review the list of alternative landing sites in the operating zone defined by database 304, determining which sites fall within the effective range. Alternative landing module 316 may then generate a hierarchy of sites within the effective range, evaluated according to a selectable set of criteria allowing for current conditions. Given a hierarchy of alternative landing sites, alternative landing module 316 may then display candidate alternative landing sites, along with any available information about current conditions (atmospherics, precipitation, traffic) via display unit 702 of portable device 400. In the event that the pilot of aircraft 200 elects to divert to a particular alternative landing site, alternative landing module 316 may then display associated emergency procedures to the pilot in order to position and configure aircraft 200 for a safe landing at the chosen site.

Figure 29:
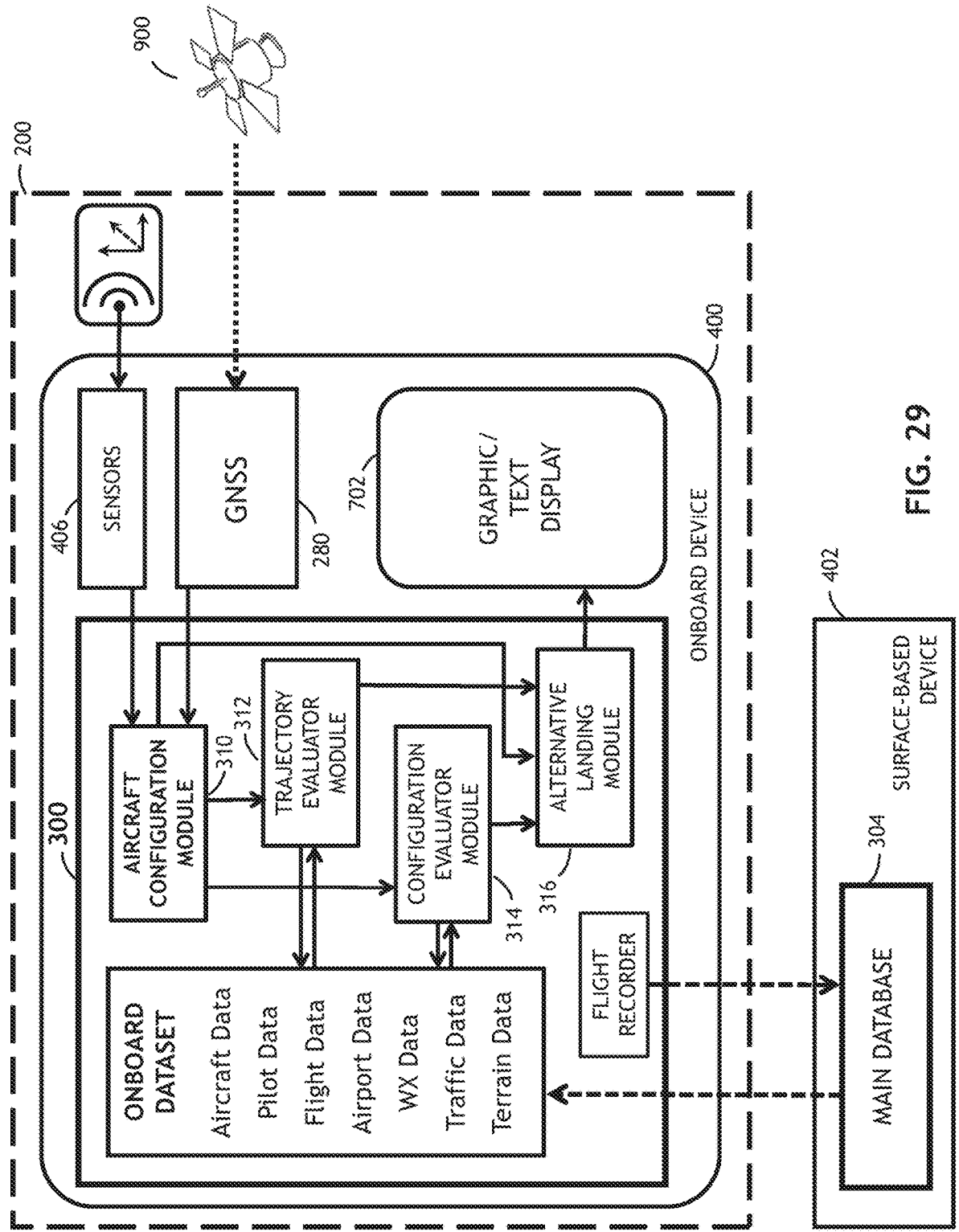
FIG. 29 is an environmental block diagram of a space-based embodiment of the present invention, configured before or during flight for implementation by a portable computing device aboard an aircraft.

FIG. 29 is a diagrammatic representation of the environment of an embodiment of the present invention as implemented aboard an aircraft not equipped with SBNS. In this embodiment a GNSS receiver 280 may be directly incorporated into portable device 400, directly supplying continual position data to aircraft configuration module 310. In scenarios where data connectivity to the ground or to other aircraft may be limited, system 300 may compensate by defining a larger operating zone around its flight path, and therefore downloading a larger dataset of alternative landing site information to portable device 400.

Figure 30:
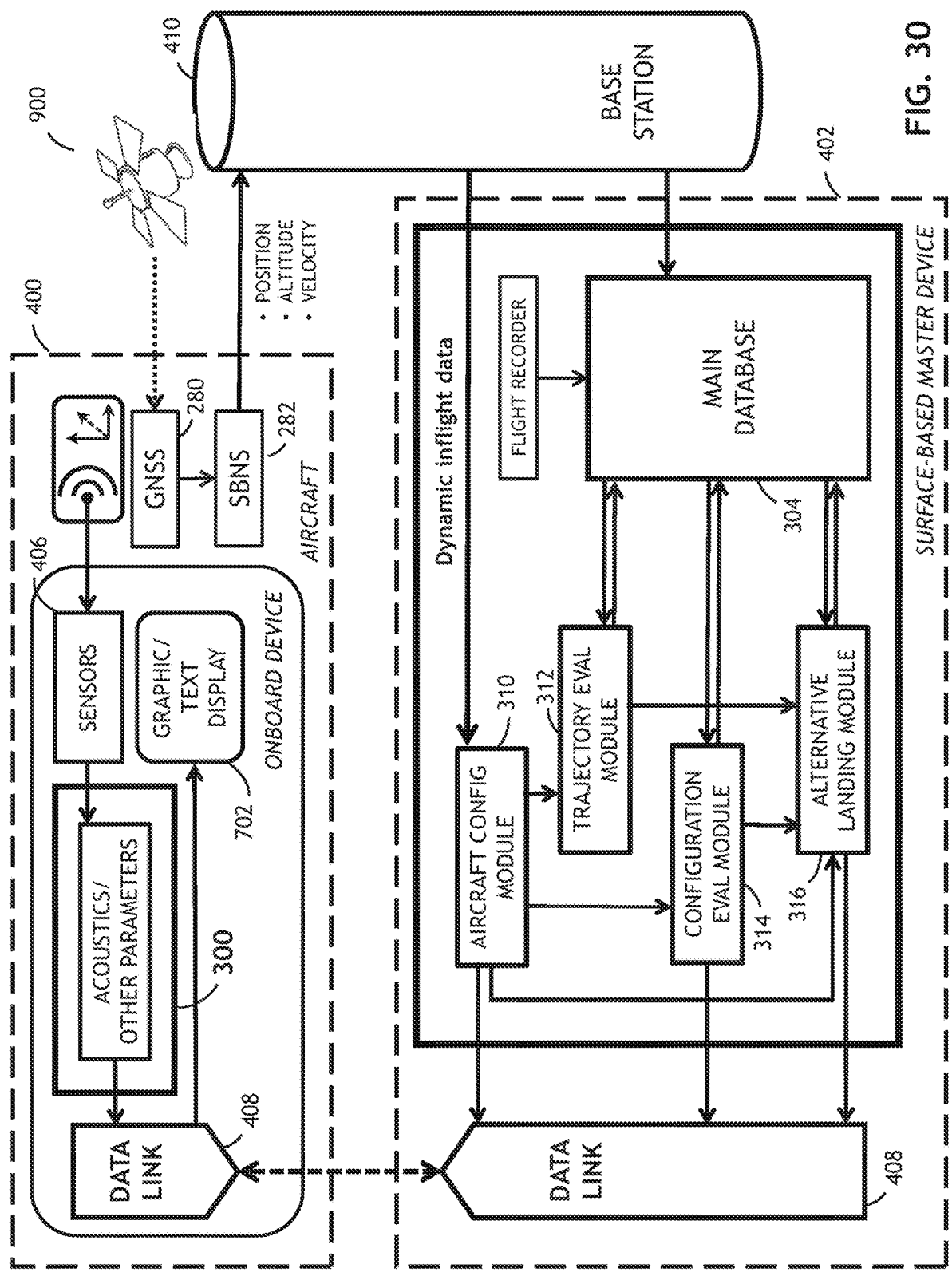
FIG. 30 is an environmental block diagram of a surface- or non-space-based embodiment of the present invention, configured before or during flight for implementation by a surface-based computing device in concert with a portable computing device aboard an aircraft.

FIG. 30 is a diagrammatic representation of the environment of a surface-based or non-space-based embodiment of the present invention. Stable data link 408 connects portable device 400 aboard aircraft 200 with surface-based master device 402. Stable data link 408 may be a ground-to air broadband link such as Gogo, a Ka-band, Ku-band, or other satellite- or space-based data link, or a high frequency (UHF, VHF) surface-based data link. Stable data link 408 may transmit data between device 400 and device 402 in real time or in batches. The functionality of system 300 may be affected by the robustness of stable data link 408; however, as there is no need to download large amounts of data to portable device 400, portable device 400 may include a smartphone.

In a surface-based or non-space-based embodiment of the present invention, the processing functions of system 300 may be performed in significant part by surface-based master device 402. Position data relevant to aircraft 200 (collected by GNSS receiver 280) may be transmitted to base station 410 by SBNS receiver 282. Aircraft configuration module 310 may receive continual data updates from base station 410. In addition, at least one sensor 406 on board aircraft 200 may collect additional inflight data (e.g., aircraft acoustics) and transmit those data to aircraft configuration module 310. Trajectory evaluator module 312, configuration evaluator module 314, and alternative landing module 316 may receive data from aircraft configuration module 310, accessing main database 304 directly in order to make continual assessments of the configuration and trajectory of aircraft 200 and continually transmit those assessments to portable device 400 via stable data link 408.

Figure 31:
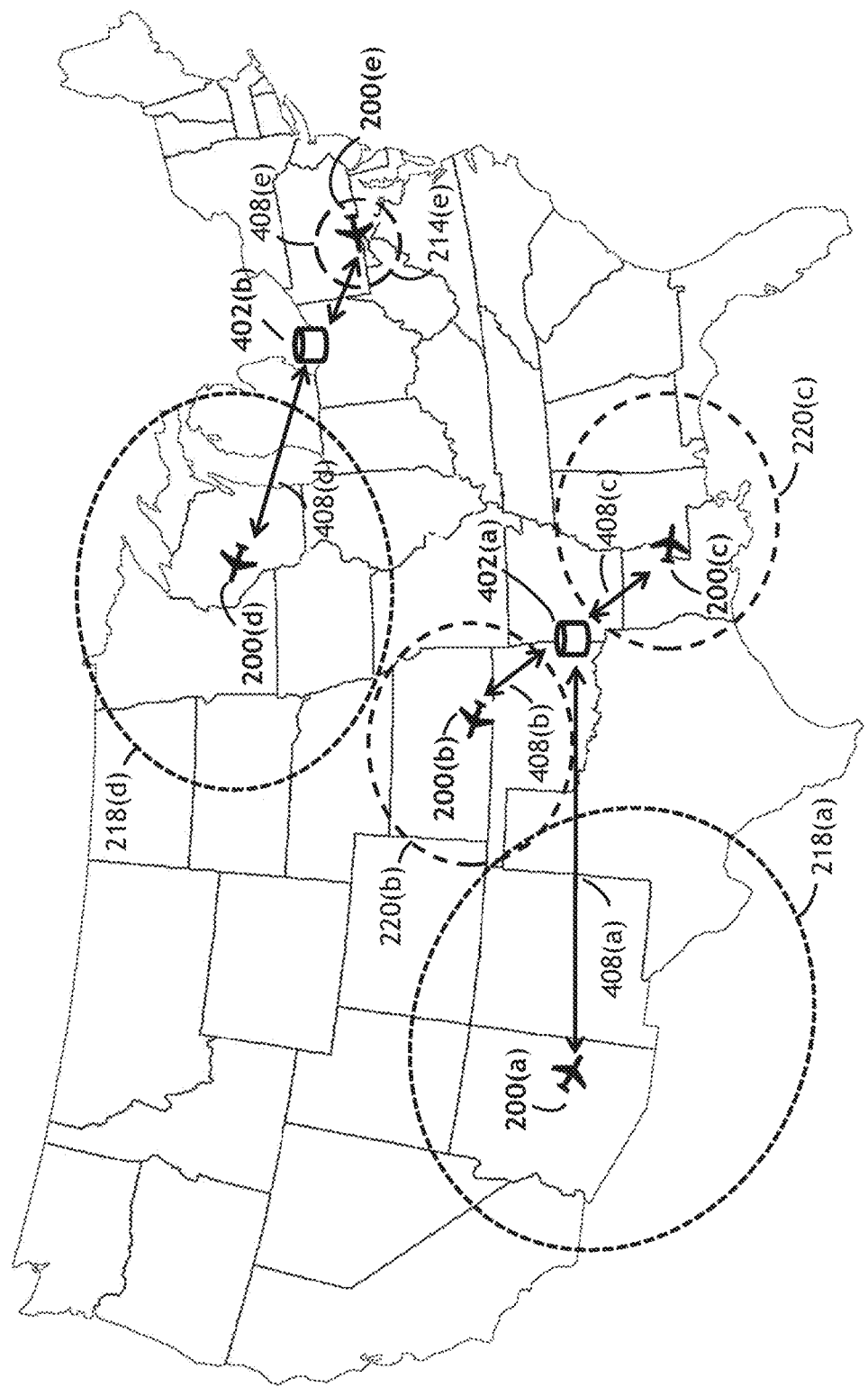
FIG. 31 is a highly diagrammatic overhead view of an embodiment of the present invention, configured for implementation by at least one surface-based computing device in concert with a plurality of aircraft in flight, whereby each aircraft in flight maintains a two-way stable data link with a surface-based device for the purpose of implementing the system of the present invention.

In a surface-based or non-space-based embodiment of the present invention, a single computing device including a single main database may provide configuration evaluation, trajectory evaluation, and alternative landing site processing for multiple aircraft at once. FIG. 31 is a highly diagrammatic view of a condition whereby a surface-based or non-space-based embodiment of the present invention may be implemented through one or more surface-based master devices 402(a) and 402(b). Master device 402(a) may continually assess the configuration of aircraft 200(a), 200(b), and 200(c), receiving position data from the said aircraft and transmitting real-time trajectory and configuration information back to the said aircraft via stable data links 408(a), 408(b), and 408(c). Similarly, master device 402(b) may continually receive position data from aircraft 200(d) and 200(e) and transmit configuration and trajectory information back to the said aircraft via stable data links 408(d) and 408(e). Aircraft 200(a) and 218(d), for example, may be operating under normal or default conditions, as indicated by their broader effective ranges 218(a) and 218(d). Aircraft 200(b) and 200(c), however, have declared a need to land where possible, as indicated by their narrower effective ranges 220(b) and 220(c). Finally, aircraft 200(e) has declared an emergency and must land immediately; the effective range 214(e) of aircraft 200(e) is narrower still, and when aircraft 200(e) selects an alternative landing site, master device 402(b) may transmit the associated emergency procedure set in order to assist aircraft 200(e) in configuring the aircraft and positioning for approach and safe landing at the selected site.

Figure 32:
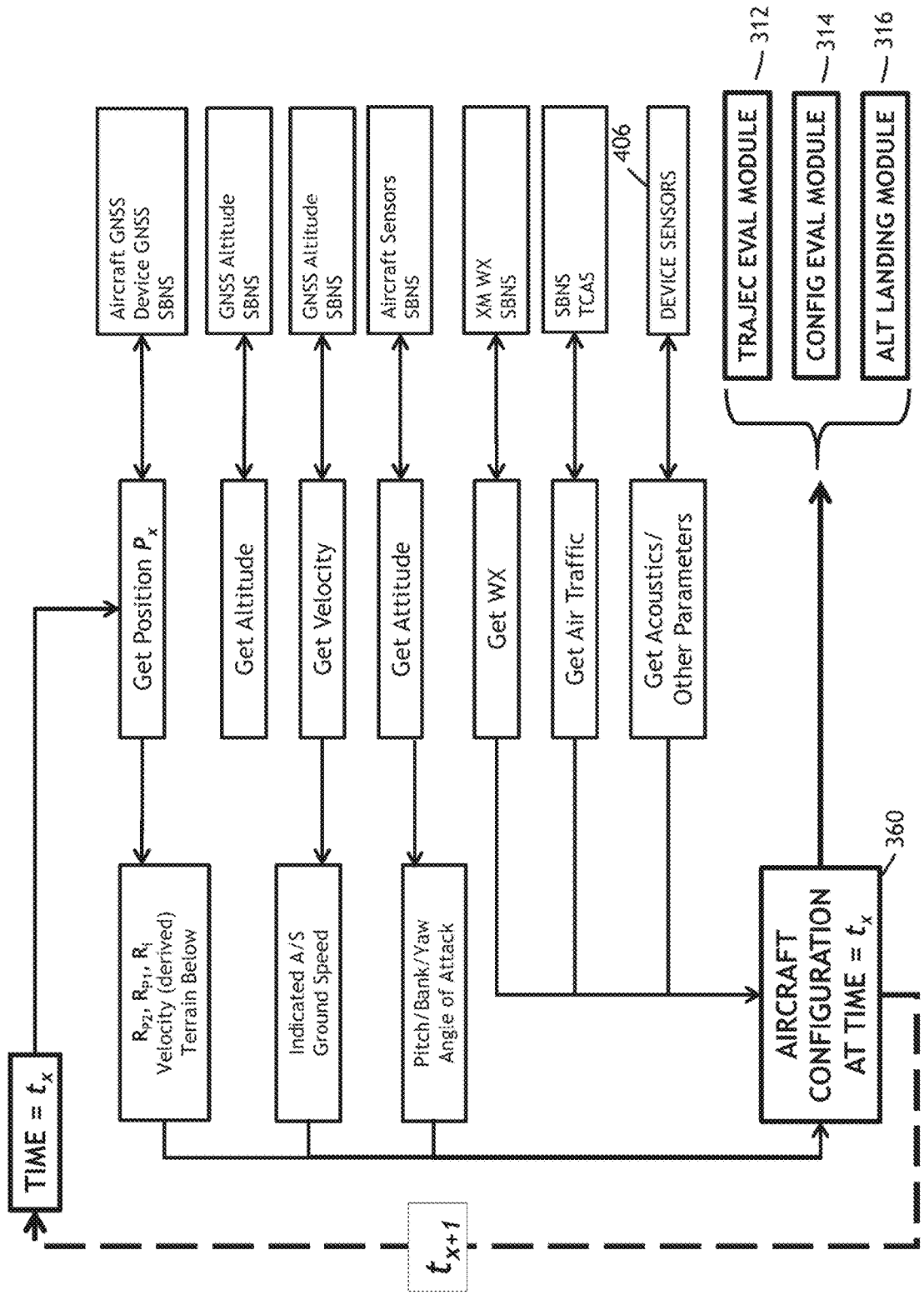
FIG. 32 is an environmental diagram of the aircraft configuration module component of an embodiment of the present invention.

FIG. 32 is a diagrammatic representation of the environment of aircraft configuration module 310 of the present invention. Aircraft configuration module 310 will attempt to determine the configuration of aircraft 200 to a selectable degree of sensitivity at a selectable time interval. For every time $t_x$ corresponding to a point along the flight path of aircraft 200, aircraft configuration module 310 collects the current position and altitude of aircraft 200 (via GNSS, VOR, VORTAC, ADF, LORAN, ADS-B, inertial navigation, radar, pilot input); current velocity, including airspeed or groundspeed (derived from position over time); current attitude (via sensors); weather and atmospheric conditions at the current position; nearby air traffic (via ADS-B or TCAS); and any other available parameters such as aircraft acoustics. The set of these elements represents a "snapshot" of the aircraft in time; the data may be recorded and sent to the other modules of system 300 for processing.

Figure 34:
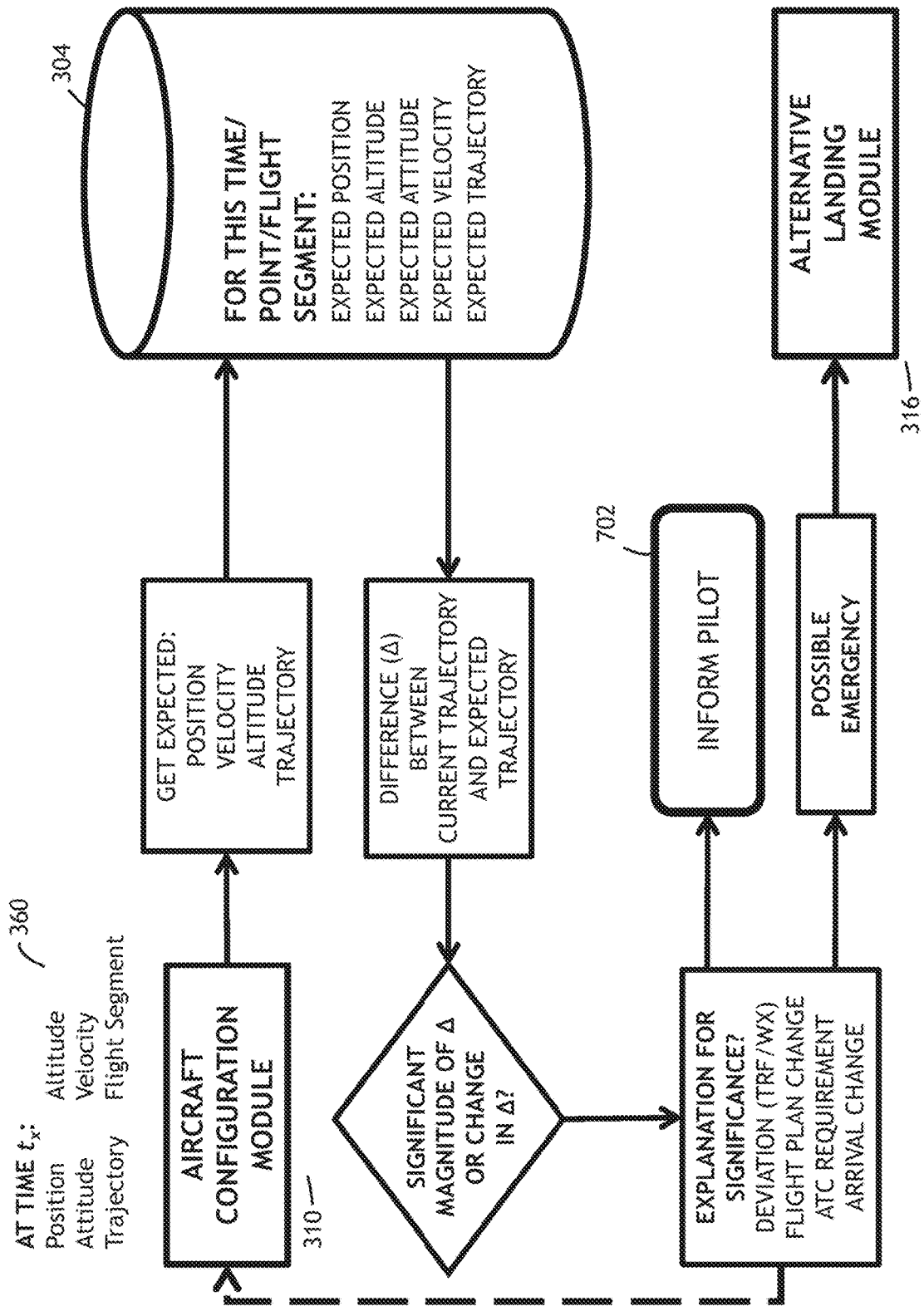
FIG. 34 is an environmental diagram of the trajectory evaluator module component of an embodiment of the present invention.

FIG. 33 represents a diagrammatic representation of current expected configurations for a given aircraft on a given flight path. Flight plan data downloaded from database 304 may include a prior history of performance by a given aircraft or a given pilot along a given flight path or route. Multiple data points from multiple flights may define a set of expected configurations for that flight plan. At any point in time along a flight path an expected configuration may describe, according to past performance and a history of safe and completed flights, where an aircraft should be, how fast it should be traveling (horizontally or vertically), how it should be configured according to the current flight segment (FSEG), how the aircraft acoustics should sound, etc. An aircraft configuration may be defined by as many or as few variables as is selected. Aircraft 200(a) is at time zero (to), on a runway preparing to accelerate for takeoff, and the configuration 360(a) of aircraft 200(a) reflects this: zero altitude AGL, zero forward or climbing speed, zero power usage, horizontal (zero-degree) pitch angle, etc. Aircraft 200(b) has taken off, and therefore its configuration 360(b) at time $t_x$ (6 minutes, 15 seconds elapsed since time zero) reflects an altitude of 3,200 feet AGL, pitch 2° above horizontal, ground speed 80 kts, a climb rate of 500 ft/min, and 60% power output. Aircraft 200(c), however, represents the expected configuration 360(c) of the same aircraft at 6 minutes, 15 seconds past time zero. According to expected configuration 360(c), aircraft 200(b) should be at an altitude of 4,500 ft AGL, be pitched 5° above horizontal, have a ground speed of 120 kts with 80% power output, and gain 2,000 feet per minute: the performance of aircraft 200(b) should correspond to a climbing segment. Trajectory evaluator module 314 may evaluate the difference between current configuration 360(b) and expected configuration 360(c). FIG. 34 is a diagrammatic view of the environment of trajectory evaluator module 314 of the present invention. Trajectory evaluator module may receive an aircraft configuration 360 from aircraft configuration module 310 and an expected configuration from database 304 (or an onboard subset thereof). Trajectory evaluator module may then determine whether the difference between current configuration 360 and expected configuration is significant or severe (or the rate of change in magnitude is significant, i.e., the difference between current and expected configurations is accelerating), according to preselected parameters. For example, for a given flight segment insufficient climb rate may be assigned a higher priority than groundspeed or physical position. If the difference in configurations is significant or severe, trajectory evaluator module 314 may determine if there is an explanation for this difference; for example, aircraft 200 may be several miles away from its original flight path, but this difference in position may be explainable by a deviation from flight plan for weather-related reasons. If there is a severe difference in trajectory with no explanation, trajectory evaluator module 314 may then inform the pilot of the difference in configuration via display unit 702, and signal alternative landing module 316 of a possible emergency condition.

Figure 35:
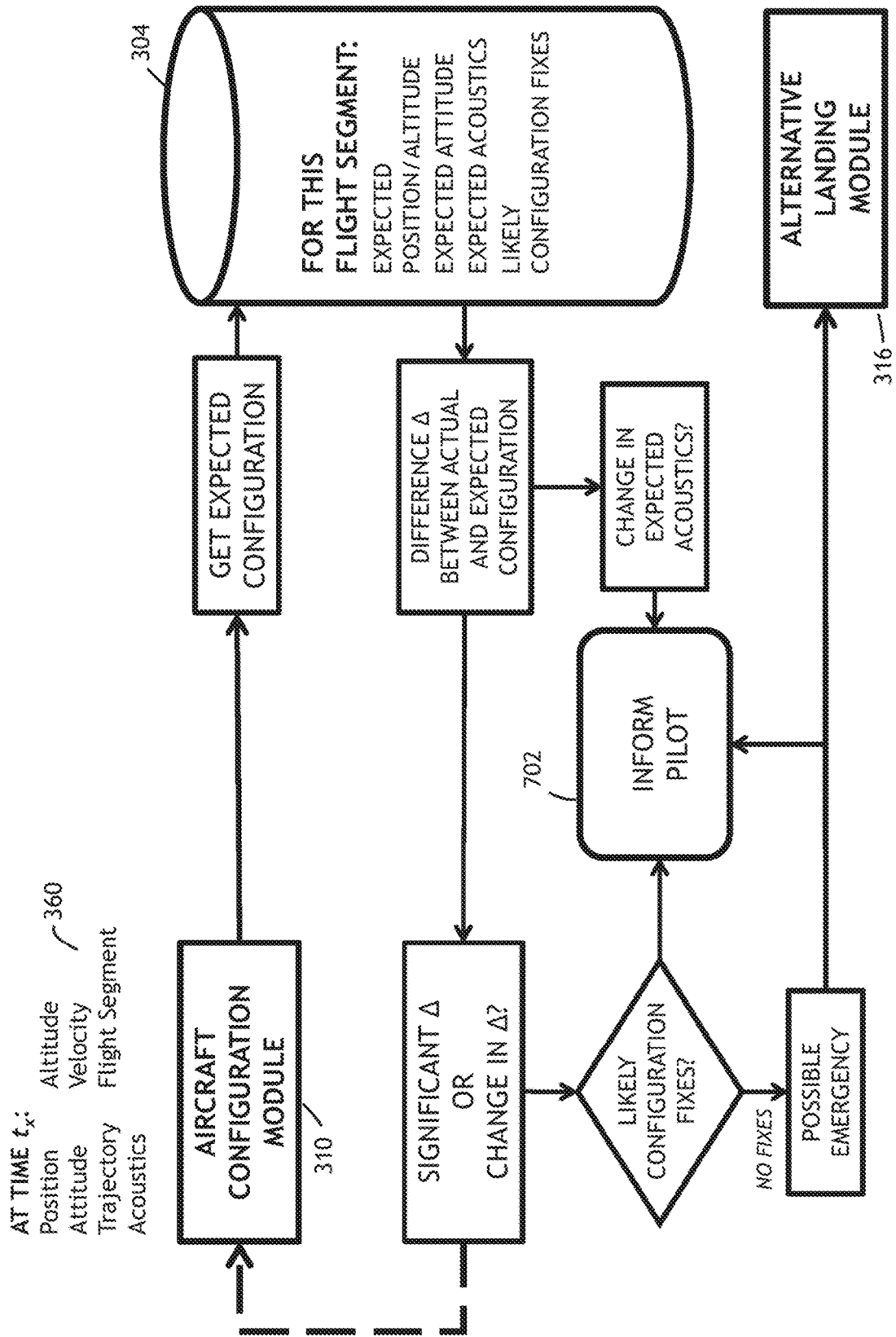
FIG. 35 is an environmental diagram of the configuration evaluator module component of an embodiment of the present invention.

FIG. 35 is a diagrammatic view of the environment of configuration evaluator module 312 of the present invention. Configuration evaluator module 312 may attempt to ascertain if current configuration 360 of aircraft 200 as provided by aircraft configuration module 310 differs significantly from the expected configuration of aircraft 200, and to ascertain solutions for specific configuration errors. For example, given a particular flight segment and aircraft acoustic profile, configuration evaluator module 312 may determine if a particular configuration pattern corresponds to this acoustic profile, e.g., via a lookup table in database 304. As a given aircraft performs a certain way through a given flight segment (i.e., according to its expected configuration), the corresponding combination of engine output, flap position, landing gear, etc. will produce a certain acoustic profile. A seasoned pilot will know if his or her aircraft is not producing the proper acoustic profile, i.e., if the aircraft does not "sound right". Configuration evaluator module 312 may analyze the sounds recorded by at least one onboard sensor; any significant difference in frequency or consistency, in concert with additional differences in configuration data (speed too low, climb rate too low) may indicate a specific configuration error, e.g., flaps extended when they should be retracted. If this difference is significant, configuration evaluator module 312 may inform the pilot via display unit 702, displaying any associated solutions to the identified configuration error per aircraft data provided by database 304. As the system certainty of a particular configuration error increases, configuration evaluator module 312 may display increasingly insistent or definite notifications (e.g., "check configuration" to "check gear down"). If a configuration error is significant or severe and there is no associated solution, configuration evaluator module 312 may so inform the pilot and signal alternative landing module 316 of a possible emergency condition.

Figure 36:
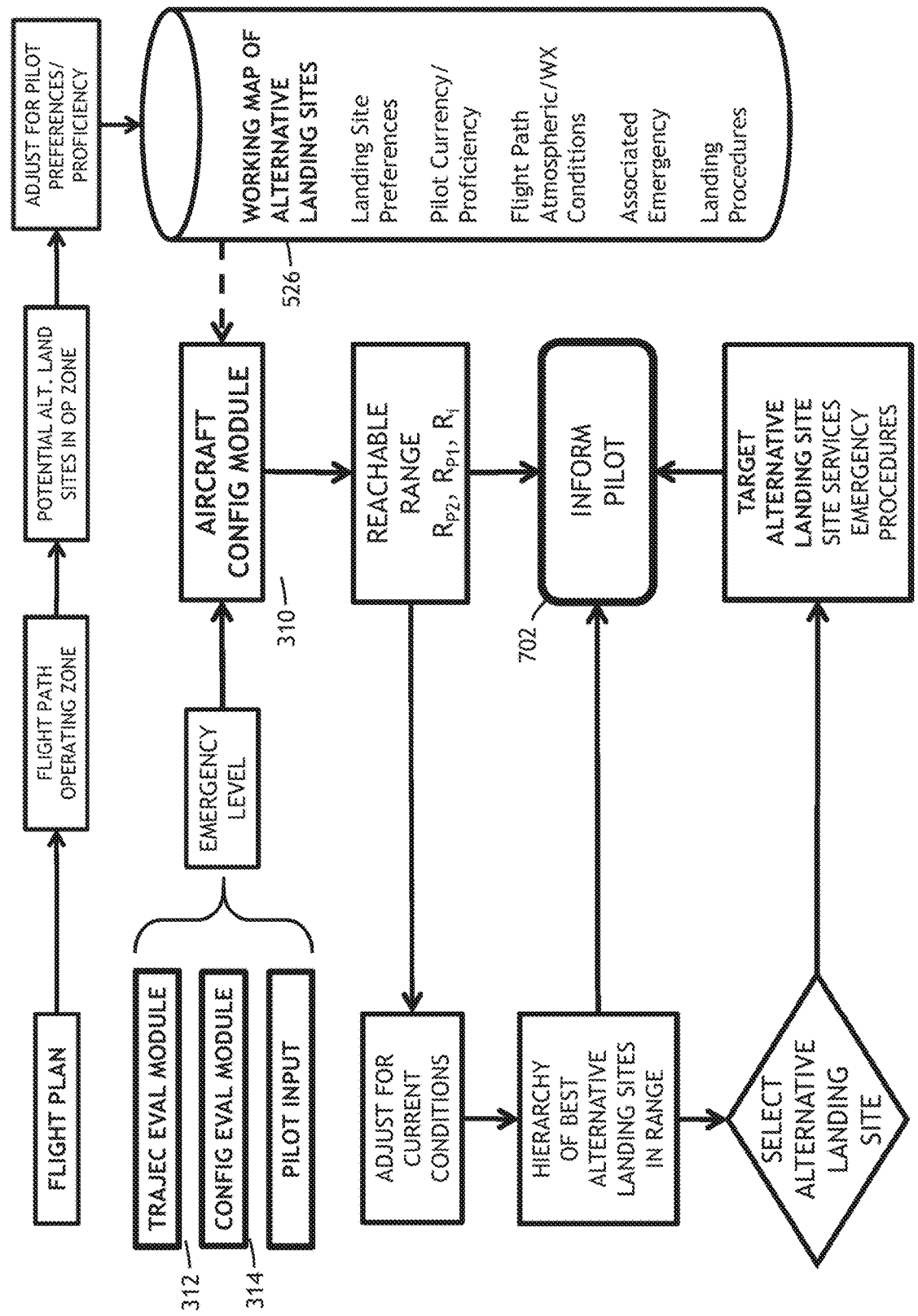
FIG. 36 is an environmental diagram of the alternative landing module component of an embodiment of the present invention.

FIG. 36 is a diagrammatic view of the environment of alternative landing module 316 of the present invention. In a preferred embodiment of the present invention alternative landing module 316 may, prior to departure, define an operating zone based on a particular flight plan, including the flight path and a pre-determined surrounding area. Within this operating zone, alternative landing module 316 may look for and indicate any potential alternative landing site, from a known full-service airport to a body of water, resulting in a working database 526 of all potential alternative landing sites within the operating zone.

On receiving current aircraft configuration information from aircraft configuration module 310, alternative landing module 316 may continually generate a hierarchy of alternative landing sites most easily and safely reachable by a given aircraft of configuration 360 within a given effective range. As a default, this effective range may represent the area within which aircraft 200 may land when practicable ($R_{P2}$). An aircraft at higher altitude, for example, will consequently have more potential energy, a greater glide range, and therefore a broader effective range. Within the effective range, alternative landing sites may be prioritized according to pilot preferences, system preferences, pilot proficiency or currency, or the existence of an emergency. For example, the system of the present invention may be programmed to assign a full-service airport higher priority than a smaller airport but a pilot may prefer to divert to a smaller airport closer to his current position, or may need to divert to the smaller airport due to engine loss. Once the pilot selects an alternative landing site and elects to divert there, alternative landing module 316 may then load and display (via display unit 702) an emergency procedure associated with landing at the chosen site. An emergency procedure may include any necessary steps for configuring the aircraft properly, notifying the ground, positioning the aircraft for approach to the landing site, etc.

Figure 37:
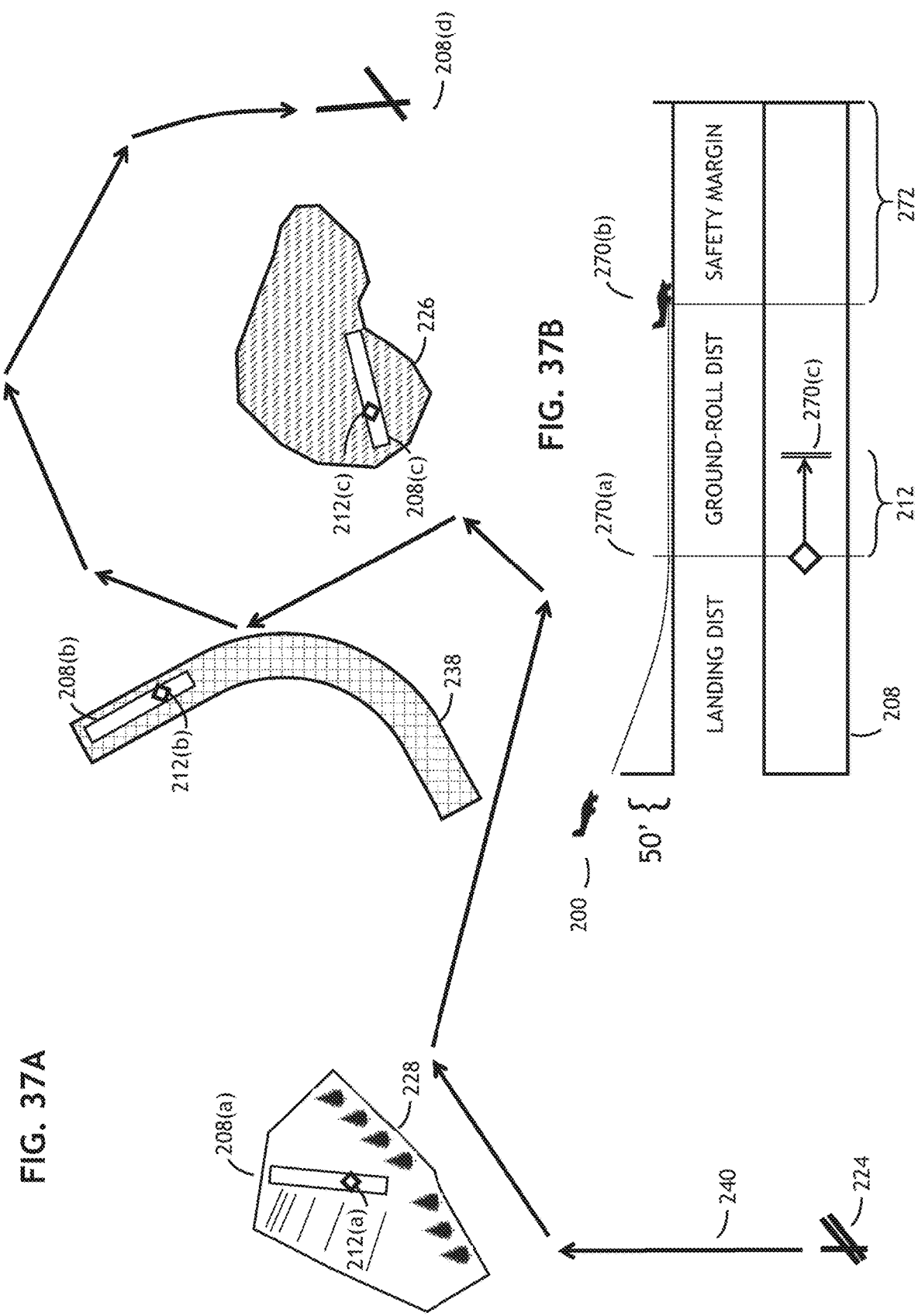
FIG. 37A is a highly diagrammatic overhead view of a procedure whereby an embodiment of the present invention initially evaluates potential alternative landing sites appropriate for a given aircraft commanded by a given pilot along a given flight path, based on surface terrain characteristics and aircraft landing requirements.
FIG. 37B is a diagram illustrating the process by which an embodiment of the present invention evaluates a potential landing site by determining the landing distance required for a given pilot to safely land a given aircraft.

FIG. 37A is a highly diagrammatic top view of a condition under which alternative landing module 316 evaluates potential alternative landing sites. Flight path 240 represents a flight from originating airport 224 to land at runway 208(d). Open field 228 is situated close to originating airport 224 and flight path 240. Alternative landing module 316 may identify an open area large enough to provide aircraft 200 with a safe landing on a gently upsloping grass surface, and may therefore indicate alternative landing site 208(a) and touchdown point 212(a). In the event aircraft 200 experiences engine failure after takeoff, its pilot may be forced to decide, in a matter of minutes or seconds, whether to attempt to turn back for landing at airport 224 or look around for a forward emergency landing area. As alternative landing site 208(a) is partially obscured by a stand of trees, the pilot may not immediately recognize site 208(a) as suitable for landing or may not have sufficient time to assess the site's suitability from the air. However, alternative landing module 316 may have recognized area 208(a) as an alternative landing site, and may provide the pilot with an emergency procedure for landing there if necessary. Alternative landing module 316 may also identify landing sites 208(b) and 208(c), located on a road and lake respectively.

FIG. 37B is a diagrammatic view of the parameters used by alternative landing module 316 to determine adequate safe landing distance. A given aircraft 200 may define in its specifications a minimum safe landing distance (or the distance required for aircraft 200, descending at a standard angle, to clear a 50-foot obstacle and touch down at point 270(a)) plus a minimum ground-roll distance (the distance required for aircraft 200, touching down at point 270(a), to come to a full stop at point 270(*b*)). To this distance alternative landing module 316 may add an additional safety margin 272 to account for real-world conditions. In practice, the required landing distance for an aircraft will increase due to some factors (wet surfaces, downslope, tailwinds, less proficient pilots) and decrease due to others (upslope, headwinds) in addition to varying with temperature and air pressure. Therefore an aircraft landing on runway 208 should be able to safely touch down anywhere in range 212. A touchdown past point 270(*c*), however, may not provide sufficient stopping distance, and the pilot may want to consider going around for a second approach if circumstances allow it.

Figure 38:
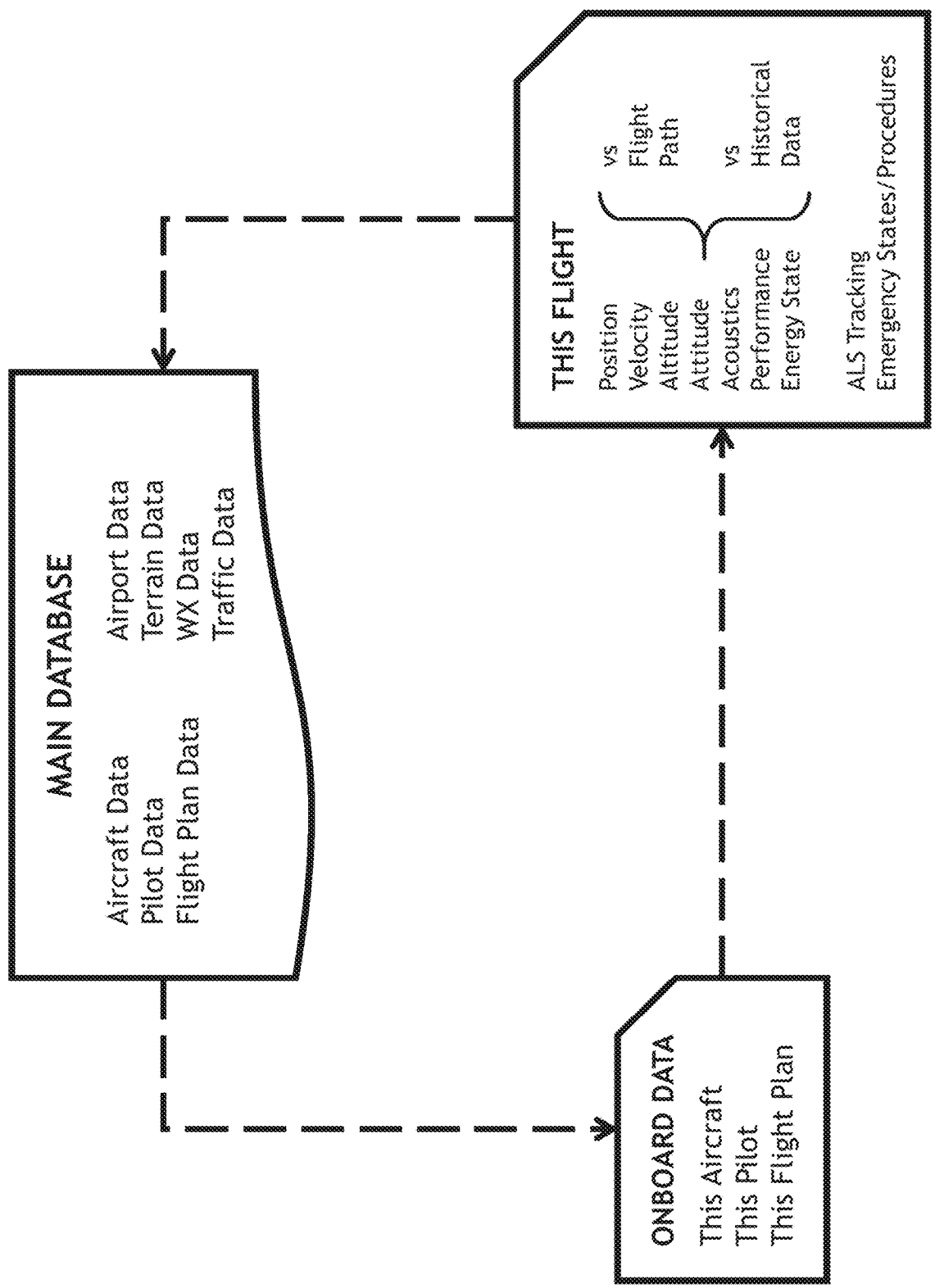
FIG. 38 is an environmental diagram illustrating the main database component of an embodiment of the present invention, a component dataset of said database exported for use by the system of the present invention for a given flight, pilot, and aircraft, and an additional dataset representing information collected during said flight with which the system of the present invention updates said main database.

FIG. 38 is a diagrammatic view of the data components of a preferred embodiment of the present invention. In a space-based embodiment of the present invention, system 300 may download from main database 304 a dataset specific to a particular aircraft, pilot, and flight plan. Inflight, system 300 may record all dynamic flight data received by aircraft configuration module 310 and the resulting processing of that flight data by other components of the system: performance compared to flight plan or historical performance, tracking of alternative landing sites, any emergency procedures accessed, etc. Once the flight has ended, the resulting dataset representing the completed flight may be uploaded back to the main database, updating any parameters relevant to the pilot, aircraft or flight plan.

Figure 39:
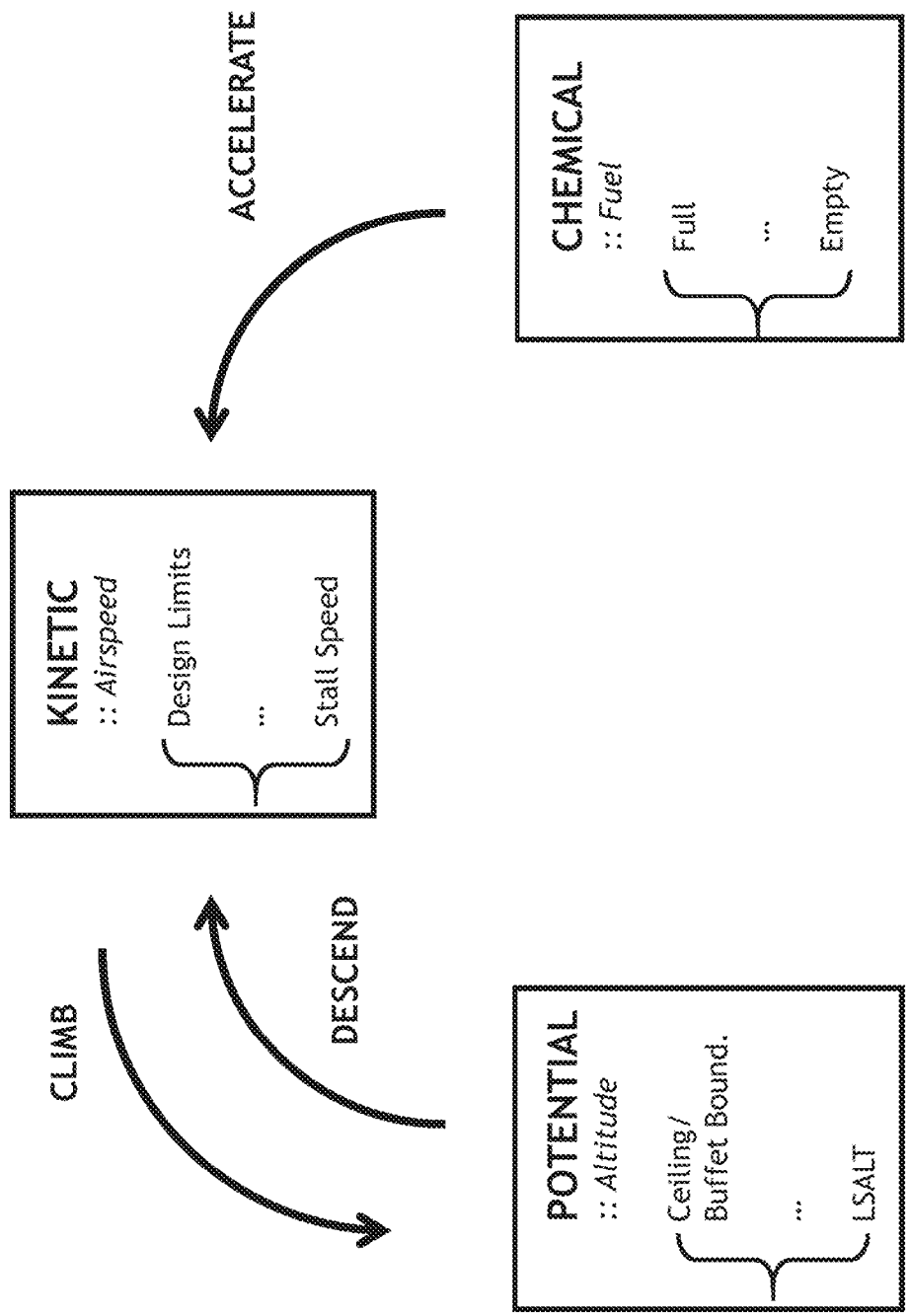
FIG. 39 is a diagram representing the relationship between the energy states of an aircraft in flight.

FIG. 39 is a diagrammatic view of the relationships between aircraft energy states. Aircraft 200 uses its fuel to accelerate, thereby converting chemical energy (fuel) into kinetic energy (speed and momentum). Similarly, aircraft 200 may convert kinetic energy into potential energy by climbing, trading speed for altitude. Conversely, aircraft 200 may convert potential energy into kinetic energy by descending, losing altitude but gaining speed. As a result, an aircraft without fuel or engines at high altitude still possesses energy that may be used to reach an alternative landing site. In addition, an aircraft at low altitude and high speed has the potential energy to climb, gaining altitude and increasing its effective reachable range.

In each phase of flight, aircraft 200 will have a finite total energy state comprised of speed and altitude. Combined with a vector, this total energy state may indicate which ALS may be reachable to the aircraft 200. In embodiments, system 300 may determine this total energy state of the aircraft 200 combined with the vector of the aircraft and display each ALS based on whether the ALS is reachable by aircraft 200 at the current energy state and vector. For example, a first ALS 20 NM in front of the aircraft 200 may be unreachable by aircraft 200 at a first energy state even though the aircraft's vector may be directly toward the first ALS. However, should the aircraft accelerate to a greater speed; the first ALS may now be reachable based on this increased energy state. System 300 would display the ALS in red at the first energy state and display the ALS in green at the second, higher speed, energy state.

Similarly, this total energy state combined with the vector may require a turn for aircraft 200 to reach the ALS. Any turn is an energy depleting maneuver and requires a greater total energy state than would a direct routing to the ALS. Relative bearing to the ALS may require some amount of turn for aircraft 200 to reach the desired opportunity gate 210. For example, should the aircraft 200 maintain a relative bearing 180 away from the ALS (with the ALS directly on the tail) this situation would require greater total energy than would an ALS with a zero relative bearing (directly on the nose).

Figure 40:
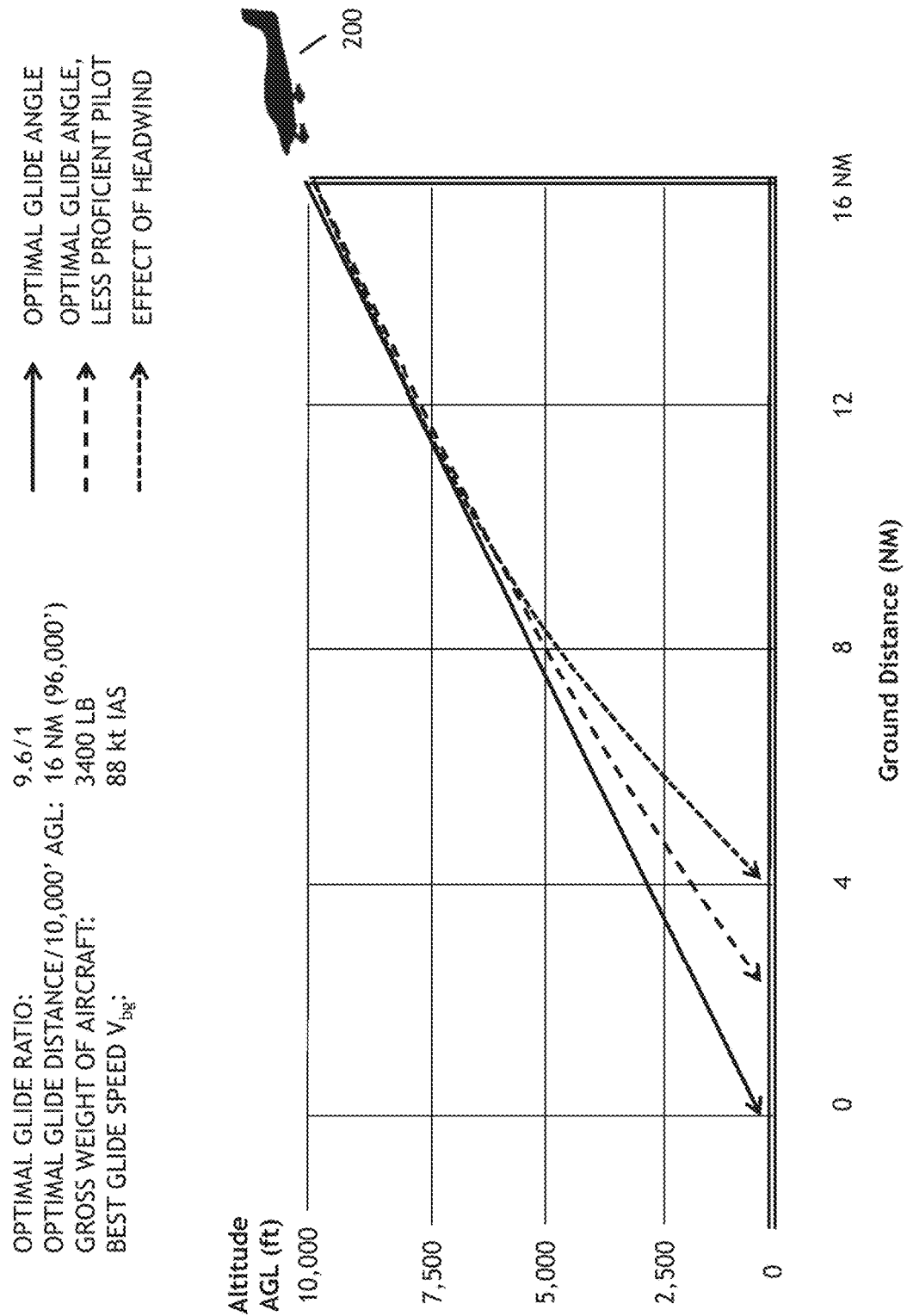
FIG. 40 is a diagram representing the optimal engine-out/ zero-thrust glide distance achievable by an aircraft of given glide ratio, and how said optimal distance may be affected by atmospheric conditions or pilot proficiency.

System 300 maintains awareness of aircraft type and energy requirements in such a turn and displays ALS listing accordingly. For example, a 90 degree turn may require a specific amount of energy such as that equal to 40 knots of airspeed or that equal to 1500 feet of altitude. Two identical aircraft heading in opposite directions may both be able to reach the same ALS based on the energy state. The aircraft with the ALS at 180 relative bearing would require a higher energy state to reach the ALS than would the aircraft with the ALS at zero degrees relative. For example: Ground speed (GPS) corrected for the wind model (forecast/updated)=TAS TAS×Altitude=total energy Total energy−[Turn energy per degree*(vector degrees away from the opportunity gate)]=Energy Vector Energy Vector corrected for the wind model(forecast/updated)=ALS availability FIG. 40 is a diagrammatic view of the effective glide range of a given aircraft 200 in an engine-out state. Aircraft 200 may be able to glide nearly 16 NM under optimal conditions (ideal temperature and pressure, best glide speed, proficient pilot). Real-world conditions may affect the effective range in practice, however: headwinds will reduce the gliding distance, and a less proficient pilot may not be able to maintain optimal glide angle and speed.

Figure 41:
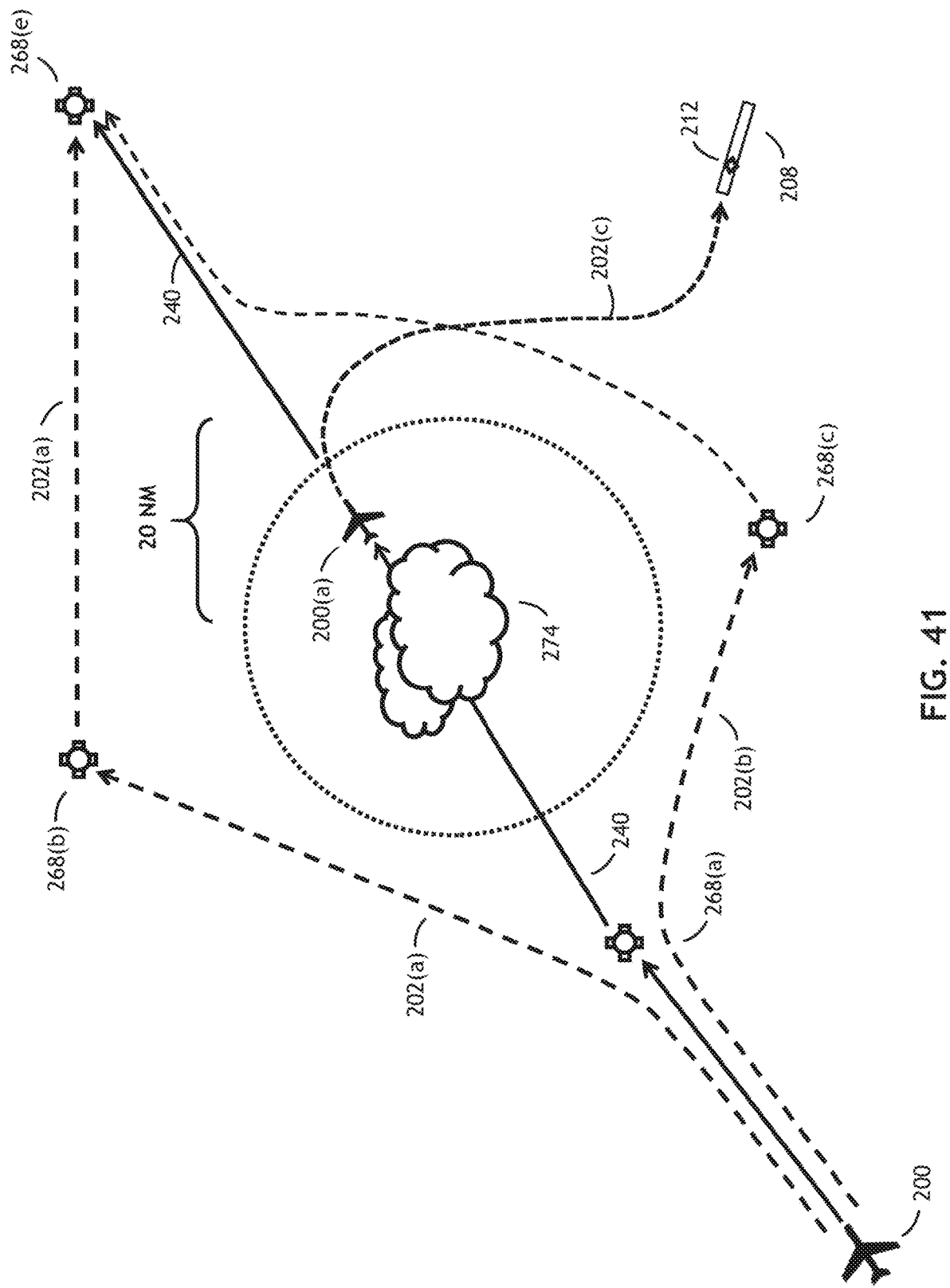
FIG. 41 is a highly diagrammatic top plan view of an emergency condition whereby an embodiment of the present invention suggests at least one alternative flight path based on adverse weather conditions in the original flight path or, in the alternative, suggests a hierarchy of risk profile accessed emergency procedure sets providing a best safe landing opportunity procedure to an aircraft affected by said adverse weather conditions.

FIG. 41 is a highly diagrammatic top view of a condition whereby a preferred embodiment of the present invention directs aircraft 200 away from atmospheric disturbance 274. Flight path 240 directs aircraft 200 over waypoint 268(*a*) and then over 268(*e*), but disturbance 274 may be observed along flight path 240. Trajectory evaluator module 312 may then suggest to the pilot a diversion along path 202(*a*), over waypoint 268(*b*), or along path 202(*b*) and over waypoint 268(*c*), in either case resuming course over waypoint 268(*e*). Trajectory evaluator module 314 may observe a selectable buffer zone around identified weather disturbances, here observing a minimum 20 NM radius around disturbance 274. In the alternative aircraft 200(*a*), having passed through disturbance 274, may instead be unable to reach its intended destination. Trajectory evaluator module 314 may then signal alternative landing module 316 to suggest a diversion along path 202(*c*) to runway 208 and touchdown zone 212.

Figure 42:
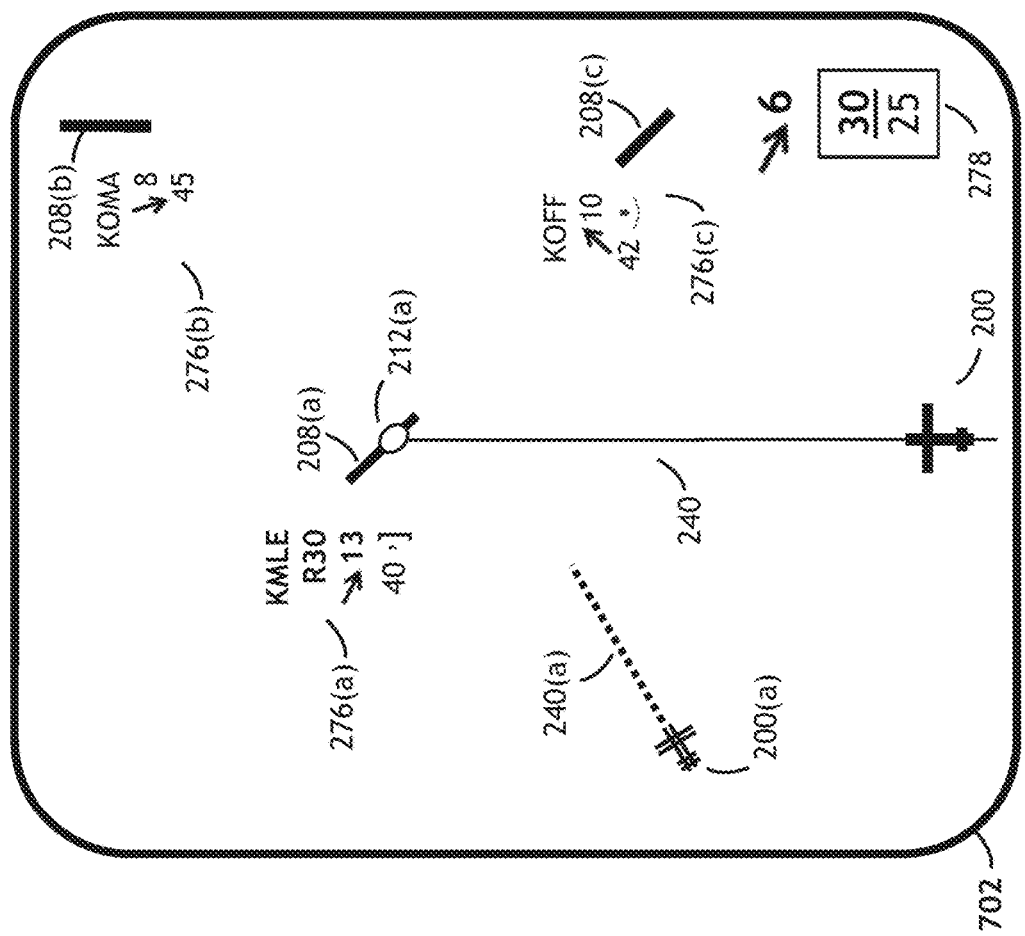
FIG. 42 is a pilot view of the display unit of a portable computing device whereby an embodiment of the present invention displays high priority alternative landing sites along the flight path of an aircraft, as well as current atmospheric conditions at the said alternative landing sites.

FIG. 42 is a pilot view of display unit 702 of a portable computing device onboard aircraft 200, currently following flight path 240 to arrival at KMLE Runway 30 208(*a*) and touchdown zone 212(*a*). Current atmospheric conditions at KMLE 276(*a*) are displayed and updated as new information becomes available (e.g., new METARs or TAFs are issued). Alternative landing module 316 is tracking two nearly alternative landing sites, KOMA 208(*b*) and KOFF 208(*c*), within the selected range of aircraft 200. Alternative landing module 316 may further display, for alternative landing sites 208(*a*) and 208(*b*), current weather conditions 278(*b*) and 278(*c*) at each site. Alternative landing module 316 may also display temperature and dewpoint conditions 278 at the current position of aircraft 200 as well as the projected flight path 240(*a*) of aircraft 200(*a*), also currently projected to land at KMLE. Sensitivity parameters may be adjusted by the pilot to track more or less air traffic depending on, for example, whether said traffic is projected to cross flight path 240 or whether said traffic is projected to land at a destination airport within a certain time window of aircraft 200. Note that specific runway and touchdown zone information is not displayed for KOMA or KOFF; this information may be displayed if either is selected as an alternative landing site or by request. As aircraft 200 approaches KMLE, the system of the present invention may display more precise approach and landing information, e.g., approach charts or a more detailed flight path, and inform the pilot if the currently projected approach should change due to shifting winds.

The invention claimed is:

1. An aircraft comprising:
   (a) an aircraft flight control;
   (b) an autopilot operatively connected to said aircraft flight control;
   (c) a position sensor configured to report the aircraft's position;
   (d) a display;
   (e) a communications system;
   (f) at least one sensor configured to detect at least one of a pitch or bank of the aircraft;
   (g) a flight monitor configured to:
      determine the existence of a deviation associated with the detected pitch or bank of the aircraft; and
      direct the autopilot to correct the deviation associated with the detected pitch or bank of the aircraft; and
   (h) an alternate landing site selector comprising:
      (1) memory storing data related to aircraft position and weather information;
      (2) a processor coupled with said memory and said autopilot, the processor configured to trigger a procedure to bring the aircraft to a safe landing, the procedure comprising, automatically:
      identifying within range of the aircraft's current position one or more potential alternate landing sites (ALS);
      determining the suitability of each potential ALS based on distance of the potential ALS from the aircraft's current position and at least one additional selection criteria selected from the group including weather conditions, wind conditions, or runway length;
      selecting a first alternate landing site from the one or more potential ALS based on the determined suitability;
      creating a flight path from the current position of the aircraft to a landing associated with the first alternate landing site via at least one of a waypoint or an initial approach;
      determining an estimated time of arrival at the first alternate landing site;
      displaying the first alternate landing site and the flight path to the first alternate landing site;
      continuing to determine the suitability of at least the first alternate landing site based at least on weather conditions;
      selecting at least one second alternate landing site based on changes to the suitability of the first alternate landing site associated with weather conditions;
      creating a new flight path to a landing associated with the new second alternate landing site;
      directing said autopilot to manipulate said aircraft flight control through at least one of the flight path or the new flight path;
      transmitting a message, using the communications system, regarding at least one of the triggered procedure or landing at the first alternate landing site or the second alternate landing site; and
      causing the aircraft to land at the first alternate landing site or the second alternate landing site.

2. The aircraft of claim 1, wherein the procedure to bring the aircraft to a safe landing is triggered at least partially in response to an identification of an aircraft pressurization failure; and
   wherein the procedure further includes directing the autopilot to cause the aircraft to descend to a lower altitude.

3. The aircraft of claim 1, wherein the procedure to bring the aircraft to a safe landing is triggered in response to a user selection.

4. The aircraft of claim 1, wherein the procedure is triggered in response to a failure by a pilot to acknowledge a prompt presented via the display, the prompt associated with the deviation.

5. The aircraft of claim 1, wherein said memory includes a database of airport approach procedures.

6. The aircraft of claim 5, wherein said database includes one or more RNAV instrument approach procedures.

7. The aircraft of claim 6, wherein said waypoint includes a GPS waypoint.

8. The aircraft of claim 1, wherein selecting at least one second alternate landing site includes selecting at least one second alternate landing site if adverse weather conditions interfering with an ability of the aircraft to reach the first alternate landing site cause changes to the suitability of the first alternate landing site.

9. An aircraft, comprising:
   (a) a display;
   (b) at least one sensor configured to determine at least one of a pitch or a bank of the aircraft;
   (c) a processor configured to trigger a procedure comprising, automatically:
      (1) identifying one or more potential alternate landing sites within a predetermined range of a current position of the aircraft;
      (2) determining a suitability of each potential alternate landing site based on at least two of distance from the current position, terrain, weather conditions, wind conditions, or runway length;
      (3) selecting an alternate landing site from the one or more potential alternate landing sites, and an approach fix associated with the selected alternate landing site, based on the determined suitability;
      (4) creating a route from the current position to the approach fix associated with the selected alternate landing site, the route accounting for terrain and obstacles along the route;
      (5) transmitting information regarding diverting the aircraft to the selected alternate landing site;
      (6) determining an estimated time of arrival at the selected alternate landing site;
      (7) displaying the selected alternate landing site and the route to the selected alternate landing site on the display;
      (8) continuing to determine the suitability of at least the selected alternate landing site and the approach fix associated with the alternate landing site based at least on weather conditions;
      (9) rerouting the aircraft to at least one of a new approach fix associated with the selected alternate landing site or a new route to a new alternate landing site and associated approach fix based on changes to the determined suitability of at least the selected alternate landing site, including changes to weather or wind conditions;
      (10) causing the aircraft to fly at least one of the route or the new route;

and
(11) causing the aircraft to land at the selected alternate landing site or the new alternate landing site;
and
(d) a flight monitor configured to:
detect a deviation associated with the pitch or bank of the aircraft;
and
cause the aircraft to correct the deviation;
wherein the processor is further configured to trigger the procedure in response to a failure by a pilot to acknowledge a prompt associated with the deviation.

10. The aircraft of claim 9, wherein at least one of the route or the new route is formed to avoid adverse weather conditions.

11. The aircraft of claim 9, wherein:
the processor is further configured to trigger the procedure at least partially in response to an identification of an aircraft pressurization failure;
and
wherein the procedure further includes causing the aircraft to descend to a lower altitude.

12. The aircraft of claim 9, wherein the prompt is presented via the display.

13. The aircraft of claim 9, wherein said aircraft further comprises a database of airport approach procedures.

14. The aircraft of claim 9, wherein the procedure further includes at least one of squawking emergency or transmitting intent to land at either the selected alternate landing site or the new alternate landing site to air traffic control.

15. An aircraft, comprising:
(a) a display;
(b) an alternate landing site (ALS) selector configured to trigger a procedure to bring the aircraft to an alternate landing site, the procedure comprising, automatically:
generating a hierarchy of alternate landing sites (ALS) by determining a suitability of each a plurality of potential alternate landing sites based on a plurality of each potential ALS's distance from the aircraft's current position, terrain, weather conditions, or wind conditions;
selecting the ALS determined to be most suitable;
creating a route from the aircraft's current position to an opportunity gate associated with the selected alternate landing site, the route accounting for at least terrain or obstacles;
continuing to determine the suitability of at least the selected alternate landing site based at least on weather conditions as the aircraft flies along the route;
rerouting the aircraft to at least one of a new alternate landing site or a new route associated with the new alternate landing site based on one or more changes to the determined suitability of at least the selected alternate landing site, the one or more changes including changes to weather or wind conditions;
bringing the aircraft to an altitude based on obstacles or terrain;
causing the aircraft to traverse at least one of the route or the new route;
and
causing the aircraft to land at one of the selected alternate landing site or the new alternate landing site;
(c) a sensor configured to detect at least one of a pitch or bank of the aircraft;
and (d) a flight monitor configured to:
determine the existence of a deviation associated with the detected pitch or bank of the aircraft;
and
cause the aircraft to correct the deviation associated with the detected pitch or bank of the aircraft.

16. The aircraft of claim 15, wherein the ALS selector is further configured to trigger the procedure at least partially in response to an identification of an aircraft pressurization failure;
and
wherein the procedure further includes causing the aircraft to descend to a lower altitude.

17. The aircraft of claim 15, further comprising:
a communications system coupled to the ALS selector, the communications system configured to perform at least one of squawking emergency or informing air traffic control of intent to land at the selected alternate landing site or the new alternate landing site.

18. The aircraft of claim 15, wherein the ALS selector is further configured to trigger the procedure in response to a failure by a pilot to acknowledge a prompt associated with the deviation.

19. An aircraft, comprising:
(a) an autopilot;
(b) display;
(c) a processor coupled to the autopilot, the processor operable to trigger an emergency procedure, the emergency procedure comprising automatically:
determining a suitability of a plurality of alternate landing sites;
selecting a first alternate landing site for the aircraft based on the determined suitability;
creating a route from a current position of the aircraft to the alternate landing site;
instructing the autopilot to cause the aircraft to traverse the route;
reevaluating the suitability of the first alternate landing site based on at least weather conditions;
and
if the suitability of the first alternate landing site changes based on at least weather conditions, selecting a second alternate landing site, creating a new route to the second alternate landing site, and instructing the autopilot to cause the aircraft to traverse the new route;
and
(d) a flight monitor configured to:
determine the existence of a deviation associated with the detected pitch or bank of the aircraft;
and
direct the autopilot to correct the deviation associated with the detected pitch or bank of the aircraft.

20. The aircraft of claim 19, the emergency procedure further comprising:
controlling the display to present notifications to a user of the aircraft, the notifications including:
a first notification indicating an alternate landing site is selected;
and
a second notification indicating whether user action is required.

21. The aircraft of claim 19, wherein the emergency procedure is triggered in response to a failure by a pilot to acknowledge a prompt associated with the deviation.

22. The aircraft of claim 21, wherein the processor is further configured to trigger the procedure at least partially in response to an identification of an aircraft pressurization failure and wherein the procedure further includes causing the aircraft to descend to a lower altitude.

23. The aircraft of claim 19, wherein the processor is further configured to trigger the procedure at least partially in response to an identification of an aircraft pressurization failure and wherein the procedure further includes causing the aircraft to descend to a lower altitude.

24. The aircraft of claim 19, wherein the aircraft further includes a communications system;
and
wherein the emergency procedure further includes squawking emergency via the communications system.

25. The aircraft of claim 24, wherein the emergency procedure further includes transmitting intent to land at either the first alternate landing site or the second alternate landing site via the communications system.

26. The aircraft of claim 25, wherein the processor is further configured to trigger the procedure at least partially in response to an identification of an aircraft pressurization failure;
and
wherein the procedure further includes causing the aircraft to descend to a lower altitude.

* * * * *